United States Patent
Digonnet et al.

(10) Patent No.: US 7,619,743 B2
(45) Date of Patent: Nov. 17, 2009

(54) OPTICAL SENSOR UTILIZING HOLLOW-CORE PHOTONIC BANDGAP FIBER WITH LOW PHASE THERMAL CONSTANT

(75) Inventors: Michel J. F. Digonnet, Palo Alto, CA (US); Hyang Kyun Kim, San Jose, CA (US); Vinayak Dangui, Stanford, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 6 days.

(21) Appl. No.: 11/770,660

(22) Filed: Jun. 28, 2007

(65) Prior Publication Data
US 2008/0030741 A1    Feb. 7, 2008

Related U.S. Application Data

(60) Provisional application No. 60/817,514, filed on Jun. 29, 2006, provisional application No. 60/837,891, filed on Aug. 14, 2006.

(51) Int. Cl.
*G01C 19/72* (2006.01)
(52) U.S. Cl. ..................................... 356/460
(58) Field of Classification Search ................ 356/459, 356/460, 461, 483
See application file for complete search history.

(56) References Cited

U.S. PATENT DOCUMENTS 626,038 A    5/1899    Riley (Continued)

FOREIGN PATENT DOCUMENTS

EP    0038023    10/1981

(Continued)

OTHER PUBLICATIONS

Dangui, Vinayak et al. "Phase sensitivity to temperature of the fundamental mode in air-guiding photonic-bandgap fibers." Optics Express, vol. 13, No. 18, Sep. 5, 2005, p. 6669-6684.*

(Continued)

*Primary Examiner*—Michael A Lyons
(74) *Attorney, Agent, or Firm*—Knobbe Martens Olson & Bear LLP

(57) ABSTRACT

An optical sensor includes a directional coupler comprising at least a first port, a second port, and a third port. The first port is in optical communication with the second port and with the third port such that a first optical signal received by the first port is split into a second optical signal that propagates to the second port and a third optical signal that propagates to the third port. The optical sensor further includes a photonic bandgap fiber having a hollow core and an inner cladding generally surrounding the core. The photonic bandgap fiber is in optical communication with the second port and with the third port. The second optical signal and the third optical signal counterpropagate through the photonic bandgap fiber and return to the third port and the second port, respectively. The photonic bandgap fiber has a phase thermal constant S less than 8 parts-per-million per degree Celsius.

25 Claims, 25 Drawing Sheets

U.S. PATENT DOCUMENTS

| | | | |
|---|---|---|---|
| 4,013,365 A | 3/1977 | Vali et al. | |
| 4,389,090 A | 6/1983 | LeFevre | |
| 4,536,058 A | 8/1985 | Shaw et al. | |
| 4,773,759 A * | 9/1988 | Bergh et al. | 356/460 |
| 4,856,900 A | 8/1989 | Ivancevic | |
| 5,331,404 A | 7/1994 | Moeller et al. | |
| 5,552,887 A | 9/1996 | Dyott | |
| 5,563,705 A | 10/1996 | Sanders | |
| 5,802,236 A | 9/1998 | DiGiovanni et al. | |
| 6,108,086 A | 8/2000 | Michal et al. | |
| 6,243,522 B1 | 6/2001 | Allan et al. | |
| 6,260,388 B1 | 7/2001 | Borrelli et al. | |
| 6,334,017 B1 | 12/2001 | West | |
| 6,334,019 B1 | 12/2001 | Birks et al. | |
| 6,389,187 B1 | 5/2002 | Greenaway et al. | |
| 6,404,966 B1 | 6/2002 | Kawanishi et al. | |
| 6,463,200 B2 | 10/2002 | Fink et al. | |
| 6,625,364 B2 | 9/2003 | Johnson et al. | |
| 7,190,875 B2 | 3/2007 | Anderson et al. | |
| 7,327,460 B2 | 2/2008 | Sanders et al. | |
| 2004/0061863 A1 * | 4/2004 | Digonnet | 356/460 |

FOREIGN PATENT DOCUMENTS

| | | |
|---|---|---|
| EP | 0874219 A2 | 10/1998 |
| EP | 0874219 A3 | 4/2000 |
| JP | 60-228916 | 11/1985 |
| JP | 01299413 | 12/1989 |
| JP | 03-028830 | 2/1991 |
| JP | 06-510123 | 11/1994 |
| JP | 07-128078 | 5/1995 |
| WO | WO 99/64903 | 12/1999 |
| WO | WO 00/35058 | 6/2000 |
| WO | WO 00/60388 | 10/2000 |
| WO | WO 02/14946 | 2/2002 |
| WO | WO 02/059656 | 8/2002 |

OTHER PUBLICATIONS

B.Y. Kim, "*Signal Processing Techniques,*" Optical Fiber Rotation Sensing, William Burns, Editor, Academic Press, Inc., 1994, Chapter 3, pp. 81-114.

"*Rare Earth Doped Lasers and Amplifers,*" Second Edition, M.J.F. Digonnet, Editor, Marcel Dekker, Inc. New York, 2001, Chapter 6.

D.G. Ouzouinov et al., "*Dispersion and nonlinear propagation in air-core photonic bandgap fibers,*" Proceedings of the Conf. on Lasers and Electro-optics, Paper CThV5, Jun. 2003.

D.G. Ouzounov, C.J. Hensley, A.L. Gaeta, N. Venkataraman, M.T. Gallagher and K.W. Koch, "*Nonlinear properties of hollow-core photonic band-gap fibers,*" Conf. Lasers and Electro-Optics, Optical Society of America, Washington, D.C., vol. 1, pp. 217-219 (2005).

D.M. Shupe, "*Fibre resonator gyroscope: sensitivity and thermal nonreciprocity,*" Appl. Opt. vol. 20, No. 2, pp. 286-289 (1981).

D.M. Shupe, "*Thermally induced nonreciprocity in the fiber-optic interferometer,*" Appl. Opt. vol. 19, No. 5, pp. 654-655 (1980).

F. Couny et al., "*Large-pitch kagome-structured hollow-core photonic crystal fiber,*" Optics Letters, vol. 31, No. 34, pp. 3574-3576 (Dec. 2006).

G.S. Kino et al., "*A Polarization-based Folded Sagnac Fibre-optic Array for Acoustic Waves,*" SPIE Proceedings on Fiber Optic Sensor Techonology and Applications 2001, vol. 4578 (SPIE, Washington, 2002), pp. 336-345.

Groothoff, J., et al., "*Bragg Gratings in Air-Silica Structured Fibers,*" Optics letters, OSA, Optical Society of America, Washington DC, US, vol. 28, No. 4, Feb. 15, 2003; XP-001160161.

H.C. Lefevre, "*Single-Mode Fibre Fractional Wave Devices and Polarisation Controllers,*" Electronics Letters, vol. 16, No. 20, Sep. 25, 1980, pp. 778-780.

H.K. Kim, J. Shin, S.H. Fan, M.J.F. Digonnet, and G.S. Kino, "*Designing air-core photonic-bandgap fibers free of surface modes,*" IEEE J. Quant. Electron. vol. 40, No. 5, pp. 551-556 (2004).

H.K. Kim, M.J.F. Digonnet, and G.S. Kino, "*Air-Core Photonic-Bandgap Fiber Optic Gyroscope,*" J. Lightwave Tech. vol. 24, pp. 3169-3180 (2006).

H.K. Kim, V. Dangui, M. Digonnet, and G. Kino, "*Fiber-optic gyroscope using an air-core photonic-bandgap fiber,*" 17th International Conference on Optical Fibre Sensors, Proceedings of SPIE vol. 5855, Part I, pp. 198-201 (2005).

Herve Lefevre, The Fiber-Optic Gyroscope, Section 4.2, Artech House, Boston, London, 1993.

International Search Report dated Jun. 28, 2007 issued in corresponding PCT Application No. PCT/US2007/372419.

International Search Report for Application No. EP 03255149 dated Dec. 1, 2003.

J.M. Mackintosh et al., "*Analysis and observation of coupling ratio dependence of Rayleigh backscattering noise in a fiber optic gyroscope,*" Journal of Lightwave Technology, vol. 7, No. 9, Sep. 1989, pp. 1323-1328.

Kim et al, "Air-Core Photonic-Bandgap Fiber-Optic Gyroscope," Journal of Lightwave Technology, vol. 24, No. 8, Aug. 2006, pp. 3169-3174.

K. Liu et al., "*Broadband Diode-Pumped Fiber Laser,*" Electronics Letters, vol. 24, No. 14, Jul. 1988, pp. 838-840.

M. Szustakowski et al., "*Recent development of fiber optic sensors for perimeter security,*" Proceedings of the 35th Annual 2001 International Carnahan Conference on Security Technology, Oct. 16-19, 2001, London, UK, pp. 142-148.

M.J.F. Digonnet, S. Blin, H.K. Kim, V. Dangui, and G.S. Kino, "*Sensitivity and Stability of an Air-Core Fiber Gyroscope,*" Meas. Sci. Tech. vol. 18, pp. 3089-3097 (2007).

N. Venkataraman et al., "*Low Loss (13 dB/km) Air Core Photonic Band-Gap Fibre,*" Proceedings of the European Conference on Optical Communication, ECOC 2002, Post-deadline Paper No. PD1.1, Sep. 2002.

P. Yeh et al., "*Theory of Bragg Fiber,*" Journal of Optical Society of America, vol. 68, 1978, pp. 1197-1201.

Philip Russell, "*Photonic Crystal Fibers,*" Jan. 17, 2003 Science, vol. 299, pp. 358-362.

R.A. Bergh et al, "*Compensation of the Optical Kerr Effect in Fiber-Optic Gyroscopes,*" Optics Letters, vol. 7, 1982, pp. 282-284.

R.B. Dyott, "*Reduction of the Shupe effect in fibre optic gyros; the random-wound coil,*" Elec. Lett. vol. 32, No. 23, pp. 2177-2178 (1996).

Roberts et al. "Ultimate low loss of hollow-core photonic crystal fibres" Optics Express 244, vol. 13, No. 1, Jan. 10, 2005.

S. Blin, H.K. Kim, M.J.F. Digonnet, and G.S. Kino, "*Reduced Thermal Sensitivity of a Fiber-Optic Gyroscope using an Air-Core Photonic-Bandgap Fiber,*" J. Lightwave Tech. vol. 25, pp. 861-865 (2007).

The Free Dictionary by Farlex (http://encyclopedia.thefreedictionary.com/Photonic-crystal+fiber) (2005).

V. Dangui, H.K. Kim, M.J.F. Digonnet, and G.S. Kino, "*Theoretical and Experimental Study of the Fundamental Mode Propagation Phase Temperature Sensitivity in Air-Core Photonic-Bandgap Fibers,*" Tech. Digest of Optical Fiber Conf. OFC '05, Anaheim CA, Mar. 2005, paper OTul4.

V. Dangui, M.J.F. Digonnet and G.S. Kino, "*A fast and accurate numerical tool to model the mode properties of photonic-bandgap fibers,*" Opt. Express vol. 14, pp. 2979-2993 (2006).

Webster, Wiley Encyclopedia of Electrical and Electronics Engineering, Wiley & Sons, Inc., 1999, pp. 376-398.

Written Opinion issued in corresponding PCT Application No. PCT/US2007/372419 dated Jun. 28, 2007.

Xiao et al. "Fusion Splicing Photonic Crystal Fibers and Conventional Single-Mode Fibers: Microhole Collapse Effect" Journal of Lightwave Technology, vol. 25, No. 11, Nov. 2007, pp. 3563-3574.

Zhu Yinian, et al., "*Photonic Crystal Fibers and their Applications in Optical Communications and Sensors,*" Database Inspec [Online] The Institution of Electrical Engineers, Stevenage, GB; 2002; XP002461746 Database accession No. 7666112.

Zsigri et al. "Transmission over 5.6 km large effective area and low-loss (1.7 dB/km) photonic crystal fibre" Electronics Letters, vol. 39 No. 10, May 15, 2009, pp. 796-798.

* cited by examiner

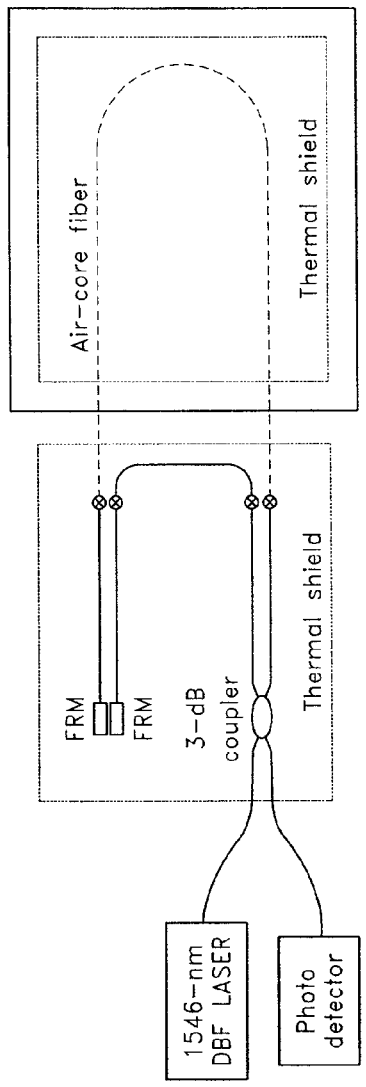
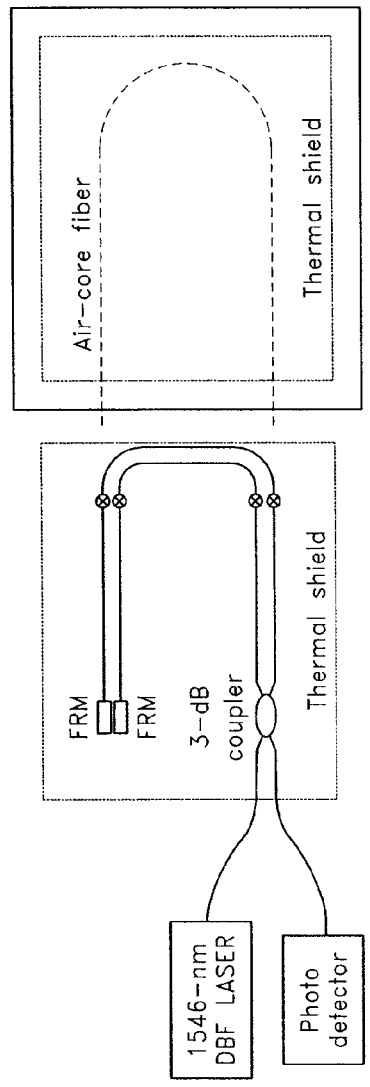
FIG. 15A
FIG. 15B

OPTICAL SENSOR UTILIZING HOLLOW-CORE PHOTONIC BANDGAP FIBER WITH LOW PHASE THERMAL CONSTANT

CLAIM OF PRIORITY

This application claims benefit under 35 U.S.C. §119(e) to U.S. Provisional Patent Application No. 60/817,514, filed Jun. 29, 2006 and U.S. Provisional Patent Application No. 60/837,891, filed Aug. 14, 2006, each of which is incorporated in its entirety by reference herein.

BACKGROUND OF THE INVENTION

1. Field of the Invention

The present invention relates to fiber optic sensors, and more particularly, relates to fiber optic interferometers for sensing, for example, rotation, movement, pressure, or other stimuli.

2. Description of the Related Art

A fiber optic Sagnac interferometer is an example of a fiber optic sensor that typically comprises a loop of optical fiber to which lightwaves are coupled for propagation around the loop in opposite directions. After traversing the loop, the counterpropagating waves are combined so that they coherently interfere to form an optical output signal. The intensity of this optical output signal varies as a function of the relative phase of the counterpropagating waves when the waves are combined.

Sagnac interferometers have proven particularly useful for rotation sensing (e.g., gyroscopes). Rotation of the loop about the loop's central axis of symmetry creates a relative phase difference between the counterpropagating waves in accordance with the well-known Sagnac effect, with the amount of phase difference proportional to the loop rotation rate. The optical output signal produced by the interference of the combined counterpropagating waves varies in power as a function of the rotation rate of the loop. Rotation sensing is accomplished by detection of this optical output signal.

Rotation sensing accuracies of Sagnac interferometers are affected by spurious waves caused by Rayleigh backscattering. Rayleigh scattering occurs in present state-of-the-art optical fibers because the small elemental particles that make up the fiber material cause scattering of small amounts of light. As a result of Rayleigh scattering, light is scattered in all directions. Light that is scattered forward and within the acceptance angle of the fiber is the forward-scattered light. Light that is scattered backward and within the acceptance angle of the fiber is the back-scattered light. In a fiber-optic gyroscope (FOG), both the clockwise and the counterclockwise waves along the sensing coil (referred to here as the primary clockwise and primary counterclockwise waves) are scattered by Rayleigh scattering. The primary clockwise wave and the primary counterclockwise wave are both scattered in respective forward and backward directions. This scattered light returns to the detector and adds noise to the primary clockwise wave and to the secondary counterclockwise wave. The scattered light is divided into two types, coherent and incoherent. Coherently scattered light originates from scattering occurring along the section of fiber of length $L_c$ centered around the mid-point of the coil, where $L_c$ is the coherence length of the light source. This scattered light is coherent with the primary wave from which it is derived and interferes coherently with the primary wave. As a result, a sizeable amount of phase noise is produced. Forward coherent scattering is in phase with the primary wave from which it is scattered, so it does not add phase noise. Instead, this forward coherent scattering adds shot noise. The scattered power is so small compared to the primary wave power that this shot noise is negligible. All other portions of the coil produce scattered light that is incoherent with the primary waves. The forward propagating incoherent scattered light adds only shot noise to the respective primary wave from which it originates, and this additional shot noise is also negligible. The dominant scattered noise is coherent backscattering. This coherent backscattering noise can be large. The coherent backscattering noise has been reduced historically by using a broadband source, which has a very short coherence length $L_c$. With a broadband source, the portion of backscattering wave originates from a very small section of fiber, namely a length $L_c$ of typically a few tens of microns centered on the mid-point of the fiber coil, and it is thus dramatically reduced compared to what it would be with a traditional narrowband laser, which has a coherence length upward of many meters. See for example, Hervé Lefèvre, *The Fiber-Optic Gyroscope*, Section 4.2, Artech House, Boston, London, 1993, and references cited therein.

Rotation sensing accuracies are also affected by the AC Kerr effect, which cause phase differences between counter-propagating waves in the interferometers. The AC Kerr effect is a well-known nonlinear optical phenomena in which the refractive index of a substance changes when the substance is placed in a varying electric field. In optical fibers, the electric fields of lightwaves propagating in the optical fiber can change the refractive index of the fiber in accordance with the Kerr effect. Since the propagation constant of each of the waves traveling in the fiber is a function of refractive index, the Kerr effect manifests itself as intensity-dependent perturbations of the propagation constants. If the power circulating in the clockwise direction in the coil is not exactly the same as the power circulating in the counterclockwise direction in the coil, as occurs for example if the coupling ratio of the coupler that produces the two counterpropagating waves is not 50%, the optical Kerr effect will generally cause the waves to propagate with different velocities, resulting in a non-rotationally-induced phase difference between the waves, and thereby creating a spurious signal. See, for example, pages 101-106 of the above-cited Hervé Lefèvre, *The Fiber Optic Gyroscope*, and references cited therein. The spurious signal is indistinguishable from a rotationally induced signal. Fused silica optical fibers exhibit sufficiently strong Kerr nonlinearity that for the typical level of optical power traveling in a fiber optic gyroscope coil, the Kerr-induced phase difference in the fiber optic rotation sensor may be much larger than the phase difference due to the Sagnac effect at small rotation rates.

Silica in silica-based fibers also can be affected by magnetic fields. In particular, silica exhibits magneto-optic properties. As a result of the magneto-optic Faraday effect in the optical fiber, a longitudinal magnetic field of magnitude B modifies the phase of a circularly polarized wave by an amount proportional to B. The change in phase of the circularly polarized wave is also proportional to the Verdet constant v of the fiber material and the length of fiber L over which the field is applied. The sign of the phase shift depends on whether the light is left-hand or right-hand circularly polarized. The sign also depends on the relative direction of the magnetic field and the light propagation. As a result, in the case of a linearly polarized light, this effect manifests itself as a change in the orientation of the polarization by an angle $\theta = \nu BL$. This effect is non-reciprocal. For example, in a Sagnac interferometer or in a ring interferometer where identical circularly polarized waves counterpropagate, the magneto-optic Faraday effect induces a phase difference equal to $2\theta$ between the counterpropagating waves. If a magnetic field is applied to a fiber coil, however, the clockwise and counterclockwise waves will in general experience a slightly different phase shift. The result is a magnetic-field-induced relative phase shift between the clockwise and counterclockwise propagating waves at the output of the fiber optic loop where the waves interfere. This differential phase shift is proportional to the Verdet constant. This phase difference also depends on the magnitude of the magnetic field and the birefringence of the fiber in the loop. Additionally, the phase shift depends on the orientation (i.e., the direction) of the magnetic field with respect to the fiber optic loop as well as on the polarizations of the clockwise and counterclockwise propagating signals. If the magnetic field is DC, this differential phase shift results in a DC offset in the phase bias of the Sagnac interferometer. If the magnetic field varies over time, this phase bias drifts, which is generally undesirable and thus not preferred.

The earth's magnetic field poses particular difficulty for Sagnac interferometers employed in navigation. For example, as an aircraft having a fiber optic gyroscope rotates, the relative spatial orientation of the fiber optic loop changes with respect to the magnetic field of the earth. As a result, the phase bias of the output of the fiber gyroscope drifts. This magnetic field-induced drift can be substantial when the fiber optic loop is sufficiently long, e.g., about 1000 meters. To counter the influence of the magnetic field in inertial navigation fiber optic gyroscopes, the fiber optic loop may be shielded from external magnetic fields. Shielding comprising a plurality of layers of μ-metal may be utilized.

SUMMARY OF THE INVENTION

In certain embodiments, an optical sensor is provided. The optical sensor comprises a directional coupler comprising at least a first port, a second port, and a third port. The first port is in optical communication with the second port and with the third port such that a first optical signal received by the first port is split into a second optical signal that propagates to the second port and a third optical signal that propagates to the third port. The optical sensor further comprises a photonic bandgap fiber having a hollow core and an inner cladding generally surrounding the core. The photonic bandgap fiber is in optical communication with the second port and with the third port. The second optical signal and the third optical signal counterpropagate through the photonic bandgap fiber and return to the third port and the second port, respectively. The photonic bandgap fiber has a phase thermal constant S less than 8 parts-per-million per degree Celsius.

In certain embodiments, a method for sensing is provided. The method comprises providing a light signal. The method further comprises propagating a first portion of the light signal in a first direction through a portion of a photonic bandgap fiber having a hollow core and an inner cladding generally surrounding the core. The photonic bandgap fiber has a phase thermal constant S less than 8 parts-per-million per degree Celsius. The method further comprises propagating a second portion of the light signal in a second direction through the photonic bandgap fiber, the second direction opposite to the first direction. The method further comprises optically interfering the first and second portions of the light signal after the first and second portions of the light signal propagate through the photonic bandgap fiber, thereby producing an optical interference signal. The method further comprises subjecting at least a portion of the photonic bandgap fiber to a perturbation. The method further comprises measuring variations in the optical interference signal caused by the perturbation.

In certain embodiments, an optical system is provided. The optical system comprises a light source having an output that emits a first optical signal. The optical system further comprises a directional coupler comprising at least a first port, a second port and a third port. The first port is in optically communication with the light source to receive the first optical signal emitted from the light source. The first port is in optical communication with the second port and with the third port such that the first optical signal received by the first port is split into a second optical signal that propagates to the second port and a third optical signal that propagates to the third port. The optical system further comprises a photonic bandgap fiber having a hollow core, an inner cladding generally surrounding the core, an outer cladding generally surrounding the inner cladding, and a jacket generally surrounding the outer cladding. The photonic bandgap fiber is in optical communication with the second port and with the third port. The second optical signal and the third optical signal counterpropagate through the photonic bandgap fiber and return to the third port and the second port, respectively. The photonic bandgap fiber has a phase thermal constant S less than 8 ppm per degree Celsius. The optical system further comprises an optical detector in optical communication with the directional coupler. The optical detector receives the counterpropagating second optical signal and the third optical signal after having traversed the photonic bandgap fiber.

BRIEF DESCRIPTION OF THE DRAWINGS

Various embodiments are described below in connection with the accompanying drawings, in which:

FIG. 15A schematically illustrates an experimental Michelson interferometer used to measure the thermal constant of individual fibers.

FIG. 15B schematically illustrates an experimental Michelson interferometer used to measure the error in the fringe count due to residual heating of the non-PBF portions of the interferometer.

DETAILED DESCRIPTION OF THE PREFERRED EMBODIMENT

A need exists to reduce or eliminate the noise and/or phase drift induced by Rayleigh backscattering, the Kerr effect, and the magneto-optic Faraday effect present in a fiber interferometer, as well as other accuracy-limiting effects. In accordance with certain embodiments disclosed herein, a hollow-core photonic-bandgap optical fiber is incorporated in a fiber optic sensor (e.g., a Sagnac interferometer) to improve performance or to provide other design alternatives. While certain embodiments described herein utilize a Sagnac interferometer, fiber optic sensors utilizing other types of interferometers (e.g., Mach-Zehnder interferometers, Michelson interferometers, Fabry-Perot interferometers, ring interferometers, fiber Bragg gratings, long-period fiber Bragg gratings, and Fox-Smith interferometers) can also have improved performance by utilizing a hollow-core photonic-bandgap optical fiber. Fiber optic sensors utilizing interferometry can be used to detect a variety of perturbations to at least a portion of the optical fiber. Such perturbation sensors can be configured to be sensitive to magnetic fields, electric fields, pressure, displacements, rotations, twisting, bending, or other mechanical deformations of at least a portion of the fiber.

Figure 1:
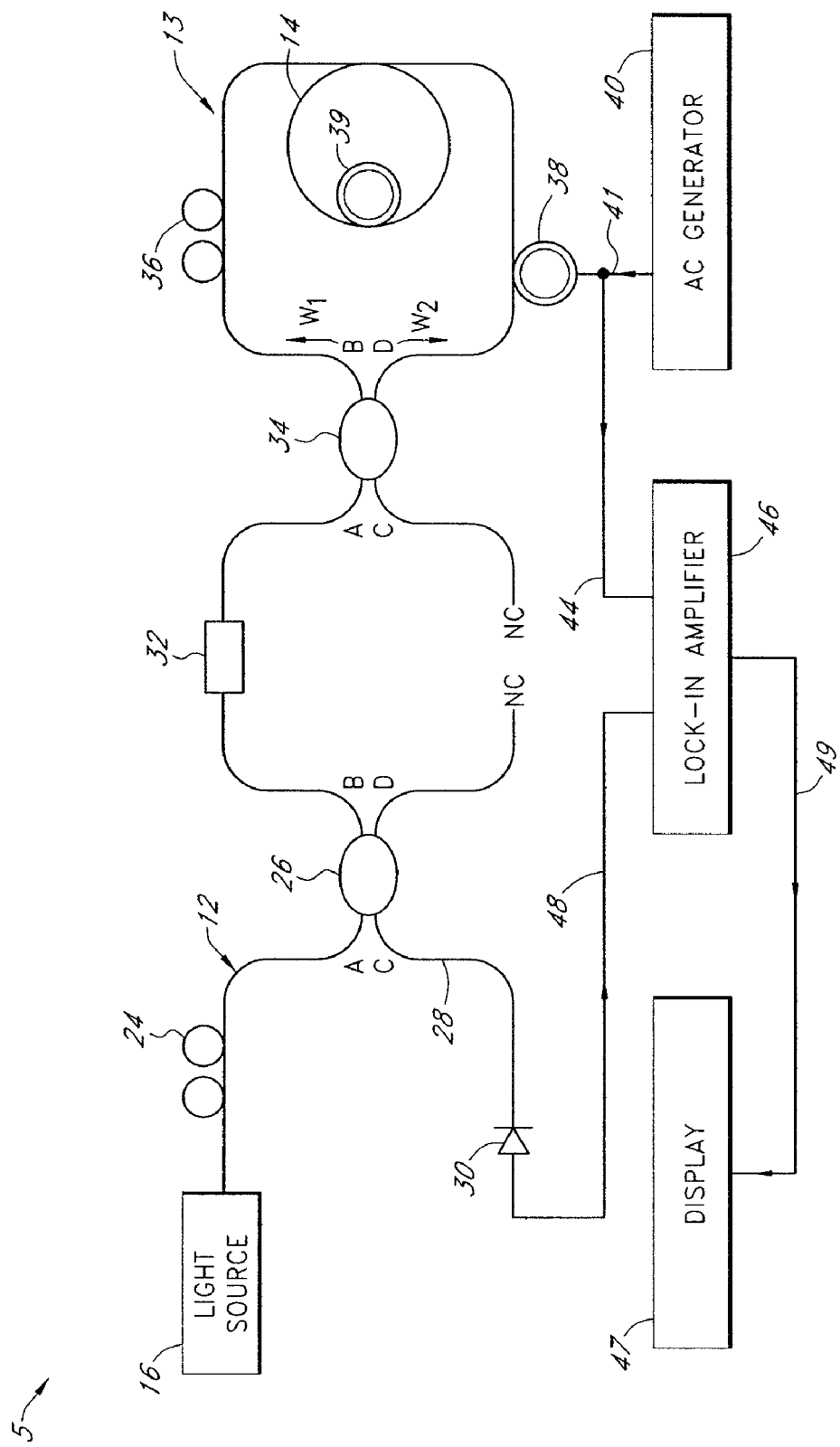
FIG. 1 is a schematic drawing of an example fiber optic sensor depicting the light source, the fiber loop, and the optical detector.

FIG. 1 illustrates an example Sagnac interferometer 5 that comprises a fiber optic system 12 that incorporates a photonic-bandgap fiber 13, which, in certain embodiments, is a hollow-core photonic-bandgap fiber. A version of a similar fiber optic system that includes a conventional optical fiber rather than a photonic-bandgap fiber is more fully described in U.S. Pat. No. 4,773,759 to Bergh et al., issued on Sep. 27, 1988, which is hereby incorporated herein by reference in its entirety.

The fiber optic system 12 includes various components positioned at various locations along the fiber optic system 12 for guiding and processing the light. Such components and their use in a Sagnac interferometer 5 are well-known. Alternative embodiments of the system 12 having similar designs or different designs may be realized by those skilled in the art and used in certain embodiments described herein.

As configured for the Sagnac rotation sensor 5 in FIG. 1, the fiber optic system 12 includes a light source 16, a fiber optic loop 14 formed with the hollow-core photonic-bandgap fiber 13 (described below in connection with FIGS. 2A and 2B), and a photodetector 30. The wavelength of the light output from the light source 16 may be approximately 1.50 to 1.58 microns, in a spectral region where the loss of silica-based optical fibers is near its minimum. Other wavelengths, however, are possible, and the wavelength of the source emission is not limited to the wavelengths recited herein. For example, if the optical fiber comprises a material other than silica, the wavelength is advantageously chosen in the range of wavelengths that minimizes or reduces the loss caused by the optical fiber. Additional detail regarding the light source of various embodiments are described in further detail below.

The fiber loop 14 in the optic fiber system 12 in certain embodiments advantageously comprises a plurality of turns of the photonic-bandgap fiber 13, which is wrapped in certain embodiments about a spool or other suitable support (not shown). By way of specific example, the loop 14 may comprise more than a thousand turns of the photonic-bandgap fiber 13 and may comprise a length of optical fiber 13 of about 1000 meters. The optical detector 30 may be one of a variety of photodetectors well known in the art, although detectors yet to be devised may be used as well.

An optional polarization controller 24 may be advantageously included in the interferometer as illustrated in FIG. 1. The optional inclusion of the polarization controller 24 depends on the design of the system 12. Example polarization controllers are described, for example, in H. C. Lefèvre, *Single-Mode Fibre Fractional Wave Devices and Polarisation Controllers, Electronics Letters*, Vol. 16, No. 20, Sep. 25, 1980, pages 778-780, and in U.S. Pat. No. 4,389,090 to Lefèvre, issued on Jun. 21, 1983, which are hereby incorporated by reference herein in their entirety. The polarization controller 24 permits adjustment of the state of polarization of the applied light. Other types of polarization controllers may be advantageously employed.

The polarization controller 24 shown in FIG. 1 is optically coupled to a port A of a directional coupler 26. The directional coupler 26 couples light received by port A to a port B and to a port D of the coupler 26. A port C on the coupler 26 is optically coupled to the photodetector 30. Light returning from the Sagnac interferometer is received by port B and is optically coupled to port A and to port C. In this manner, returning light received by port B is detected by the photodetector 30 optically coupled to port C. As shown, port D terminates non-reflectively at the point labeled "NC" (for "not connected"). An example coupler that may be used for the coupler 26 is described in detail in U.S. Pat. No. 4,536,058 to Shaw et al., issued on Aug. 20, 1985, and in European Patent Publication No. 0 038 023, published on Oct. 21, 1981, which are both incorporated herein by reference in their entirety. Other types of optical couplers, however, such as fused couplers, integrated optical couplers, and couplers comprising bulk optics may be employed as well.

Port B of the directional coupler 26 is optically coupled to a polarizer 32. After passing through the polarizer 32, the optical path of the system 12 continues to a port A of a second directional coupler 34. The coupler 34 may be of the same type as described above with respect to the first directional coupler 26 but is not so limited, and may comprise integrated-optic or bulk-optic devices. In certain embodiments, the light entering port A of the coupler 34 is divided substantially equally as it is coupled to a port B and a port D. A first portion W1 of the light exits from port B of the coupler 34 and propagates around the loop 14 in a clockwise direction as illustrated in FIG. 1. A second portion W2 of the light exits from port D of the coupler 34 and propagates around the loop 14 in a counterclockwise direction as illustrated in FIG. 1. As shown, port C of the coupler 34 terminates non-reflectively at a point labeled "NC." In certain embodiments, the second coupler 34 functions as a beam-splitter to divide the applied light into the two counterpropagating waves W1 and W2. Further, the second coupler 34 of certain embodiments also recombines the counterpropagating waves after they have traversed the loop 14. As noted above, other types of beam-splitting devices may be used instead of the fiber optic directional couplers 26, 34 depicted in FIG. 1.

The coherent backscattering noise in a fiber optic gyroscope using an asymmetrically located phase modulator to provide bias can be substantially reduced or eliminated by selecting the coupling ratio of the coupler 34 to precisely equal to 50%. See, for example, J. M. Mackintosh et al., *Analysis and observation of coupling ratio dependence of Rayleigh backscattering noise in a fiber optic gyroscope, Journal of Lightwave Technology*, Vol. 7, No. 9, September 1989, pages 1323-1328. This technique of providing a coupling efficiency of 50% can be advantageously used in the Sagnac interferometer 5 of FIG. 1 that utilizes the photonic-bandgap fiber 13 in the loop 14. In a photonic-bandgap fiber and in a Bragg fiber with a hollow (e.g., gas-filled) core, backscattering originates from three main sources. The first source is bulk scattering from the gas that fills the hollow core (as well as from the gas that fills the cladding holes), which is negligible. The second source is bulk scattering from the solid portions of the waveguide, namely the concentric rings of alternating index surrounding the core in a Bragg fiber, and the solid membranes surrounding the holes in a photonic-bandgap fiber. The third source is surface scattering occuring at the surface of the solid portions of the waveguide, in particular the solid that defines the outer edges of the core, due to irregularities on this surface, or equivalently random variations in the dimensions and shapes of these surfaces. With proper design of the fiber, surface scattering can be minimized by reducing the amplitude of these variations. Under such conditions, surface scattering dominates bulk scattering, and surface scattering is much lower that of a conventional solid-core, index-guiding single-mode fiber. The backscattering noise in the Sagnac interferometer 5 of FIG. 1 can therefore be reduced below the level provided by the inherently low Rayleigh backscattering of the photonic-bandgap fiber 13. The Sagnac interferometer 5 may be advantageously used as a fiber optic gyroscope for high-rotation-sensitivity applications that require extremely low overall noise.

The above-described technique of employing a coupler 34 with a coupling efficiency of 50% works well as long as the coupling ratio of coupler 34 remains precisely at 50%. However, as the fiber environment changes (e.g., the coupler temperature fluctuates) or as the coupler 34 ages, the coupling ratio typically varies by small amounts. Under these conditions, the condition for nulling the coherent backscattering described in the previous paragraph may not be continuously satisfied. The use of the photonic-bandgap fiber 13 in the loop 14 instead of a conventional fiber, in conjunction with this coupling technique, relaxes the tolerance for the coupling ratio to be exactly 50%. The photonic-bandgap fiber 13 also reduces the backscattering noise level arising from a given departure of the coupling ratio from its preferred value of 50%.

A polarization controller 36 may advantageously be located between the second directional coupler 34 and the loop 14. The polarization controller 36 may be of a type similar to the controller 24 or it may have a different design. The polarization controller 36 is utilized to adjust the polarization of the waves counterpropagating through the loop 14 so that the optical output signal, formed by superposition of these waves, has a polarization that will be efficiently passed, with minimal optical power loss, by the polarizer 32. Thus, by utilizing both polarization controllers, 24, 36, the polarization of the light propagating through the fiber 12 may be adjusted for maximum optical power. Adjusting the polarization controller 36 in this manner also guarantees polarization reciprocity. Use of the combination of the polarizer 32 and the polarization controllers 24, 36 is disclosed in U.S. Pat. No. 4,773,759, cited above. See also, Chapter 3 of Hervé Lefèvre, *The Fiber-Optic Gyroscope*, cited above.

In certain embodiments, a first phase modulator 38 is driven by an AC generator 40 to which it is connected by a line 41. The phase modulator 38 of certain embodiments is mounted on the optical fiber 13 in the optical path between the fiber loop 14 and the coupler 34. As illustrated in FIG. 1, the phase modulator 38 is located asymmetrically in the loop 14. Thus, the modulation of the clockwise propagating wave W1 is not necessarily in phase with the modulation of the counterclockwise propagating wave W2 because corresponding portions of the clockwise wave W1 and the counterclockwise wave W2 pass through the phase modulator at different times. Indeed, the modulation of the waves must be out of phase so that the phase modulator 38 provides a means to introduce a differential phase shift between the two waves. This differential phase shift biases the phase of the interferometer such that the interferometer exhibits a non-zero first-order sensitivity to a measurand (e.g., a small rotation rate). More particularly, the modulation of the wave W1 of certain embodiments is about 180° out of phase with the modulation of the wave W2 so that the first-order sensitivity is maximum or about maximum. Details regarding this modulation are discussed in U.S. Pat. No. 4,773,759, cited above.

In various embodiments, the amplitude and frequency of the phase applied by the loop phase modulator 38 can be selected such that the coherent backscattering noise is substantially cancelled. See, for example, J. M. Mackintosh et al., *Analysis and observation of coupling ratio dependence of Rayleigh backscattering noise in a fiber optic gyroscope*, cited above. This selection technique can be advantageously used in a fiber optic gyroscope utilizing a photonic-bandgap fiber loop. The backscattering noise can thereby be reduced below the level permitted by the inherently low Rayleigh backscattering of the photonic-bandgap fiber, which may be useful in applications requiring extremely low overall noise. Conversely, this technique for selecting amplitude and frequency of the phase applied by the loop phase modulator 38 works well as long as the amplitude and frequency of the applied phase remains precisely equal to their respective optimum value. The use of a photonic-bandgap fiber loop instead of a conventional fiber, in conjunction with this technique, relaxes the tolerance on the stability of the amplitude and frequency of the phase applied by the loop phase modulator 38. This selection technique also reduces the backscattering noise level that may occur when the amplitude, the frequency, or both the amplitude and the frequency of the modulation applied by the loop phase modulator 38 vary from their respective preferred values.

In certain embodiments, a second phase modulator 39 is mounted at the center of the loop 14. The second phase modulator 39 is driven by a signal generator (not shown). The second phase modulator 39 may advantageously be utilized to reduce the effects of backscattered light, as described, for example, in U.S. Pat. No. 4,773,759, cited above. The second phase modulator 39 may be similar to the first phase modulator 38 described above, but the second phase modulator of certain embodiments operates at a different frequency than the first phase modulator 38, and the second phase modulator 39 of certain embodiments is not synchronized with the first phase modulator 38.

In various embodiments, the photonic-bandgap fiber 13 within the loop 14 and the phase modulators 38 and 39 advantageously comprise polarization-preserving fiber. In such cases, the polarizer 32 may or may not be excluded, depending on the required accuracy of the sensor. In one embodiment, the light source 16 comprises a laser diode that outputs linearly polarized light, and the polarization of this light is matched to an eigenmode of the polarization maintaining fiber. In this manner, the polarization of the light output from the laser diode 10 may be maintained in the fiber optic system 12.

The output signal from the AC generator 40 is shown in FIG. 1 as being supplied on a line 44 to a lock-in amplifier 46, which also is connected via a line 48 to receive the electrical output of the photodetector 30. The signal on line 44 to the amplifier 46 provides a reference signal to enable the lock-in amplifier 46 to synchronously detect the detector output signal on line 48 at the modulation frequency of the phase modulator 38. Thus, the lock-in amplifier 46 of certain embodiments effectively provides a band-pass filter at the fundamental frequency of the phase modulator 38 that blocks all other harmonics of this frequency. The power in this fundamental component of the detected output signal is proportional, over an operating range, to the rotation rate of the loop 14. The lock-in amplifier 46 outputs a signal, which is proportional to the power in this fundamental component, and thus provides a direct indication of the rotation rate, which may be visually displayed on a display panel 47 by supplying the lock-in amplifier output signal to the display panel 47 on a line 49. Note that in other embodiments, the lock-in amplifier may be operated in different modes or may be excluded altogether, and the signal can be detected by alternative methods. See, for example, B. Y. Kim, *Signal Processing Techniques, Optical Fiber Rotation Sensing*, William Burns, Editor, Academic Press, Inc., 1994, Chapter 3, pages 81-114.

Optical Fibers

As is well known, conventional optical fibers comprise a high index central core surrounded by a lower index cladding. Because of the index mismatch between the core and cladding, light propagating within a range of angles along the optical fiber core is totally internally reflected at the core-cladding boundary and thus is guided by the fiber core. Typically, although not always, the fiber is designed such that a substantial portion of the light remains within the core. As described below, the photonic-bandgap fiber 13 in the optical loop 14 also acts as a waveguide; however, the waveguide is formed in a different manner, and its mode properties are such that various effects that limit the performance of a fiber interferometer that uses conventional fiber (e.g., a Sagnac interferometer) can be reduced by using the photonic-bandgap fiber 13 in portions of the fiber optic system 12, particularly in the optical loop 14.

Figure 2A:
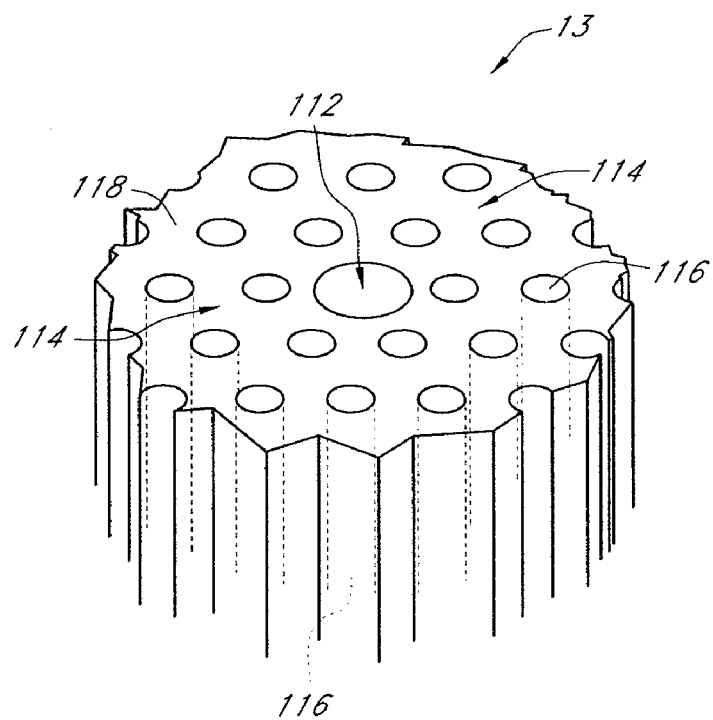
FIG. 2A is a partial perspective view of the core and a portion of the surrounding cladding of an example hollow-core photonic-bandgap fiber that can be used in the example fiber optic sensor.
Figure 2B:
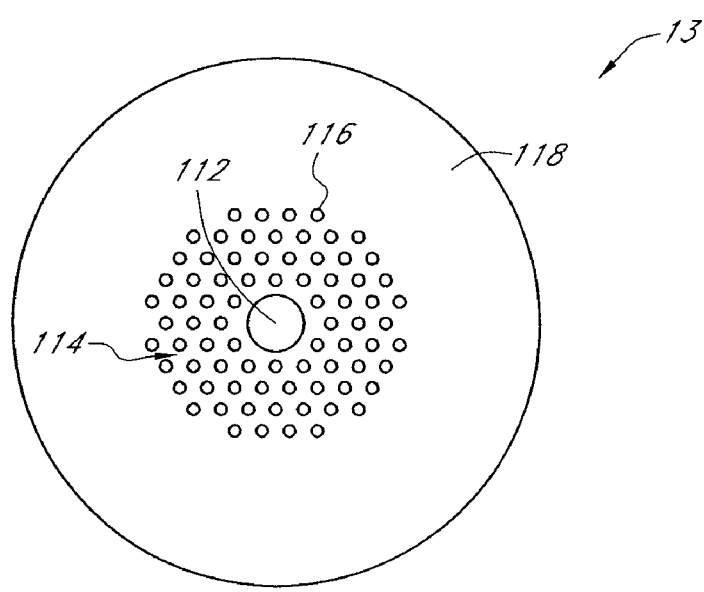
FIG. 2B is a cross-sectional view of the example hollow-core photonic-bandgap fiber of FIG. 2A showing more of the features in the cladding arranged in a pattern around the hollow core.

An example hollow-core photonic-bandgap fiber 13 is shown in FIGS. 2A and 2B. Hollow-core photonic-bandgap fibers (photonic crystal fibers) are well-known. See, for example, U.S. Pat. No. 5,802,236 to DiGiovanni et al, issued on Sep. 1, 1998, for Article Comprising a Microstructure Optical Fiber, and Method of Making such Fiber; U.S. Pat. No. 6,243,522 to Allen et al., issued on Jun. 5, 2001, for Photonic Crystal Fibers; U.S. Pat. No. 6,260,388 to Borrelli et al., issued on Jul. 17, 2001, for Method of Fabricating Photonic Glass Structures by Extruding, Sintering and Drawing; U.S. Pat. No. 6,334,017 to West et al, issued on Dec. 25, 2001, for Ring Photonic Crystal Fibers; and U.S. Pat. No. 6,334,019 to Birks et al., issued on Dec. 25, 2001, for Single Mode Optical Fiber, which are hereby incorporated herein by reference in their entirety.

As illustrated in FIGS. 2A and 2B, the hollow-core photonic-bandgap fiber 13 includes a central core 112. A cladding 114 surrounds the core 112. Unlike the central core of conventional fiber, the central core 112 of the fiber 13 of certain embodiments is hollow. The open region within the hollow core 112 may be evacuated or it may be filled with air or other gases. The cladding 114 includes a plurality of features 116 arranged in a periodic pattern so as to create a photonic-bandgap structure that confines light to propagation within the hollow core 112. For example, in the example fiber 13 of FIGS. 2A and 2B, the features 116 are arranged in a plurality of concentric triangles around the hollow core 112. The two innermost layers of holes in the example pattern are shown in the partial perspective view of FIG. 2A. A complete pattern of four concentric layers of holes is illustrated in the cross-sectional view of FIG. 2B. Although the illustrated hole pattern is triangular, other arrangements or patterns may advantageously be used. In addition, the diameter of the core 112 and the size, shape, and spacing of the features 116 may vary.

As illustrated by phantom lines in FIG. 2A, the features 116 may advantageously comprise a plurality of hollow tubes 116 formed within a matrix material 118. The hollow tubes 116 are mutually parallel and extend along the length of the photonic-bandgap fiber 13 such that the tubes 116 maintain the triangular grid pattern shown in FIG. 2B. The matrix material 118 that surrounds each of the tubes 116 comprises, for example, silica, silica-based materials or various other materials well known in the art, as well as light-guiding materials yet to be developed or applied to photonic-bandgap technology.

The features (e.g., holes) 116 are specifically arranged to create a photonic-bandgap. In particular, the distance separating the features 116, the symmetry of the grid, and the size of the features 116 are selected to create a photonic bandgap where light within a range of frequencies will not propagate within the cladding 114 if the cladding was infinite (i.e., in the absence of the core 112). The introduction of the core 112, also referred to herein as a "defect," breaks the symmetry of this original cladding structure and introduces new sets of modes in the fiber 13. These modes in the fiber 13 have their energy guided by the core and are likewise referred to as core modes. The array of features (e.g., holes) 116 in certain embodiments is specifically designed so as to produce a strong concentration of optical energy within the hollow core 112. In certain embodiments, light propagates substantially entirely within the hollow core 112 of the fiber 13 with very low loss. Exemplary low loss air core photonic band-gap fiber is described in N. Venkataraman et al., *Low Loss (13 dB/km) Air Core Photonic Band-Gap Fibre, Proceedings of the European Conference on Optical Communication, ECOC* 2002, Post-deadline Paper No. PD1.1, September 2002.

In various embodiments, the fiber parameters are further selected so that the fiber is "single mode" (i.e., such that the core 112 supports only the fundamental core mode). This single mode includes in fact the two eigenpolarizations of the fundamental mode. The fiber 13 therefore supports two modes corresponding to both eigenpolarizations. In certain embodiments, the fiber parameters are further selected so that the fiber is a single-polarization fiber having a core that supports and propagates only one of the two eigenpolarizations of the fundamental core mode. In certain embodiments, the fiber is a multi-mode fiber.

Other types of photonic-bandgap fibers or photonic-bandgap devices, both known and yet to be devised, may be employed in the Sagnac rotation sensors as well as interferometers employed for other purposes. For example, one other type of photonic-bandgap fiber that may be advantageously used is a Bragg fiber.

In accordance with certain embodiments disclosed herein, a Bragg fiber is incorporated in a fiber optic sensor (e.g., a Sagnac interferometer) to improve performance or to provide other design alternatives. While certain embodiments described herein utilize a Sagnac interferometer, fiber optic sensors utilizing other types of interferometers (e.g., Mach-Zehnder interferometers, Michelson interferometers, Fabry-Perot interferometers, ring interferometers, fiber Bragg gratings, long-period fiber Bragg gratings, and Fox-Smith interferometers) can also have improved performance by utilizing a Bragg fiber. Fiber optic sensors utilizing interferometry can be used to detect a variety of perturbations to at least a portion of the optical fiber. Such perturbation sensors can be configured to be sensitive to magnetic fields, electric fields, pressure, displacements, rotations, twisting, bending, or other mechanical deformations of at least a portion of the fiber.

A Bragg fiber includes a cladding surrounding a core, wherein the core-cladding boundary comprises a plurality of thin layers of materials with alternating high and low refractive indices. In various embodiments, the cladding interface (i.e., the core-cladding boundary) comprises a plurality of concentric annular layers of material surrounding the core. The thin layers act as a Bragg reflector and contains the light in the low-index core. For example, the core of certain embodiments is hollow (e.g., containing a gas or combination of gases, such as air). Bragg fibers are described, for example, in P. Yeh et al., *Theory of Bragg Fiber, Journal of Optical Society of America*, Vol. 68, 1978, pages 1197-1201, U.S. Pat. No. 7,190,875, U.S. Pat. No. 6,625,364, and U.S. Pat. No. 6,463,200, each of which is incorporated herein by reference in its entirety. For a Bragg fiber, the amount of backscattering and backreflection at the interface with a conventional fiber can be different from that for other types of photonic-bandgap fibers. For angled connections, the amount of backreflection from the interface of a Bragg fiber and a conventional fiber can depend on the angle, wavelength, and spatial orientation in different ways than for other types of photonic-bandgap fibers. Furthermore, as described more fully below, in certain embodiments, a Bragg fiber advantageously provides reduced phase sensitivity to temperature fluctuations.

The accuracy of a fiber optic gyroscope (FOG) is generally limited by a small number of deleterious effects that arise from undesirable properties of the loop fiber, namely Rayleigh backscattering, the Kerr, Faraday, and thermal (Shupe) effects. These effects induce short-term noise and/or long-term drift in the gyroscope output, which limit the ability to accurately measure small rotation rates over long periods of time. The small uncorrected portions of these deleterious effects constitute one of the main remaining obstacles to an inertial-navigation FOG.

The use of hollow-core photonic-bandgap fiber instead of conventional optical fiber in a Sagnac interferometer may substantially reduce noise and error introduced by Rayleigh backscattering, the Kerr effect, and the presence of magnetic fields. In hollow-core photonic-bandgap fiber, the optical mode power is mostly confined to the hollow core, which may comprise, for example, air, another gas, or vacuum. Rayleigh backscattering as well as Kerr nonlinearity and the Verdet constant are substantially less in air, other gases, and vacuum than in silica, silica-based materials, and other solid optical materials. The reduction of these effects coincides with the increased fraction of the optical mode power contained in the hollow core of the photonic-bandgap fiber.

The Kerr effect and the magneto-optic effect tend to induce a long-term drift in the bias point of the Sagnac interferometer, which results in a drift of the scale factor correlating the phase shift with the rotation rate applied to the fiber optic gyroscope. In contrast, Rayleigh backscattering tends to introduce mostly short-term noise in the measured phase, thereby raising the minimum detectable rotation rate. Each of these effects interferes with the extraction of the desired information from the detected optical signal. The incorporation of the hollow-core photonic-bandgap fiber 13 into the interferometer 5 in certain embodiments advantageously diminishes these effects.

A parameter, $\eta_{nl}$, is defined herein as the fractional amount of fundamental mode intensity squared in the solid portions of the photonic-bandgap fiber. Similarly, a parameter, $\eta$, is defined herein as the fractional amount of fundamental mode power in the solid portions of the photonic-bandgap fiber. The phase drift caused by the Kerr nonlinearity is proportional to the parameter $\eta_{nl}$, and the phase drift caused by the magneto-optic effect, as well as the noise introduced by Rayleigh backscattering, are each proportional to the parameter, $\eta$, provided that $\eta$ is not too small. An analysis of the effect of $\eta_{nl}$ is set forth below for the Kerr effect. Similar analyses can be performed for Rayleigh backscattering and the magneto-optic Faraday effects, using the parameter $\eta$.

Kerr Effect

Since some of the mode energy resides in the holes including the core of the photonic-bandgap fiber and some of mode energy resides in the solid portions of the fiber (typically a silica-based glass), the Kerr effect in a photonic-bandgap fiber (PBF) includes two contributions. One contribution is from the solid portions of the fiber, and one contribution is from the holes. The residual Kerr constant of a photonic-bandgap fiber, $n_{2,PBF}$, can be expressed as the sum of these two contributions according to the following equation:

$$n_{2,PBF} = n_{2,solid}\eta_{nl} + n_{2,holes}(1-\eta_{nl}) \quad (1)$$

where $n_{2,solid}$ is the Kerr constant for the solid portion of the fiber, which may comprise for example silica, and where $n_{2,holes}$ is the Kerr constant for the holes, which may be, for example, evacuated, gas-filled, or air-filled. If the holes are evacuated, the Kerr nonlinearity is zero because the Kerr constant of vacuum is zero. With the Kerr constant equal to zero, the second contribution corresponding to the term $n_{2,holes}(1-\eta_{nl})$ in Equation (1) is absent. In this case, the Kerr nonlinearity is proportional to the parameter, $\eta_{nl}$, as indicated by the remaining term $n_{2,solid}\eta_{nl}$. However, if the holes are filled with air, which has small but finite Kerr constant, both terms $(n_{2,solid}\eta_{nl} + n_{2,holes}(1-\eta_{nl}))$ are present. Equation (1) above accounts for this more general case.

In certain embodiments, the parameter $\eta_{nl}$ is equal to $A_{eff}/A_{eff,silica}$, where $A_{eff}$ and $A_{eff,silica}$ are the mode effective area and mode effective area in silica, respectively. These quantities can be computed as follows:

$$A_{eff} = \frac{1}{n_g^2} \frac{\left(\iint_{Waveguide cross-section} \varepsilon_r(x,y)E(x,y)^2 dx dy\right)^2}{\iint_{Waveguide cross-section} E(x,y)^4 dx dy}$$

$$A_{eff,silica} = \frac{1}{n_g^2} \frac{\left(\iint_{Waveguide cross-section} \varepsilon_r(x,y)E(x,y)^2 dx dy\right)^2}{\iint_{silica} E(x,y)^4 dx dy}$$

where $n_g$ is the mode group velocity, $\varepsilon_r$ is the relative permittivity, and E is the electric field of the mode. Note that the parameter $\eta_{nl}$ is the fractional amount of fundamental mode intensity squared in the solid portions of the photonic-bandgap fiber, not the fractional amount of fundamental mode power in the solid portions of the photonic-bandgap fiber, which is the regular definition of $\eta$ and which is valid for the other properties of the photonic-bandgap fiber.

For standard silica fiber, the percentage of the optical mode contained in the cladding is generally in the range of 10% to 20%. In the hollow-core photonic-bandgap fiber 13, the percentage of the optical mode in the cladding 114 is estimated to be about 1% or substantially less. Accordingly, in the photonic-bandgap fiber 13, the effective nonlinearity due to the solid portions of the fiber may be decreased by a factor of approximately 20. According to this estimate, by using the hollow-core photonic-bandgap fiber 13, the Kerr effect can be reduced by at least one order of magnitude, and can be reduced much more with suitable design. Indeed, measurements indicate that the photonic-bandgap fibers can be designed with a parameter $\eta_{nl}$ small enough that the Kerr constant of the solid portion of the fiber, $n_{2,solid}$, is negligible compared to the hole contribution, $n_{2,holes}(1-\eta_{nl})$. Even in the case where $n_{2,solid}$ is much larger than $n_{2,holes}$, the fiber can be designed in such a way that $\eta_{nl}$ is sufficiently small that $n_{2,holes}(1-\eta_{nl})$ is larger than $n_{2,solid}\eta_{nl}$. See, for example, D. G. Ouzounov et al., *Dispersion and nonlinear propagation in air-core photonic-bandgap fibers*, Proceedings of the Conf. on Lasers and Electro-optics, Paper CThV5, June 2003.

Backscattering and Magneto-Optic Effects

A relationship similar to Equation (1) applies to Rayleigh backscattering and magneto-optic Faraday effect. Accordingly, Equation (1) can be written in the following more general form to encompass Rayleigh backscattering and the magneto-optic Faraday effect as well as the Kerr effect:

$$F_{PBF} = F_{solid}\eta + F_{holes}(1-\eta) \quad (2)$$

In Equation (2), F corresponds to any of the respective coefficients, the Kerr constant $n_2$, the Verdet constant V, or the Rayleigh scattering coefficient $\alpha_s$. The terms $F_{PBF}$, $F_{solid}$, and $F_{holes}$ represent the appropriate constant for the photonic-bandgap fiber, for the solid material, and for the holes, respectively. For example, when the Kerr constant $n_2$ is substituted for F, Equation (2) becomes Equation (1). When the Verdet constant V is substituted for F, Equation (2) describes the effective Verdet constant of a photonic-bandgap fiber.

The first term of Equation (2), $F_{solid}\eta$, arises from the contribution of the solid portion of the fiber, and the second term $F_{holes}(1-\eta)$ arises from the contribution of the holes. In a conventional fiber, only the first term is present. In a photonic-bandgap fiber, both the term for the solid portion, $F_{solid}\eta$, and the term for the hollow portion, $F_{holes}(1-\eta)$, generally contribute. The contributions of these terms depend on the relative percentage of mode power in the solid, which is quantified by the parameter $\eta$. As discussed above, if $\eta$ is made sufficiently small through appropriate fiber design, for example, the first term $F_{solid}\eta$ can be reduced to a negligible value and the second term $F_{holes}(1-\eta)$ dominates. This is beneficial because $F_{holes}$ is much smaller than $F_{solid}$, which means that the second term is small and thus F is small. This second term $F_{holes}(1-\eta)$ can be further reduced by replacing the air in the holes with a gas having a reduced Kerr constant $n_2$, a reduced Verdet constant V, a reduced Rayleigh scattering coefficient $\alpha_s$, or reduced values of all or some of these coefficients. This second term $F_{holes}(1-\eta)$ can be reduced to zero if the holes in the fiber are evacuated.

As discussed above, the solid contributions to the Rayleigh backscattering, the Kerr-induced phase error, and the magnetic-field-induced phase shift on the optical signal can be decreased by reducing the parameter $\eta$ and $\eta_{nl}$. Accordingly, the photonic-bandgap fiber is designed so as to reduce these parameters in order to diminish the solid contributions of Rayleigh backscattering, Kerr nonlinearity, and the magnetic field effects proportionally. For example, in particular designs of the hollow-core photonic-bandgap fiber, the value of $\eta$ may be about 0.003 or lower, although this range should not be construed as limiting. In addition to this bulk scattering contribution, surface scattering can provide a larger contribution.

As described above, Rayleigh backscattering in an optical fiber creates a reflected wave that propagates through the fiber in the direction opposite the original direction of propagation of the primary wave that produces the backscattering. Since such backscattered light is coherent with the light comprising the counterpropagating waves W1, W2, the backscattered light interferes with the primary waves and thereby adds intensity noise to the signal measured by the detector 30.

Backscattering is reduced in certain embodiments by employing the hollow-core photonic-bandgap fiber 13 in the loop 14. As described above, the mode energy of the optical mode supported by the hollow-core photonic-bandgap fiber 13 is substantially confined to the hollow core 112. In comparison to conventional solid-core optical fibers, less scattering results for light propagating through vacuum, air, or gas in the hollow core 112.

By increasing the relative amount of mode energy in the holes (including the hollow core) and reducing the amount of mode energy in the solid portion of the fiber, backscattering in certain embodiments is reduced. Accordingly, by employing the photonic-bandgap fiber 13 in the loop 14 of the fiber optic system 12, backscattering can be substantially reduced.

A hollow-core fiber in certain embodiments also reduces the effect of a magnetic field on the performance of the interferometer. As discussed above, the Verdet constant is smaller in air, gases, and vacuum than in solid optical materials such as silica-based glasses. Since a large portion of the light in a hollow-core photonic-bandgap fiber propagates in the hollow core, the magneto-optic-induced phase error is reduced. Thus, less magnetic-field shielding is needed.

Light Sources

Laser light comprising a number of oscillatory modes, or frequencies, e.g., light from a superfluorescent fiber source (SFS), may also be used in the rotation sensing device described herein to provide a lower rotation rate error than is possible with light from a single-frequency source under similar conditions. Multimode lasers may also be employed in some embodiments. In particular, the Kerr-induced rotation rate error is inversely proportional to the number of oscillating modes in the laser because multiple frequency components cause the self-phase modulation and cross-phase modulation terms in the Kerr effect to at least partially average out, thereby reducing the net Kerr-induced phase error. A mathematical analysis of this phenomena and examples of reductions in the Kerr-induced phase error are disclosed in U.S. Pat. No. 4,773,759, cited above.

Although a superfluorescent light source may be used with the fiber optic system 12 of FIG. 1, the system 12 of certain embodiments incorporates a light source 16 that outputs light having a substantially fixed single frequency. Because the scale factor of a fiber optic gyroscope depends on the source mean wavelength, random variations in this wavelength will lead to random variations in the wavelength factor, which introduces undesirable error in the measured rotation rate. Light sources having a substantially stable output wavelength have been developed for telecommunications applications, and these sources are thus available for use in fiber optic rotation sensing systems. These light sources, however, are typically narrowband sources. Accordingly, utilization of these narrowband stable-frequency light sources with a conventional optical fiber would be inconsistent with the above-described use of broadband multimode laser sources to compensate for the Kerr effect.

Figure 3:
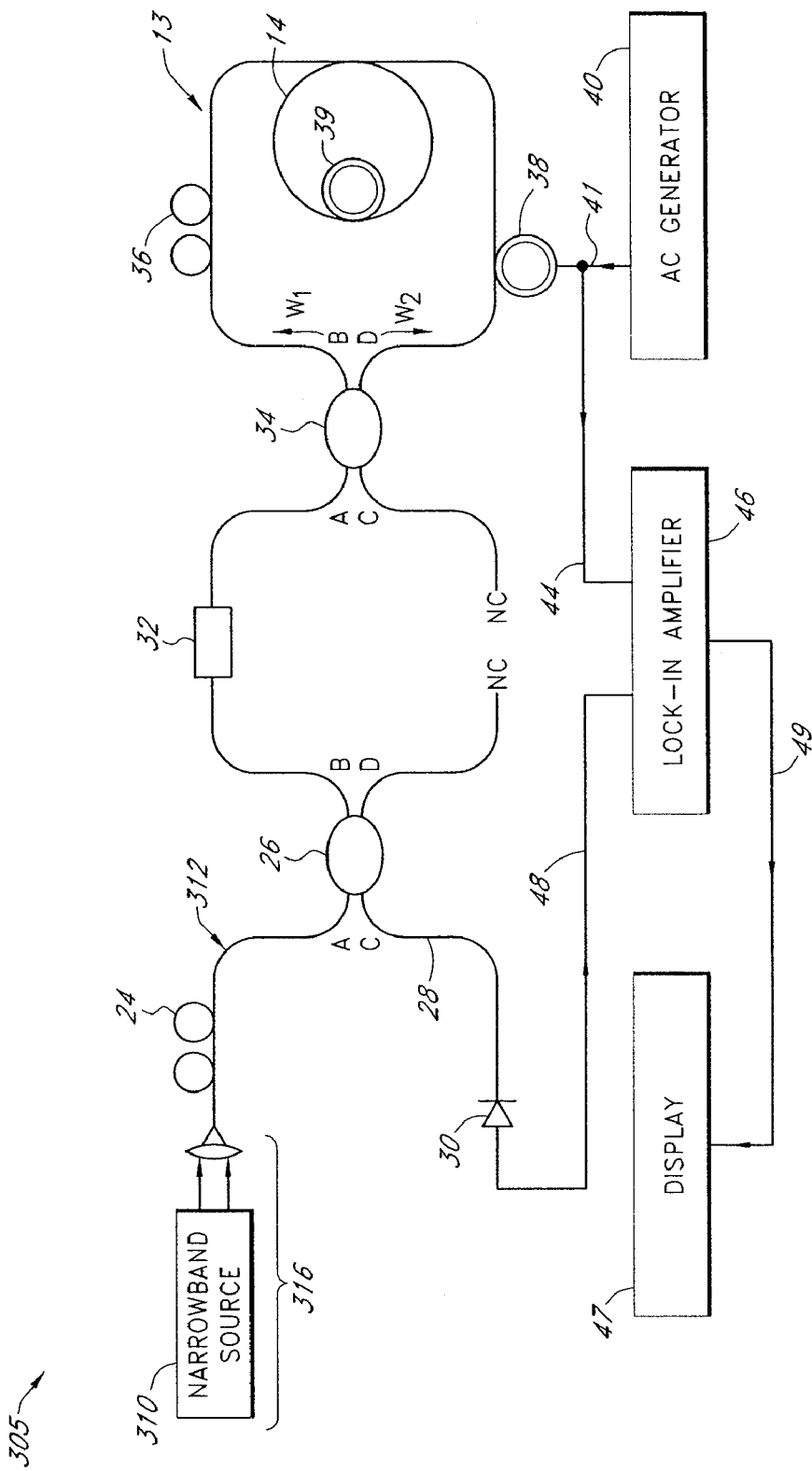
FIG. 3 is a schematic drawing of an example Sagnac interferometer wherein the light source comprises a narrowband light source.

However, FIG. 3 illustrates an interferometer 305 in accordance with certain embodiments described herein that can achieve a substantially stable wavelength while reducing the Kerr contributions to the drift in the interferometer bias. The interferometer 305 comprises an optical fiber system 312 that includes a stable-frequency narrowband light source 316 in combination with the hollow-core photonic-bandgap fiber 13. By introducing the hollow-core photonic-bandgap fiber 13 into the fiber optic system 312, the conventionally available narrowband light source 316 having a substantially stable-frequency output can be advantageously used. The Sagnac interferometer 305 in FIG. 3 is similar to the Sagnac interferometer 5 of FIG. 1, and like elements from FIG. 1 are identified with like numbers in FIG. 3. As described above with respect to the fiber optic system 12 of FIG. 1, the fiber optic system 312 of FIG. 3 also includes an optical loop 14 that comprises a length of the hollow-core photonic bandgap fiber 13. The narrowband light source 316 advantageously comprises a light-emitting device 310 such as a laser or other coherent light source. Examples of a light-emitting laser 310 include a laser diode, a fiber laser, or a solid-state laser. In certain embodiments, operating the FOG with a narrow-band laser diode advantageously offers significant advantages over the current broadband sources, including a far greater wavelength stability and thus scale-factor stability, and possibly a lower cost. Other lasers or other types of narrowband light sources may also be advantageously employed in other embodiments. In some embodiments, the narrowband light source 316 outputs light having an example FWHM spectral bandwidth of about 1 GHz or less, of about 100 MHz or less, or about 10 MHz or less. Light sources having bandwidths outside the cited ranges may also be included in other embodiments.

As discussed above, the light source 316 of certain embodiments operates at a stable wavelength. The output wavelength may, for example, not deviate more than about $\pm 10^{-6}$ (i.e., $\pm 1$ part per million (ppm)) in some embodiments. The wavelength instability is about $\pm 10^{-7}$ (i.e., $\pm 0.1$ ppm) or lower in certain embodiments. Narrowband light sources that offer such wavelength stability, such as the lasers produced widely for telecommunication applications, are currently available. Accordingly, as a result of the use of a stable-wavelength light source, the stability of the Sagnac interferometer scale factor is enhanced.

A narrowband light source will also result in a longer coherence length in comparison with a broadband light source and will thus increase the contribution of noise produced by coherent backscattering. For example, if the clockwise propagating light signal W1 encounters a defect in the loop 14, the defect may cause light from the light signal W1 to backscatter in the counterclockwise direction. The backscattered light will combine and interfere with light in the counterclockwise propagating primary light signal W2. Interference will occur between the backscattered W1 light and the counterclockwise primary light W2 if the optical path difference traveled by these two light signals is approximately within one coherence length of the light. For scatter points farther away from the center of the loop 14, this optical path difference will be largest. A larger coherence length therefore causes scatter points farther and farther away from the center of the loop 14 to contribute to coherent noise in the optical signal, which increases the noise level.

In certain embodiments, a coherence length which is less than the length of the optical path from port B of the coupler 34 to port D would reduce the magnitude of the coherent backscatter noise. However, a narrowband light source, such as the narrowband source 316, has a considerably longer coherence length than a broadband light source and thus will cause more coherent backscatter if a conventional optical fiber is used instead of the photonic-bandgap fiber 13 in the embodiment of FIG. 3. However, by combining the use of the stable-frequency narrowband light source 316 with the hollow-core photonic-bandgap fiber 13 as shown in FIG. 3, the coherent backscattering can be decreased because the hollow-core photonic-bandgap fiber 13 reduces scattering as described above. The bandwidth of the narrowband source 316 of certain embodiments is selected such that the optical power circulating in either direction through the optical loop 14 is smaller than the threshold power for stimulated Brillouin scattering calculated for the specific fiber used in the coil.

By employing the narrowband stable wavelength optical source 316 in conjunction with the hollow-core photonic-bandgap fiber 13 in accordance with FIG. 3, scale factor instability resulting from the fluctuating source mean wavelength can be decreased while reducing the contributions of the Kerr nonlinearities as well as coherent backscattering.

If the Kerr effect is still too large and thus introduces a detrimental phase drift that degrades the performance of the fiber optic system 312 of FIG. 3, other methods can also be employed to reduce the Kerr effect. One such method is implemented in a Sagnac interferometer 405 illustrated in FIG. 4. The Sagnac interferometer 405 includes a fiber optic system 412 and a narrowband source 416. The narrowband source 416 of FIG. 4 comprises a light-emitting device 410 in combination with an amplitude modulator 411. The light-emitting device 410 may advantageously be similar to or the same as the light-emitting device 310 of FIG. 3. The optical signal from the light-emitting device 310 is modulated by the amplitude modulator 411. In certain embodiments, the amplitude modulator 411 produces a square-wave modulation, and, in certain embodiments, the resulting light output from the narrowband source 416 has a modulation duty cycle of about 50%. The modulation is maintained in certain embodiments at a sufficiently stable duty cycle. As discussed, for example, in U.S. Pat. No. 4,773,759, cited above, and in R. A. Bergh et al, *Compensation of the Optical Kerr Effect in Fiber-Optic Gyroscopes, Optics Letters*, Vol. 7, 1992, pages 282-284, such square-wave modulation effectively cancels the Kerr effect in a fiber-optic gyroscope. Alternatively, as discussed, for example, in Hervé Lefèvre, *The Fiber-Optic Gyroscope*, cited above, other modulations that produce a modulated signal with a mean power equal to the standard deviation of the power can also be used to cancel the Kerr effect. For example, the intensity of the light output from the light source 416 may be modulated by modulating the electrical current supplied to the light-emitting device 410.

Figure 4:
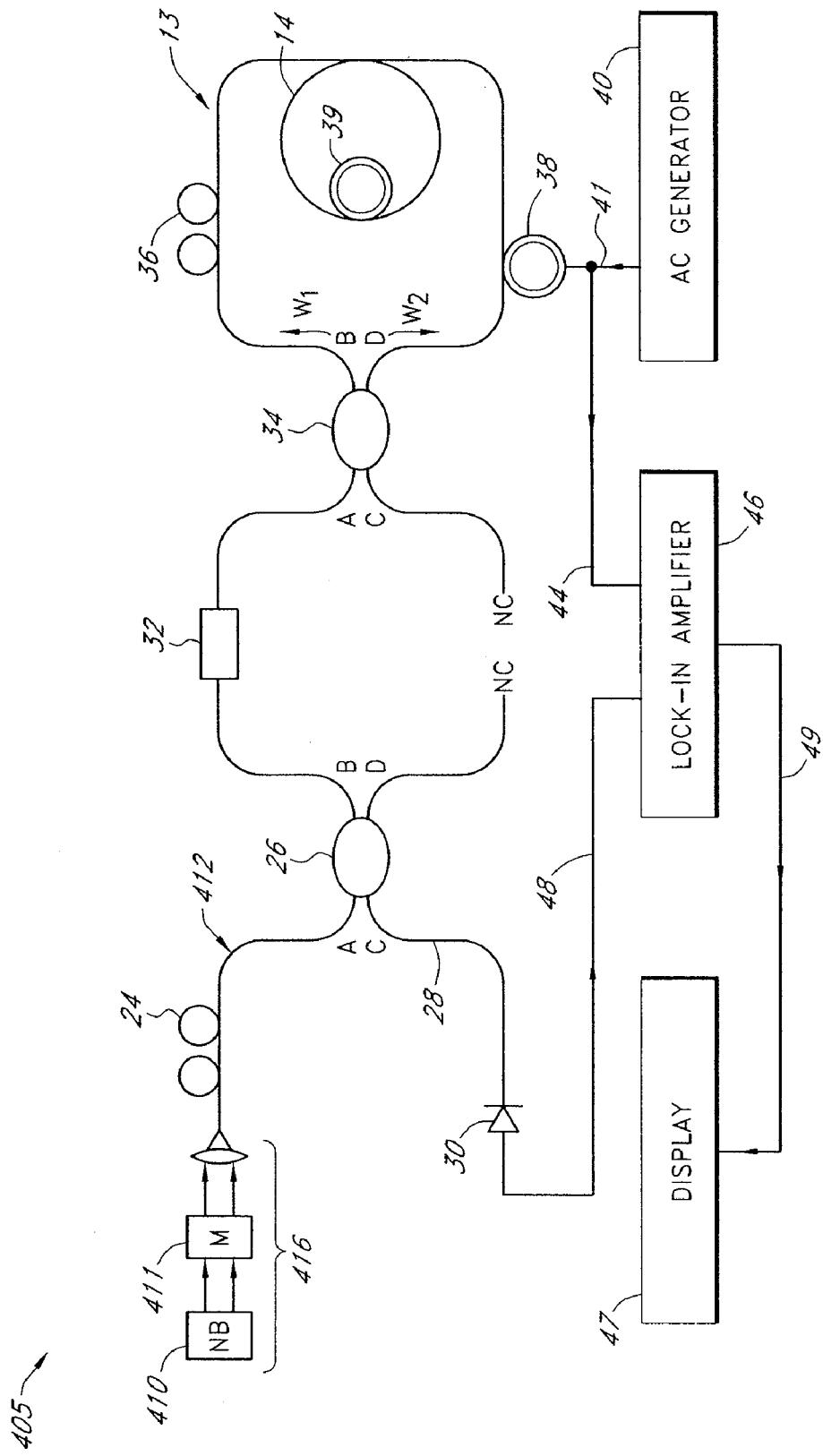
FIG. 4 is a schematic drawing of an example Sagnac interferometer driven by a narrowband light source with a modulator for modulating the amplitude of the narrowband light source.

In certain embodiments, other techniques can be employed in conjunction with the use of a narrowband light source 416 of FIG. 4, for example, to reduce noise and bias drift. For example, frequency components can be added to the narrowband light source 416 by frequency or phase modulation to effectively increase the bandwidth to an extent. If, for example, the narrowband light source 416 has a linewidth of about 100 MHz, a 10-GHz frequency modulation will increase the laser linewidth approximately 100 times, to about 10 GHz. Although a 10-GHz modulation is described in this example, the frequency modulation does not need to be limited to 10 GHz, and may be higher or lower in different embodiments. The phase noise due to Rayleigh backscattering is inversely proportional to the square root of the laser linewidth. Accordingly, an increase in linewidth of approximately 100 fold results in a 10-fold reduction in the short-term noise induced by Rayleigh backscattering. Refinements in the design of the photonic-bandgap fiber 13 to further reduce the parameter η can also be used to reduce the noise due to Rayleigh scattering to acceptable levels.

Figure 5:
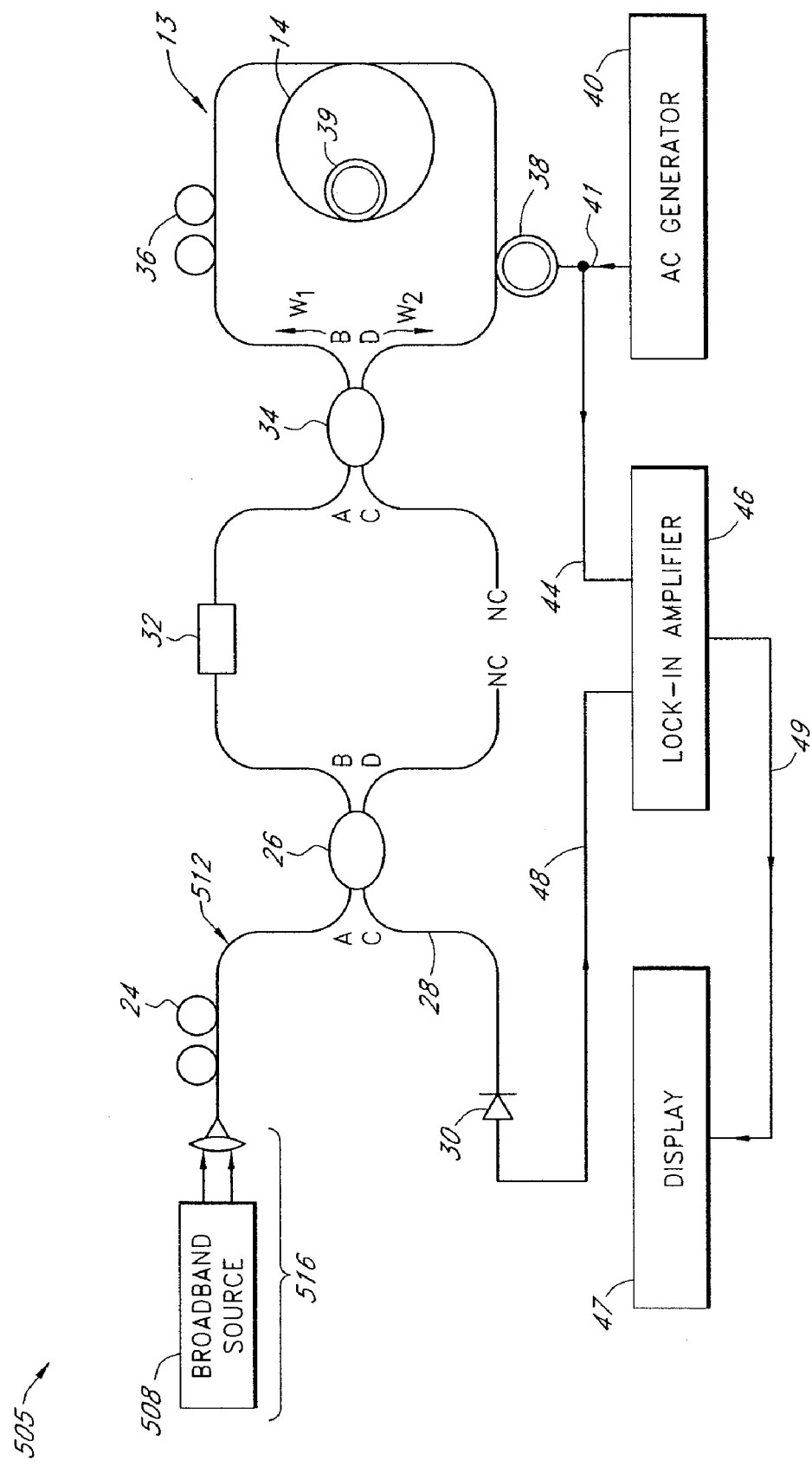
FIG. 5 is a schematic drawing of an example Sagnac interferometer wherein the light source comprises a broadband light source.

FIG. 5 illustrates an embodiment of a Sagnac interferometer 505 that incorporates a broadband source 516 that may be advantageously used in conjunction with the hollow-core photonic-bandgap fiber 13 in an optical fiber system 512 in order to mitigate Kerr non-linearity, Rayleigh backscattering and magnetic-field effects. Accordingly, the bias drift as well as the short-term noise can be reduced in comparison to systems utilizing narrowband light sources.

The broadband light source 516 advantageously comprises a broadband light-emitting device 508 such as, for example, a broadband fiber laser or a fluorescent light source. Fluorescent light sources include light-emitting diodes (LEDs), which are semiconductor-based sources, and superfluorescent fiber sources (SFS), which typically utilize a rare-earth-doped fiber as the gain medium. An example of a broadband fiber laser can be found in K. Liu et al., *Broadband Diode-Pumped Fiber Laser, Electron. Letters*, Vol. 24, No. 14, July 1988, pages 838-840. Erbium-doped superfluorescent fiber sources can be suitably employed as the broadband light-emitting device 508. Several configurations of superfluorescent fiber sources are described, for example, in *Rare Earth Doped Fiber Lasers and Amplifiers*, Second Edition, M. J. F. Digonnet, Editor, Marcel Dekker, Inc., New York, 2001, Chapter 6, and references cited therein. This same reference and other references well-known in the art disclose various techniques that have been developed to produce Er-doped superfluorescent fiber sources with highly stable mean wavelengths. Such techniques are advantageously used in various embodiments to stabilize the scale factor of the Sagnac interferometer 505. Other broadband light sources 516 may also be used.

In certain embodiments, the broadband light source 516 outputs light having a FWHM spectral bandwidth of, for example, at least about 1 nanometer. In other embodiments, the broadband light source 516 outputs light having a FWHM spectral bandwidth of, for example, at least about 10 nanometers. In certain embodiments, the spectral bandwidth may be more than 30 nanometers. Light sources having bandwidths outside the described ranges may be included in other embodiments.

In certain embodiments, the bandwidth of the broadband light source can be reduced to relax design constraints in producing the broadband source. Use of the hollow-core photonic-bandgap fiber 13 in the Sagnac interferometer 505 may at least partially compensate for the increased error resulting from reducing the number of spectral components that would otherwise be needed to help average out the backscatter noise and other detrimental effects. The Sagnac interferometer 505 has less noise as a result of Kerr compensation and reduced coherent backscattering. In certain embodiments, the fiber optic system 512 operates with enhanced wavelength stability. The system 512 also possesses greater immunity to the effect of magnetic fields and may therefore employ less magnetic shielding.

The fiber optic system 512 of FIG. 5 advantageously counteracts phase error and phase drift, and it provides a high level of noise reduction. This enhanced accuracy may exceed requirements for current navigational and non-navigational applications.

Figure 6:
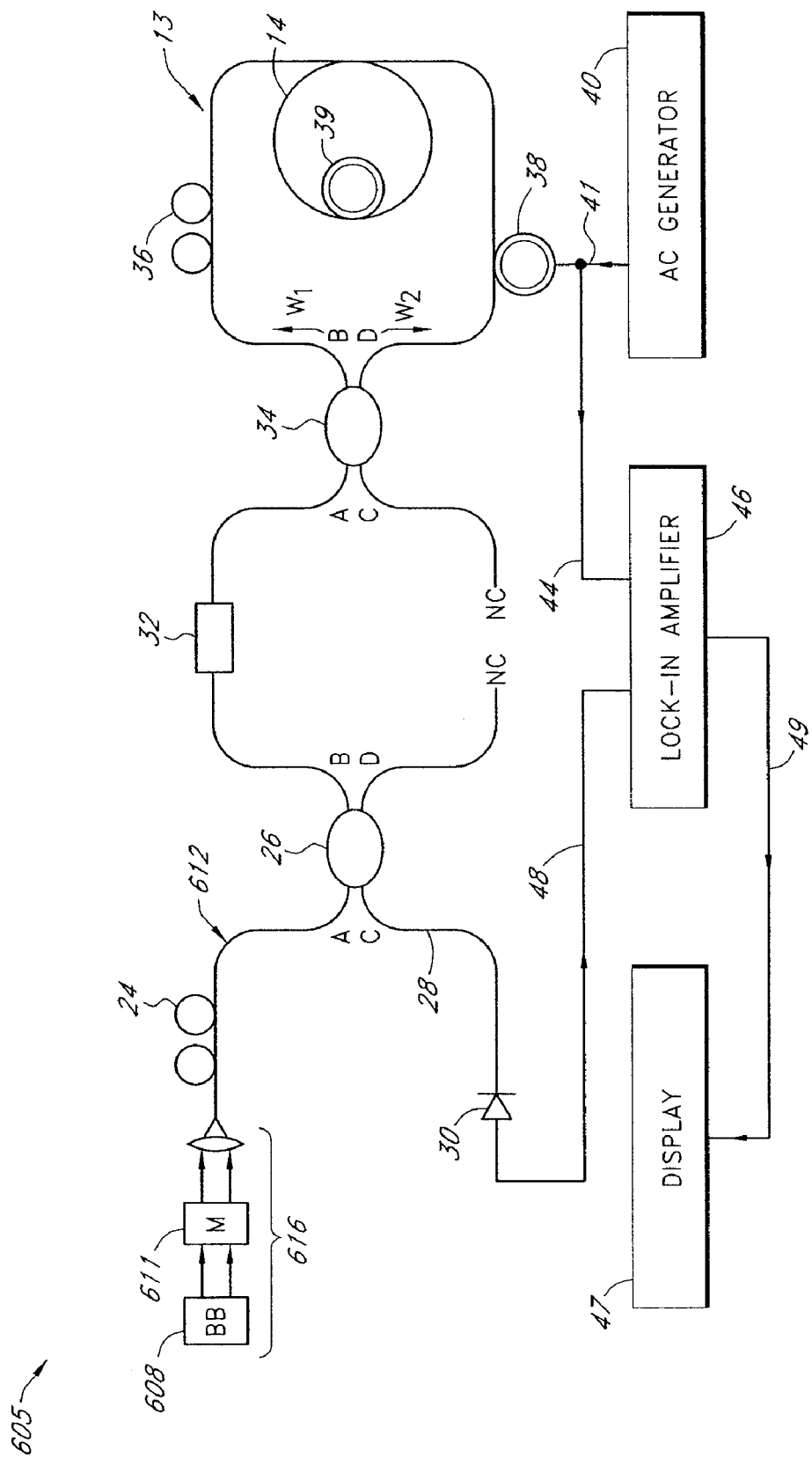
FIG. 6 is a schematic drawing of an example Sagnac interferometer driven by a broadband light source with a modulator for modulating the amplitude of the broadband light source.

FIG. 6 illustrates an example Sagnac interferometer 605 in accordance with certain embodiments described herein. The Sagnac interferometer 605 comprises an optical fiber system 612 in combination with a broadband light source 616. The broadband source 616 advantageously comprises a broadband light-emitting device 608 in combination with a modulator 611. In certain embodiments, the modulator 611 modulates the power of the broadband light at a duty cycle of approximately 50%. The modulated broadband light from the broadband source 616 contributes to the reduction or elimination of the Kerr effect, as discussed above.

Other advantages to employing a hollow-core photonic-bandgap fiber are possible. For example, reduced sensitivity to radiation hardening may be a benefit. Silica fiber will darken when exposed to high-energy radiation, such as natural background radiation from space or the electromagnetic pulse from a nuclear explosion. Consequently, the signal will be attenuated. In a hollow-core photonic-bandgap fiber, a smaller fraction of the mode energy propagates in silica and therefore attenuation resulting from exposure to high-energy radiation is reduced.

The example Sagnac interferometers 5, 305, 405, 505 and 605 illustrated in FIGS. 1, 3, 4, 5 and 6 have been used herein to describe the implementation and benefits of the hollow-core bandgap optical fiber 13 of FIGS. 2A and 2B to improve the performances of the interferometers. It should be understood that the disclosed implementations are examples only. For example, the interferometers 5, 305, 405, 505 and 605 need not comprise a fiber optic gyroscope or other rotation-sensing device. The structures and techniques disclosed herein are applicable to other types of sensors or other systems using fiber Sagnac interferometers as well.

Although gyroscopes for use in inertial navigation, have been discussed above, hollow-core photonic-bandgap fiber can be employed in other systems, sub-systems, and sensors using a Sagnac loop. For example, hollow-core photonic-bandgap fiber may be advantageously used in fiber Sagnac perimeter sensors that detect movement of the fiber and intrusion for property protection and in acoustic sensor arrays sensitive to pressure variations applied to the fiber. Perimeter sensors are described, for example, in M. Szustakowski et al., *Recent development of fiber optic sensors for perimeter security, Proceedings of the 35th Annual* 2001 *International Carnahan Conference on Security Technology*, 16-19 Oct. 2001, London, UK, pages 142-148, and references cited therein. Sagnac fiber sensor arrays are described in G. S. Kino et al, *A Polarization-based Folded Sagnac Fiber-optic Array for Acoustic Waves, SPIE Proceedings on Fiber Optic Sensor Technology and Applications* 2001, Vol. 4578 (SPIE, Washington, 2002), pages 336-345, and references cited therein. Various applications described herein, however, relate to fiber optic gyroscopes, which may be useful for navigation, to provide a range of accuracies from low accuracy such as for missile guidance to high accuracy such as aircraft navigation. Nevertheless, other uses, both those well-known as well as those yet to be devised, may also benefit from the advantages of various embodiments described herein. The specific applications and uses are not limited to those recited herein.

Also, other designs and configurations, those both well known in the art and those yet to be devised, may be employed in connection with the innovative structures and methods described herein. The interferometers 5, 305, 405, 505 and 605 may advantageously include the same or different components as described above, for example, in connection with FIGS. 1, 3, 4, 5 and 6. A few examples of such components include polarizers, polarization controllers, splitters, couplers, phase modulators, and lock-in amplifiers. Other devices and structures may be included as well.

In addition, the different portions of the optical fiber systems 12, 312, 412, 512 and 612 may comprise other types of waveguide structures such as integrated optical structures comprising channel or planar waveguides. These integrated optical structures may, for example, include integrated-optic devices optically connected via segments of optical fiber. Portions of the optical fiber systems 12, 312, 412, 512 and 612 may also include unguided pathways through free space. For example, the optical fiber systems 12, 312, 412, 512 and 612 may include other types of optical devices such as bulk-optic devices having pathways in free space where the light is not guided as in a waveguide as well as integrated optical structures. However, much of the optical fiber system of certain embodiments includes optical fiber which provides a substantially continuous optical pathway for light to travel between the source and the detector. For example, photonic-bandgap fiber may advantageously be used in portions of the optical fiber systems 12, 312, 412, 512 and 612 in addition to the fiber 13 in the loop 14. In certain embodiments, the entire optical fiber system from the source to and through the loop and back to the detector may comprise photonic-bandgap fiber. Some or all of the devices described herein may also be fabricated in hollow-core photonic-bandgap fibers, following procedures yet to be devised. Alternatively, photonic-bandgap waveguides and photonic-bandgap waveguide devices other than photonic-bandgap fiber may be employed for certain devices.

Several techniques have been described above for lowering the level of short-term noise and bias drift arising from coherent backscattering, the Kerr effect, and magneto-optic Faraday effect. It is to be understood that these techniques can be used alone or in combination with each other in accordance with various embodiments described herein. Other techniques not described herein may also be employed in operating the interferometers and to improve performance. Many of these techniques are well known in the art; however, those yet to be developed are considered possible as well. Also, reliance on any particular scientific theory to predict a particular result is not required. In addition, it should be understood that the methods and structures described herein may improve the Sagnac interferometers in other ways or may be employed for other reasons altogether.

Temperature (Shupe) Effects

The optical phase of a signal traveling in a conventional optical fiber is a relatively strong function of temperature. As the temperature changes, the fiber length, radius, and refractive indices all change, which results in a change of the signal phase. This effect is generally sizable and detrimental in phase-sensitive fiber systems such as the fiber sensors utilizing conventional fibers. For example, in a fiber sensor based on a Mach-Zehnder interferometer with 1-meter long arms, a temperature change in one of the arms as small as 0.01 degrees Celsius is sufficient to induce a differential phase change between the two arms as large as about 1 radian. This is about a million times larger than the typical minimum detectable phase of an interferometric sensor (about 1 microradian). Dealing with this large phase drift is often a significant challenge.

A particularly important fiber optic sensor where thermal effects have been troublesome is the fiber optic gyroscope (FOG). Although the FOG utilizes an inherently reciprocal Sagnac interferometer, even a small asymmetric change in the temperature distribution of the Sagnac coil fiber will result in a differential phase change between the two counter-propagating signals, a deleterious effect known as the Shupe effect. See, e.g., D. M. Shupe, "*Thermally induced nonreciprocity in the fiber-optic interferometer*," Appl. Opt., Vol. 19, No. 5, pages 654-655 (1980); D. M. Shupe, "*Fibre resonator gyroscope: sensitivity and thermal nonreciprocity*," Appl. Opt., Vol. 20, No. 2, pages 286-289 (1981). Because the Sagnac is a common-path interferometer, the two signals see almost the same thermally induced change and this differential phase change is much smaller than in a Mach-Zehnder or Michelson interferometer, but it is not small enough for high-accuracy applications which advantageously have extreme phase stability. In this and other fiber sensors and systems, thermal effects have been successfully fought with clever engineering solutions. These solutions, however, generally increase the complexity and cost of the final product, and they can also negatively impact its reliability and lifetime.

In certain embodiments, a hollow-core fiber-optic gyroscope has similar short-term noise as a conventional gyroscope (random walk of about $0.015$ deg/$\sqrt{hr}$) and a dramatically reduced sensitivity to Kerr effect (by more than a factor of 50), temperature transients (by about a factor of 6.5), and Faraday effect (by about a factor greater than 10).

The fundamental mode of a hollow-core photonic-bandgap fiber (PBF) travels mostly in the core containing one or more gases (e.g., air), unlike in a conventional fiber where the mode travels entirely through silica. Since gases or combinations of gases (e.g., air) have much lower Kerr nonlinearity and refractive index dependences on temperature than does silica of a conventional solid-core fiber, in a hollow-core PBF these generally deleterious effects are significantly reduced as compared to a conventional solid-core fiber. See, e.g., D. G. Ouzounov, C. J. Hensley, A. L. Gaeta, N. Venkataraman, M. T. Gallagher and K. W. Koch, "*Nonlinear properties of hollow-core photonic band-gap fibers*," in *Conference on Lasers and Electro-Optics*, Optical Society of America, Washington, D.C., Vol. 1, pages 217-219 (2005). Since the thermal coefficient of the refractive index dn/dT is much smaller for gases than for silica, in a hollow-core fiber the temperature sensitivity of the mode effective index is reduced considerably. The length of a PBF of course still varies with temperature, which means that the phase sensitivity will not be reduced simply in proportion to the percentage of mode energy in silica. However, it should still be reduced significantly, an improvement beneficial to numerous applications, especially in the FOG where it implies a reduced Shupe effect.

This feature can be extremely advantageous in fiber sensors such as the fiber optic gyroscope (FOG), where the Kerr and thermal (Shupe) effects are notoriously detrimental. By replacing the conventional fiber used in the sensing coil by a hollow-core fiber, the phase drift induced in a FOG by these two effects should be considerably smaller. Numerical simulations described herein predict a reduction of about 100-500 fold for the Kerr effect, and up to about 23 fold for the thermal effect. For the very same reason, the gyro's dependence on external magnetic fields (Faraday effect) should be greatly reduced, by a predicted factor of about 100-500, as described herein. Relaxing the magnitude of these three undesirable effects should result in practice in a significant reduction in the complexity, cost, and yield of commercial FOGs.

Furthermore, if through design and fabrication improvements Rayleigh back-scattering in PBFs can be reduced to below that of conventional solid-core fibers, it will also be possible to operate a hollow-core fiber gyroscope with a narrow-band communication-grade semiconductor source instead of the current broadband source (typically an Er-doped superfluorescent fiber source (SFS)). Since it is difficult to stabilize the mean wavelength of an SFS to better than 1 part-per-million, this change would offer the additional benefit of improving the source's mean wavelength stability by one to two orders of magnitude, and possibly reducing the source's cost.

These benefits come at the price of an increased fiber propagation loss (e.g., about 20 dB/km). However, this loss is manageable in practice. It amounts to only about 4 dB for a 200-meter long coil, which is not excessive compared to the loss of the other gyroscope components (e.g., about 15 dB). Furthermore, the state-of-the-art loss of PBFs is likely to decrease in the future.

EXAMPLE 1

This example describes the operation of an air-core photonic-bandgap fiber gyroscope in accordance with certain embodiments described herein. Because the optical mode in the sensing coil travels largely through air in an air-core photonic-bandgap fiber, which has much smaller Kerr, Faraday, and thermal constants than silica, the air-core photonic-bandgap fiber has far lower dependencies on power, magnetic field, and temperature fluctuations. With a 235-meter-long fiber coil, a minimum detectable rotation rate of about 2.7°/hour and a long-term stability of about 2°/hour were observed, consistent with the Rayleigh backscattering coefficient of the fiber and comparable to what is measured with a conventional fiber. Furthermore, the Kerr effect, the Faraday effect, and Rayleigh backcattering can be reduced by a factor of about 100-500, and the Shupe effect by a factor of about 3-11, depending on the fiber design.

We confirm some of these predictions with the demonstration of the first air-core fiber gyroscope. In spite of the significantly higher loss and scattering of existing air-core fibers compared to conventional fibers, the sensing performance of this example is comparable to that of a conventional FOG of similar sensing-coil length. This result demonstrates that existing air-core fibers can readily improve the gyroscope performance in a number of ways, for example by reducing residual thermal drifts and relaxing the tolerance on certain components and their stabilization.

Using an air-core fiber in the example fiber gyroscope provides a reduction of the four deleterious effects discussed above. Referring to Equation (1) which expresses the effective Kerr constant seen by the fundamental core mode, the Kerr constant of air ($n_{2,air} \approx 2.9 \times 10^{-19}$ cm$^2$/W) is about three orders of magnitude smaller than that of silica ($n_{2,silica} \approx 3.2 \times 10^{-16}$ cm$^2$/W). Since $\eta_{nl} \ll 1$, the effective Kerr nonlinearity will be much smaller in an air-core fiber than in a conventional fiber. In fact, the third-order dispersion in a particular air-core fiber $n_{2,PBF}$ is about 250 times smaller than $n_{2,silica}$.

For the Faraday effect, the effective Verdet constant of the fundamental mode $V_{PBF}$ can be expressed using Equation (1), but with the constants $n_2$ replaced by the Verdet constants of silica ($V_{silica}$) and air ($V_{air}$). Since $V_{air}$ is much weaker (about 1600 times) than $V_{silica}$, $V_{PBF}$ should be also reduced by two to three orders of magnitudes compared to a conventional fiber.

These considerations show that in a PBF gyro, the bias drifts caused by the Kerr and Faraday effects are reduced compared to a standard gyroscope roughly in proportion to $\eta$, the fractional mode power in the silica portions of the PBF. The value of $\eta$ calculated for a single-mode air-core silica PBF ranges approximately from about 0.015 to about 0.002, depending on the core radius, air filling ratio, and signal wavelength. Consequently, in a PBF gyroscope both the Kerr-induced and the Faraday-induced phase drifts can be reduced by a factor of about 70-500. These are substantial improvements that should greatly relax some of the FOG engineering requirements, such as temperature control of the loop coupler and the amount of μ-metal shielding.

An analogous reasoning applies to Rayleigh scattering. In state-of-the-art silica fibers, the minimum loss is limited by Rayleigh scattering and multi-phonon coupling. In contrast, in current air-core fibers loss is believed to be limited by coupling to surface and radiation modes due to random dimensional fluctuations. These fluctuations have either a technological origin (such as misalignment of the capillary tubes or periodic core diameter variations), or from the formation of surface capillary waves on the silica membranes of the PBF during drawing due to surface tension. Whereas the former type of fluctuations can be reduced with improved manufacturing techniques, the latter has a more fundamental nature and might be more difficult to reduce, although several approaches are possible. By reducing these fluctuations to sufficiently low levels, the Rayleigh scattering coefficient of air-core PBFs can reach the lower limit imposed by silica: $\alpha_{PBF} = \eta \alpha_{silica}$, where $\alpha_{silica}$ is the scattering coefficient of silica and scattering in the air portions of the waveguide has been neglected. Thus, the lowest possible effective scattering coefficient for an air-core fiber should be smaller than for a conventional fiber in proportion to η, i.e., again by a factor of 70-500. As discussed below, this reduction has a large positive impact on the fiber optic gyroscope.

In a gyroscope, the phase error due to coherence interference between the backscattered waves and the primary waves is given by Equation (3):

$$\delta\phi = \sqrt{\frac{\Omega}{2\pi}\eta\alpha_{silica}L_c} \quad (3)$$

where $\Omega$ is the solid angle of the fundamental mode inside the fiber, and $L_c$ is the coherence length of the light. In a conventional gyroscope using a standard polarization-maintaining (PM) fiber, the external numerical aperture (NA) is typically around 0.11, so the internal solid angle is $\Omega=\pi(NA/n)^2 \approx 0.018$, where n is the core refractive index. The mode travels entirely through silica, so $\eta=1$, and $\alpha_{silica}$ around 1.5 microns is about $-105$ dB/millimeter, or about $3.2\times10^{-8}$ meter$^{-1}$. Using these values in Equation (3) with light supplied by a broadband Er-doped superfluorescent fiber source (SFS) with a coherence length of $L_c \approx 230$ microns yields $\delta\phi \approx 0.15$ microradians, illustrating that the backscattering noise is small compared to the typical noise of a fiber interferometer.

The backscattering coefficient of a Crystal Fibre's AIR-10-1550 air-core fiber around 1.5 microns is about 3.5 times higher than that of an SMF28 fiber. If the gyroscope utilizes the Crystal Fiber air-core PBF mentioned above instead, which is representative of the current state of the art, its effective scattering coefficient $\alpha_{PBF}=\eta\alpha_{silica}$ is about 3.5 times larger. This fiber has an NA around 0.12 and a mode group index close to unity (n≈1), so its solid angle is $\Omega \approx 0.045$. The backscattering noise provided by Equation (3) is therefore $\delta\phi \approx 0.43$ microradians, which is still very small. Thus, even though backscattering is larger in current air-core fibers than in conventional fibers, the coherence length of an Er-doped SFS can be short enough to bring the backscattering noise down to a negligible level, and the rotation sensitivity is approximately the same with either type of fiber.

For air-core PBFs with ultra-low backscattering, the backscattering noise will be reduced in proportion to $\sqrt{\eta}$, as expressed by Equation (3). For example, for a PBF with $\eta=0.002$ and $\Omega=0.045$, Equation (3) predicts $\delta\phi \approx 0.01$ microradians. The implication is that with such a fiber, the backscattered signal is so weak that the gyroscope could now be operated with light of much longer coherence length and still have a reasonably low noise. In the above example, a coherence length as large as $L_c=2.2$ meters (linewidth of 95 MHz) will still produce a noise of only 1 microradians, which is low enough for many applications. Thus, rather than using a broadband source, a standard semiconductor laser can be used, thereby providing significant advantages over broadband sources, including but not limited to a far greater wavelength stability and thus scale-factor stability, and a lower cost, all beneficial steps for inertial-navigation FOGs.

With regard to the Shupe effect, the air-core fiber provides a substantial reduction in thermal sensitivity. When the temperature of the sensing coil varies asymmetrically with respect to the coil's mid-point, the two counter-propagating signals sample the resulting thermal phase change at different times, which results in an undesirable differential phase shift in the gyroscope output. This effect is reduced in practical gyros by wrapping the coil fiber in special ways, such as quadrupole winding. However, this solution is not perfect, and residual drifts due to time-varying temperature gradients can be observed in high-sensitivity FOGs. When the sensing coil is made with an air-core fiber, because the mode travels mostly in air, whose index depends much more weakly on temperature than the index of silica, the Shupe effect is substantially reduced. For example, in the air-core fiber used in this example, the Shupe effect is reduced by a factor of about 3.6 times compared to a conventional fiber. An FOG made with this fiber would therefore exhibit a thermal drift only about 28% as large as a conventional FOG. Even greater reductions in the Shupe constant, by up to a factor of 11, are obtained with straightforward improvements in the fiber jacket thickness and material. This reduction in Shupe effect advantageously translates into a greater long-term stability and simplified packaging designs.

Figure 7:
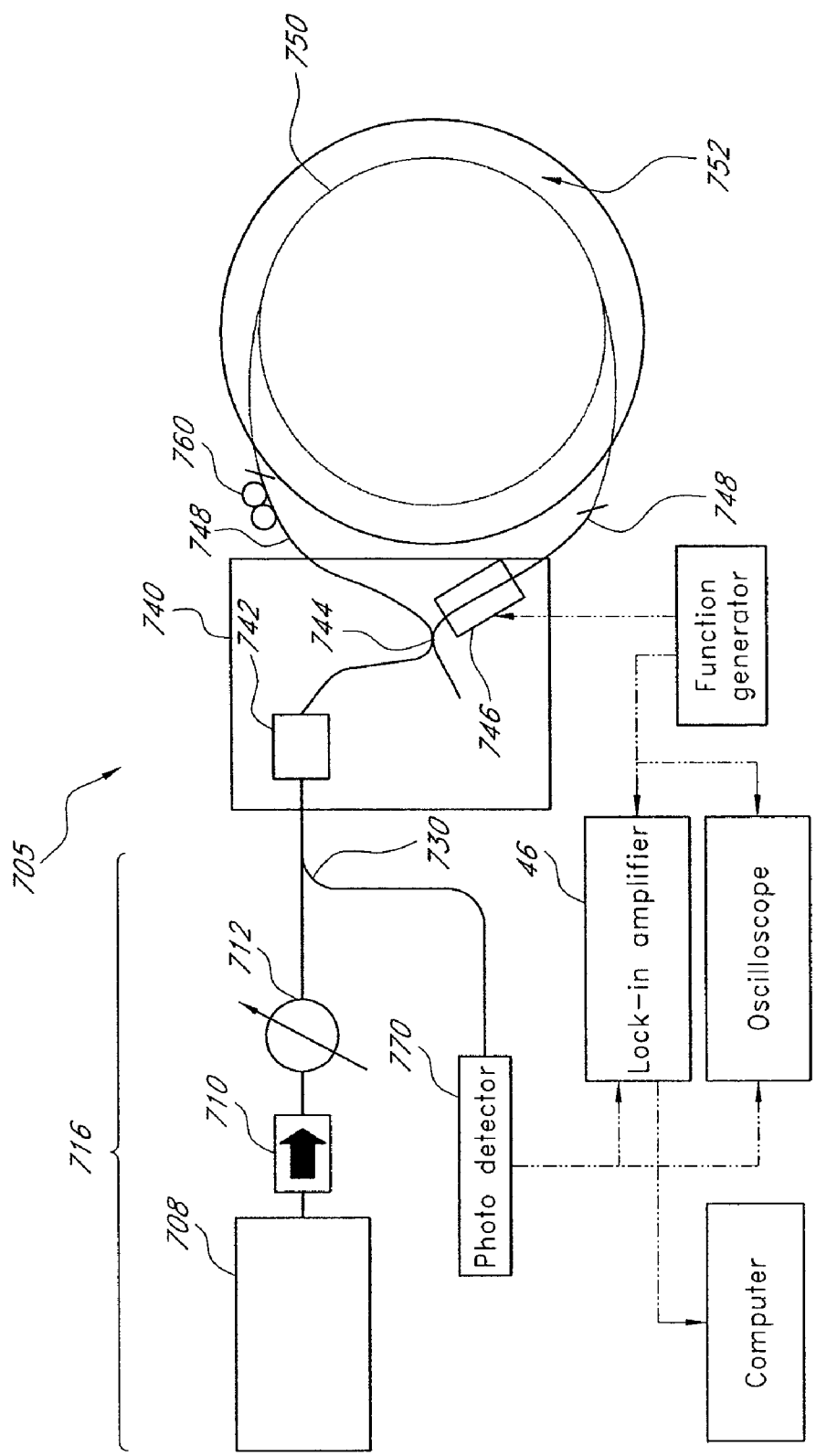
FIG. 7 schematically illustrates an experimental configuration of an all-fiber air-core PBF gyroscope in accordance with certain embodiments described herein.

FIG. 7 schematically illustrates an experimental configuration of an all-fiber air-core PBF gyroscope 705 in accordance with certain embodiments described herein used to verify various aspects, particularly that the noise is of comparable magnitude as in a conventional fiber gyroscope. The light source 716 comprised a commercial Er-doped fiber amplifier 708, which produced amplified spontaneous emission centered at 1544 nanometers with a calculated bandwidth of about 7.2 nanometers. This light from the fiber amplifier 708 was coupled through an optical isolator 710 and a power attenuator 712 into a 3-dB fiber coupler 730 (to provide a reciprocal output port), then into a fiber-pigtailed LiNbO$_3$ integrated-optic circuit (IOC) 740 that consisted of a polarizer 742 followed by a 3-dB splitter 744 and an electro-optic modulator 746. The output fiber pigtails 748 of the IOC 740 were butt-coupled to a 235-meter length of coiled HC-1550-02 air-core fiber 750 manufactured by Blaze Photonics (now Crystal Fibre A/S of Birkerod, Denmark). This fiber 750 was quadrupolar-wound on an 8.2-centimeter mandrel and placed on a rotation stage 752. At the butt-coupling junctions, the ends of the air-core fiber 750 were cleaved at normal incidence while the ends of the pigtails 748 of the IOC 740 were cleaved at an angle to eliminate unwanted Fresnel reflections. A polarization controller 760 was placed on one of the pigtails 748 inside the loop to maximize the visibility of the return signal. The output signal from the reciprocal port of the 3-dB fiber coupler 730 was detected with a photo-detector 770. The attenuator 712 was adjusted so that the detected output power was same in all measurements (−20 dBm). Both the fundamental frequency (f) and the second-harmonic frequency (2f) of the detected electrical signal were extracted with a lock-in amplifier 46 and recorded on a computer. All results shown were obtained with a lock-in integration time of 1 second.

Figure 8A:
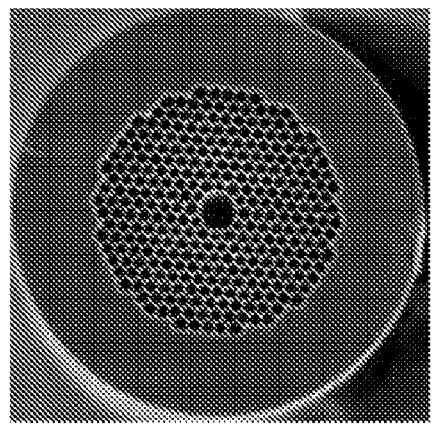
FIG. 8A shows a scanning electron micrograph of a cross-section of an air-core fiber.
Figure 8B:
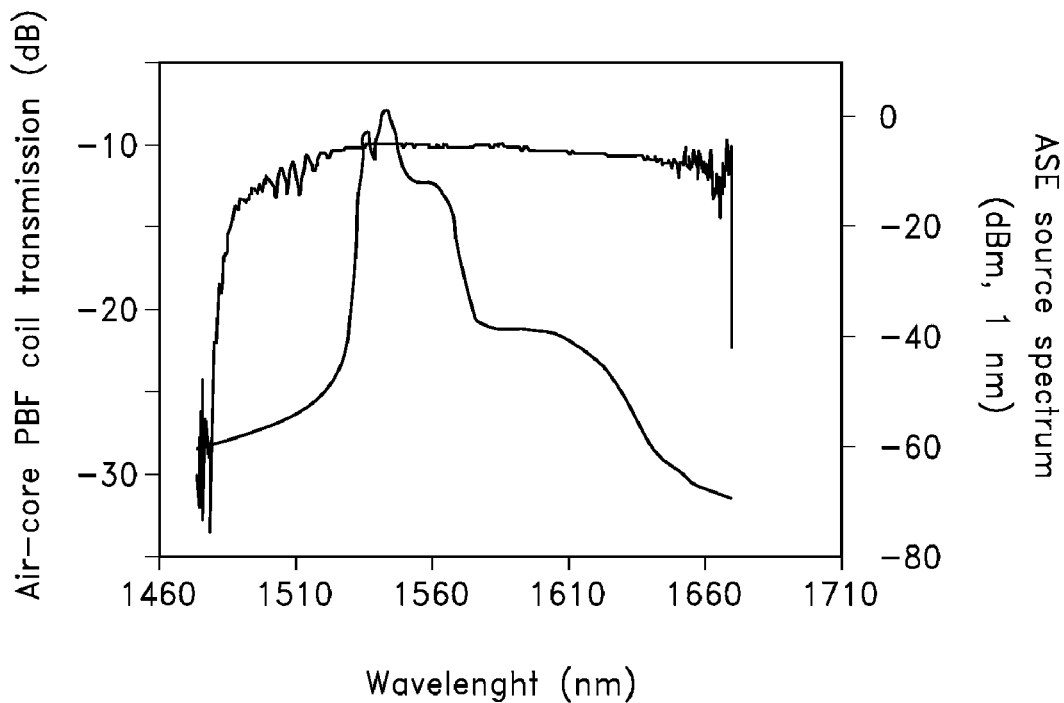
FIG. 8B illustrates the measured transmission spectrum of an air-core fiber and a source spectrum from a light source.

FIG. 8A shows a scanning electron micrograph of a cross-section of the air-core fiber 750. FIG. 8B illustrates the measured transmission spectrum of the air-core fiber 750 and the source spectrum from the light source 716. The transmission spectrum includes the coupling loss between the air-core PBF 750 and the fiber pigtails 748 of the IOC 740. The fiber 750 is almost single moded in its transmission range (about 1490-1660 nanometers). The highest measured transmission value, near the middle of the PBF bandgap (around 1545 nanometers) is about −10 dB. Based on the minimum fiber loss of about 19 dB/kilometer from the manufacturer, the 235-meter length of air-core fiber 750 accounts for about 4.5 dB of the 10-dB transmission loss. The rest can be assigned to a about 2.7-dB loss at each of the two butt junctions. The fundamental mode overlap with the silica portions (parameter η) calculated for this fiber is a few percent. The measured birefringence was approximately $6\times10^{-5}$. From the value of the group index for the fundamental mode of the 5-meter standard-fiber pigtails (1.44) and of the 235-meter PBF fiber (1.04, calculated for an ideal air-core fiber with the same core radius), the proper frequency of the Sagnac loop was calculated to be $f_0 \approx 596$ kHz. Since this calculated value is approximate, it was also measured by observing the evolution of the 2f signal when the gyroscope was at rest as the modulation frequency was increased up to 700 kHz. The 2f signal amplitude exhibited the frequency response of a Sagnac interferometer, i.e., a raised sine. A fit to this dependence gave a measured proper frequency of 592 kHz, in agreement with the calculated value. The air-core gyroscope was modulated at f=600 kHz, with a modulation depth of $\pi/4$, close to the optimum value for maximum sensitivity.

Figure 9B:
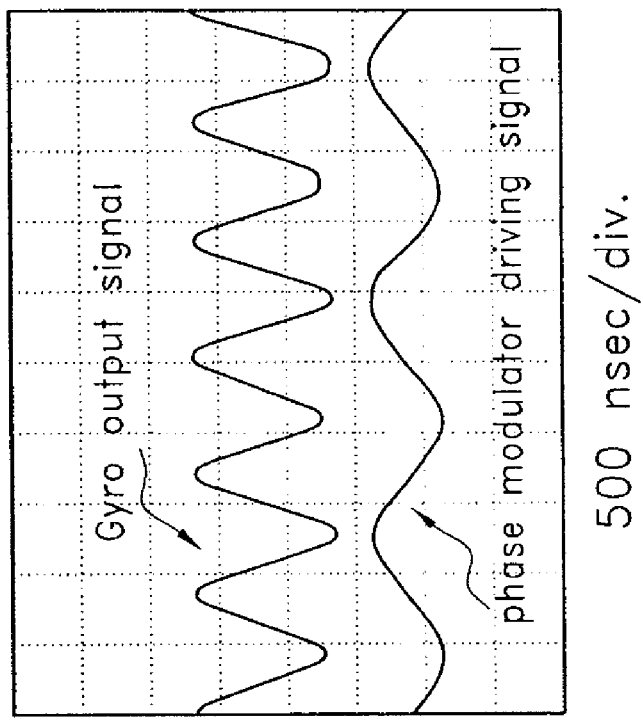
FIGS. 9A and 9B show typical oscilloscope traces of these signals, with and without rotation, respectively.
Figure 9A:
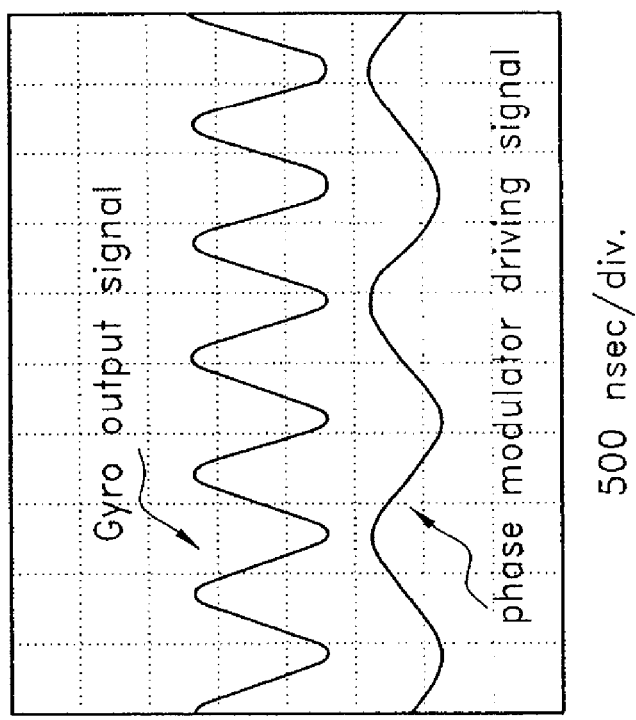
Figure 10:
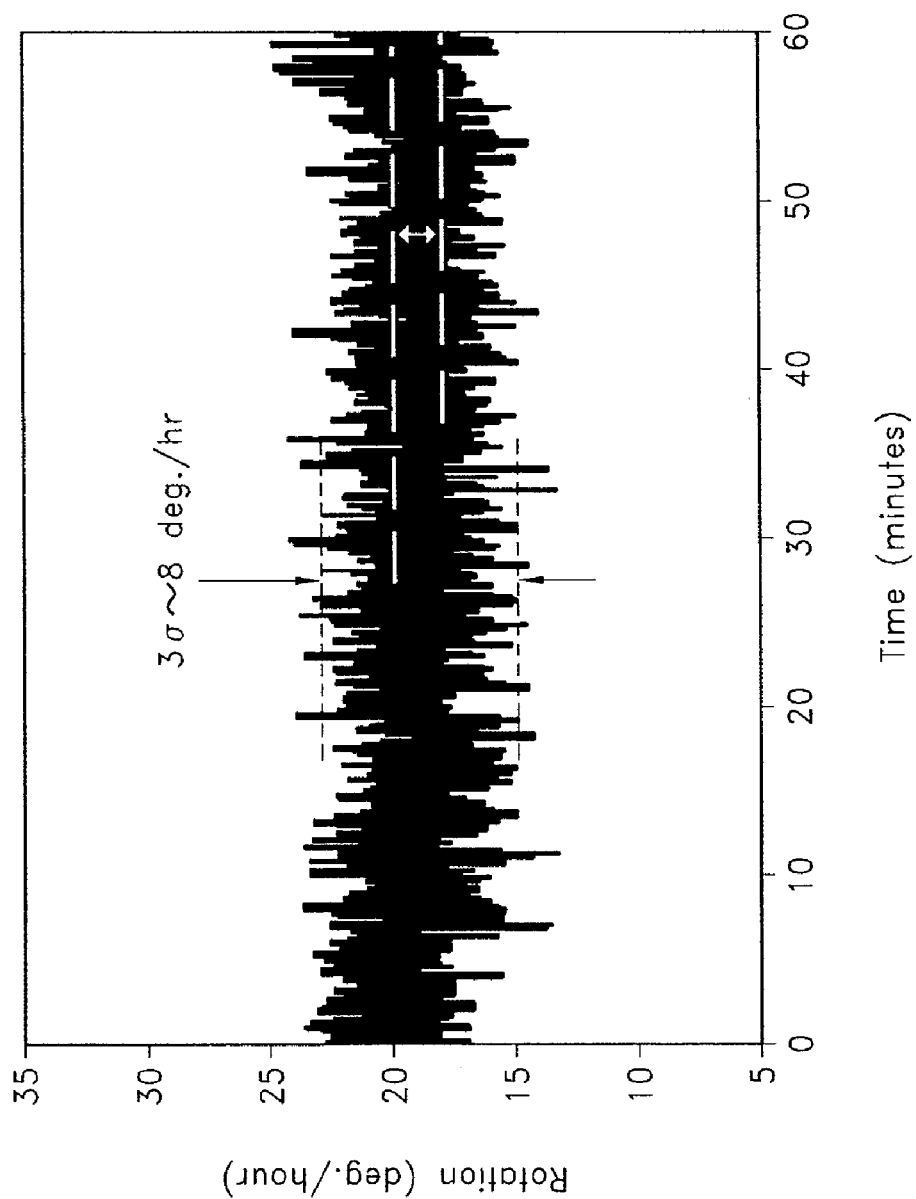
FIG. 10 shows a trace of the f output signal recorded over one hour while the gyroscope was at rest.

The gyroscope was tested by placing it on a rotation table with a calibrated rotation rate and measuring the amplitudes of the f and 2f signals as a function of rotation rate. FIGS. 9A and 9B show typical oscilloscope traces of these signals, with and without rotation, respectively. In the absence of rotation (FIG. 9A), the output contains only even harmonics of f (mostly 2f). When the coil is rotated (FIG. 9B), a component at f appears. The output signal at f was measured to be proportional to the rotation rate up to the maximum tested rotation rate of 12°/second. The proportionality constant (of the order of 10-20 mV/° s, depending on experimental conditions) was used to calibrate the noise level of the gyroscope in units of rotation rate. A trace of the f output signal recorded over one hour while the gyroscope was at rest is plotted in FIG. 10. Again, the vertical axis in this curve was calibrated not from the knowledge of the gyroscope scale factor, but by using the rotation table calibration. Taking the peak-to-peak noise in this curve to be $3\sigma$, where $\sigma$ is the noise standard deviation, these results show that $3\sigma \approx 8°$/hour. Thus the minimum detectable rotation rate (one standard deviation) is $\Omega_{min} \approx 2.7°$/hour, or about ⅛th of Earth rate. The long-term drift observed in FIG. 10 is about 2°/hour. The scale factor for this gyro, calculated from the coil diameter and fiber length, is F=0.26 s. The short-term phase noise of the interferometer inferred from the measured minimum detectable rotation rate is therefore $\Omega_{min} F \approx 3.3$ microradians, which is reasonably low for an optical interferometer.

To compare this performance to that of a conventional fiber gyroscope, the air-core PBF coil was replaced with a coil of 200 meters of standard PM fiber. This second coil was also quadrupole-wound, on a mandrel 2.8-centimeters in diameter. The ends of the coil fiber were spliced to the IOC pigtails 748. The proper frequency of this Sagnac loop was measured to be around 500 kHz (calculated value of 513 Hz) and the calculated scale factor was F=0.076 s. The rest of the sensor, including the IOC 740, photodetector 770, and detection electronics, were the same as for the air-core gyroscope described above. The minimum detectable rotation rate of this standard gyroscope was measured to be 7°/hour (1–$\sigma$ short-term noise) and its long-term drift was 3°/hour. From this minimum detectable signal and the scale factor, a phase noise of 2.6 microradians can be inferred. This value shows the important result that the phase noise in the air-core fiber gyroscope is comparable to that of a standard-fiber gyroscope of comparable length using the same configuration, detection, and electronics.

The three main contributions to the short-term noise observed in the PM-fiber gyroscope are shot noise, d, excess noise due to the broadband spectrum of the light source, and thermal noise in the detector. Shot noise is typically negligible. At lower detected power, the dominant source of noise is thermal detector noise. At higher detected power, the dominant noise is excess noise. Under the conditions of the experimental air-core fiber gyroscope described above, the detected power was around 10 microwatts, and the observed noise (2.6 microradians) originates almost entirely from excess noise.

For the air-core FOG, since the detector and detected power were the same, the shot noise contribution is also 0.4 microradians. The backscattering noise, also calculated earlier, is about 0.4 microradians (assuming that the Rayleigh backscattering coefficient of the air-core fiber is $1.12 \times 10^{-7}$ m$^{-1}$, or 3.5 times stronger than that of an SMF28 fiber). Since both test gyroscopes used the same electronics and detected power levels, the contribution of electronic noise must be the same as in the PM-fiber gyroscope, namely about 2 microradians.

In addition, in the air-core FOG, the backreflections at the two butt-coupled junctions were also a possible source of noise. The two butt-junctions form a spurious Michelson interferometer that is probed with light of coherence length much shorter than the path mismatch between the Michelson's arms, so this interferometer only adds intensity noise. The magnitude of this noise can be estimated using the knowledge of the power reflection at the end of an air-core fiber, which is much weaker than for a solid-core fiber but not zero. Such estimates show that the power reflection at the end of in this air-core fiber is about $2 \times 10^{-6}$. Scaling by this value, the phase noise due to these two incoherent reflections is estimated to be roughly of the order of 1 microradians. Note that this contribution can be eliminated by angling the ends of the air-core fiber as well.

The above calculated noise levels are consistent with the measurements: the sum of all four contributions (0.4+0.4+2.3+1=4.1) is comparable to the measured value of 3.3 microradians. This agreement gives credence to the estimated values of the various noise contributions, to the assumed value of the air-core fiber's Rayleigh scattering coefficient, and to the conclusion that in both gyroscopes most of the noise arises from a common electronic origin.

These measurements also allow an upper-bound value to be placed on the Rayleigh scattering of the air-core fiber. If the observed phase noise (3.3 microradians) is assumed to be entirely due to fiber scattering, Equation (3) can be used to show that the fiber's Rayleigh scattering coefficient would be as high as $6.6 \times 10^{-6}$ m$^{-1}$, or about 200 times higher than for an SMF28 fiber. The above assignment of the various noise sources strongly suggest that this value is unreasonably high, and that a value of $1.12 \times 10^{-7}$ m$^{-1}$ is much more consistent with these observations.

EXAMPLE 2

This example models quantitatively the dependence of the fundamental-mode phase on temperature in an air-core fiber, and validates these predictions by comparing them to values measured in actual air-core fibers. The metric cited in this example is the relative change in phase S, referred to as the phase thermal constant, and given by Equation (4):

$$S = \frac{1}{\phi} \frac{d\phi}{dT} \quad (4)$$

where $\phi$ is the phase accumulated by the fundamental mode through the fiber and T is the fiber temperature. With an interferometric technique, two air-core PBFs from different manufacturers were tested and found that their thermal constant is in the range of 1.5 to 3.2 parts per million (ppm) per degree Celsius, or 2.5-5.2 times lower than the measured value of a conventional SMF28 fiber (S=7.9 ppm/° C.). Each of these values falls within 20% of the corresponding predicted number, which lends credence to the theoretical model and to the measurement calibration. This study shows that the reason for this reduction is due to a drastic reduction in the dependence of the mode effective index on temperature. The residual value of the thermal constant arises from length expansion of the fiber, which is only marginally reduced in an air-core fiber. Modeling shows that with fiber jacket improvements, this contribution can be further reduced by a factor of about 2. Even without this further improvement, the phase thermal constant of current air-core fiber is as much as about 5 times smaller than in a conventional fiber, which can bring forth a significant improvement in the FOG and other phase-sensitive systems.

The phase thermal constants S of an air-guided photonic-bandgap fiber and a conventional index-guided fiber are quantified in the following theoretical model. The total phase φ accumulated by the fundamental mode as it propagates through a fiber of length L is expressed by Equation (5):

$$\phi = \frac{2\pi n_{eff} L}{\lambda} \quad (5)$$

where L is the fiber length, $n_{eff}$ the mode effective index, and λ the wavelength of the signal in vacuum. Inserting Equation (5) into Equation (4) yields the expression for the phase sensitivity per unit length and per degree of temperature change of the fiber, as expressed by Equation (6):

$$S = \frac{1}{\phi}\frac{d\phi}{dT} = \frac{1}{L}\frac{dL}{dT} + \frac{1}{n_{eff}}\frac{dn_{eff}}{dT} = S_L + S_n. \quad (6)$$

where $d\phi/dT$ is the derivative of the phase delay with respect to temperature. S is the sum of two terms: the relative variation in fiber length per degree of temperature change (hereafter called $S_L$), and the relative variation in the mode effective index per degree of temperature change (hereafter called $S_n$).

If the temperature change from equilibrium is ΔT(t,l) at time t and in an element of fiber length dl located a distance l from one end of the fiber, the total phase change in a length L of the fiber is expressed by Equation (7):

$$\Delta\phi = \frac{2\pi n_{eff}}{\lambda} S \int_0^L \Delta T(t - l/v, l) dl \quad (7)$$

where $v=c/n_{eff}$ and c is the velocity of light in vacuum. Equation (7) shows that S is a relevant parameter to characterize the phase sensitivity to temperature in, for instance, a Mach-Zehnder interferometer, since the total phase change is proportional to S.

Similar expressions apply to other interferometers. For example, for a Sagnac interferometer the corresponding phase change is given by Equation (8):

$$\Delta\phi = \frac{2\pi n_{eff}}{\lambda} S \int_0^L [\Delta T(t - l/v, l) - \Delta T(t - L/v + L/v + l/v, l)] dl \quad (8)$$

As expected, Δφ is proportional to S, and S is again the relevant metric. The temperature sensitivity of a Sagnac interferometer, expressed by Equation (8), can be reduced by minimizing the integral through proper fiber winding, and/or by designing the fiber structure to minimize S.

Because the thermal expansion coefficient of the fiber jacket (usually a polymer) is typically two orders of magnitude larger than that of silica, expansion of the jacket stretches the fiber, and the fiber length change caused by jacket expansion is the dominant contribution to $S_L$. The index term $S_n$ is the sum of three effects. The first one is the transverse thermal expansion of the fiber, which modifies the core radius and the photonic-crystal dimensions, and thus the mode effective index. The second effect is the strains that develop in the fiber as a result of thermal expansion; these strains alter the effective index through the elasto-optic effect. The third effect is the change in material indices induced by the fiber temperature change (thermo-optic effect).

Figure 11:
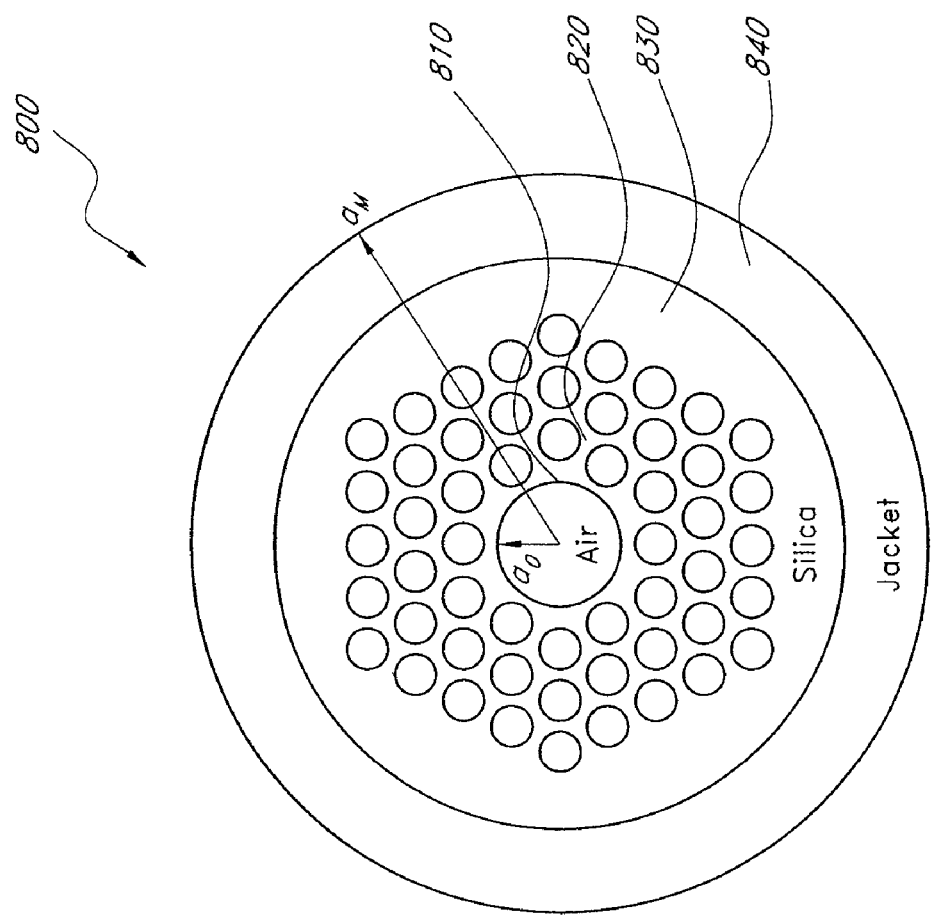
FIG. 11 schematically illustrates a cross-section of a cylindrical fiber with a hollow core, a honeycomb inner cladding, an outer cladding, and a jacket.

To determine $S_n$ and $S_L$, the thermo-mechanical properties of the fiber are modeled by assuming that the fiber temperature is changed uniformly from $T_0$ to $T_0+dT$, and calculating the fiber length and the effective index of the fundamental mode at both temperatures, from which, with Equation (6), $S_n$, $S_L$, and S can be calculated. FIG. 11 schematically illustrates a fiber 800 in accordance with certain embodiments described herein. The fiber 800 is assumed to have cylindrical symmetry and all its properties are assumed to be invariant along its length, so S is computed in a cylindrical coordinate system. As shown in FIG. 11, the fiber 800 is modeled as a structure with multiple circular layers: a core 810 (e.g., doped silica in a conventional fiber, hollow in a PBF, and shown as filled with air in FIG. 11) of radius $a_0$, an inner cladding 820 (e.g., silica in a conventional fiber, a silica-air honeycomb in a PBF) generally surrounding the core 810, an outer cladding 830 (generally pure silica) of radius $a_M$ and generally surrounding the inner cladding 820, and a jacket 840 (often an acrylate) generally surrounding the outer cladding 830. Each layer is assumed to remain in contact and in mechanical equilibrium with the neighboring layers, i.e., the radial stress and the radial deformation are continuous across fiber layer boundaries. In certain embodiments, the core 810 has an outer diameter in a range between about 9 microns and about 12 microns. In certain embodiments, the inner cladding 820 has an outer diameter in a range between about 65 microns and about 72 microns. In certain embodiments, the outer cladding 830 has an outer diameter in a range between about 110 microns and about 200 microns. In certain embodiments, the jacket 840 has an outer diameter in a range between about 200 microns and about 300 microns.

Each layer is characterized by a certain elastic modulus E, Poisson's ratio v, and thermal expansion coefficient α. The photonic-crystal cladding 820 is an exception in that it is not a homogeneous material but it behaves mechanically like a honeycomb. The implications are that (1) in a transverse direction the honeycomb can be squeezed much more easily than a solid, which means that it has a high transverse Poisson's ratio, and (2) in the longitudinal direction, it behaves like membranes of silica with a total area $(1-\eta)A_h$, where $A_h$ is the total cross section of the honeycomb. The elastic modulus and Poisson's ratio of a honeycomb are thus function of the air filling ratio η. For an hexagonal pattern of air holes in silica, they are given by Equation (9):

$$E_T = \frac{3}{2}(1-\eta)^3 E_0 \qquad (9)$$
$$E_L = (1-\eta)E_0$$
$$\nu_T = 1$$
$$\nu_L = \nu_0$$

where $E_T$ and $E_L$ are the transverse and longitudinal Young's modulus of the silica-air honeycomb, respectively, $E_0$ is the Young's modulus of silica, $\nu_T$ and $\nu_L$ are the transverse and longitudinal Poisson's ratios of the honeycomb material, respectively, and $\nu_0$ is the Poisson's ratio of silica. The values used for these parameters in the simulations presented here were calculated from Equation (9) and are listed in Table 1. Comparison to a simpler model in which the inner cladding is approximated by solid silica indicates that the effect of the honeycomb is to increase $S_L$ by about 10-30%. The reason is that in a honeycomb offers a lower resistance to the pull exerted by the higher thermal expansion jacket than solid silica, thus the fiber length expansion is increased (larger $S_L$). The effect of the honeycomb is thus small but not negligible. Table 1 also lists the values of the parameters used in the simulations for the other fiber layers.

TABLE 1

| Coefficient | Silica | Air-Silica Honeycomb | Acrylate |
|---|---|---|---|
| Thermal expansion coefficient α (10⁻⁶/K) | 0.55 | 0.55 | 80 |
| Poisson's ratio ν | 0.17 | Transverse: 1<br>Longitudinal: 0.17 | 0.37 |
| Young's modulus E (GPa) | 72.45 | Transverse: 108.7 (1-η)³<br>Longitudinal: 72.45 (1-η) | 0.5 |

The local deformation vector u(r) at the point r=[r, θ, z] is given by Equation (10):

$$u(r)=[u_r(r)\ 0\ u_z(z)] \qquad (10)$$

Only the diagonal components of the strain tensor ε are non-zero:

$$\varepsilon = \left[ \varepsilon_{rr} = \frac{\partial u_r}{\partial r} \quad \varepsilon_{\theta\theta} = \frac{u_r}{r} \quad \varepsilon_{zz} = \frac{\partial u_z}{\partial z} \right] \qquad (11)$$

Hooke's law is used to relate the stress tensor σ and strain tensor ε along with the effect of a temperature change ΔT:

$$\varepsilon = s : \sigma + \alpha\Delta T \qquad (12)$$

where s is the fourth-order compliance tensor, α is the thermal expansion tensor, which also only has diagonal terms, and : denotes the tensor product.

The deformation field $u_z$ does not vary with r and for a long fiber, it varies linearly with z, such that it is of the form:

$$u_z(z)=Cz \qquad (13)$$

where C is a constant and the z origin is chosen in the middle of the fiber. Because $u_z(z)$ is continuous at each interface between layers, C has the same value for all layers. Since the temperature is assumed uniform across the fiber, Equations (12) and (13) imply that $\varepsilon_{zz}$ and $\sigma_{zz}$ are independent of r and only functions of z. Furthermore, $u_r$ satisfies the admissibility condition:

$$\frac{\partial^2 u_r}{\partial r^2} + \frac{1}{r}\frac{\partial u_r}{\partial r} - \frac{u_r}{r^2} = 0 \qquad (14)$$

whose solution is:

$$u_r(r) = Ar + \frac{B}{r} \qquad (15)$$

where A and B are constants specific to each layer. The coefficients A, B, and C are solved for by imposing the following boundary conditions and making use of Hooke's law: (i) continuity of $u_r(r)$ across all inner layer boundaries; (ii) continuity of $\sigma_{rr}(r)$ across all inner layer boundaries; (iii) $\sigma_{rr}(r)=0$ at $r=a_0$, where $a_0$ is the fiber core radius; (iv) $\sigma_{rr}(r)=0$ at $r=a_M$, where $a_M$ is the outer radius of the fiber; and (v) mechanical equilibrium on the fiber end faces, which imposes:

$$\int_{a_0}^{a_M}\int_0^{2\pi} \sigma_{zz}(r,\theta,z=\pm L/2)dr\,rd\theta = 0 \qquad (16)$$

A matrix method can be used to determine A, B, and C, and thus $u_r(r)$ and $u_z(z)$. Equation (11) then yields the strains, including $\varepsilon_{zz}=S_L\Delta T$.

Figure 12:
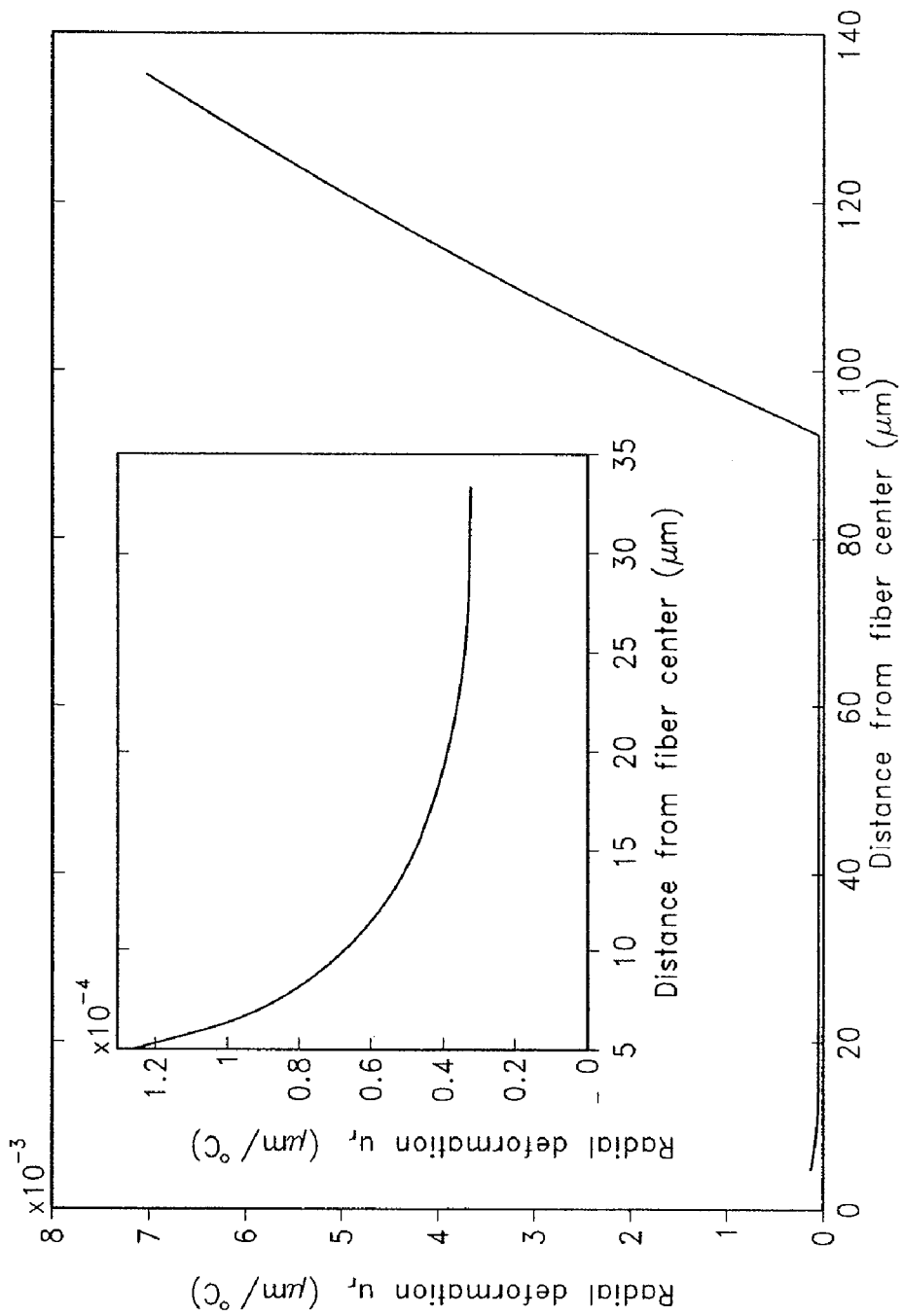
FIG. 12 illustrates the computed radial deformation as a function of distance from fiber center for the Crystal Fibre PBF. The inset is a magnification of the radial deformation over the inner cladding honeycomb.

To illustrate the kinds of predictions this model provides, FIG. 12 shows the radial deformation as a function of distance from the fiber center calculated for the Crystal Fibre PBF with the physical parameters listed in Table 2. Over the honeycomb structure (inner radius of about 5 microns and outer radius of about 33.5 microns) and the silica outer cladding (inner radius of about 33.5 microns and outer radius of about 92.5 microns), the radial deformation remains small compared to the deformation of the acrylate jacket (inner radius of about 92.5 microns and outer radius of about 135 microns), which is consistent with the differences in the thermal expansion coefficient and stiffness of the materials. The low-thermal expansion and stiff silica experiences a much weaker deformation than the high-thermal expansion and soft acrylate. Since the radial strain is the derivative of the radial deformation, the inner cladding honeycomb is under compressive strain, and it relaxes the strain over the structure by absorbing some of the deformation (the radial deformation decreases by a factor of 4 over the honeycomb structure) due to its very small transverse Young modulus.

TABLE 2

| Parameter | SMF28 Fiber | Crystal Fibre | Blaze Photonics |
|---|---|---|---|
| Air-filling ratio | Not applicable | >90% | >90% |
| Core diameter | 8.2 μm | 10 μm | 10.9 μm |
| Honeycomb diameter | Not applicable | 67 μm | 70 μm |
| Cladding diameter | 125 μm | 185 μm | 120 μm |
| Jacket diameter | 250 μm | 270 μm | 220 μm |
| Heated length of fiber | 210 cm | 226 cm | 210 cm |

Once the strain distributions are known, computation of $S_n$ is straightforward. In a first step, from the radial strain distribution, the change in the dimension of each layer across the fiber cross-section is calculated. In a second step, from the total strain distribution, the change in refractive indices of each layer due to the elasto-optic effect is calculated. In a third step, the change in material indices induced by the temperature change (thermo-optic effect), which is independent of the strains and the easiest to evaluate, is calculated. These three contributions (change in index profile, core radius, and materials' indices) are then combined to obtain the refractive index profile of the fiber at $T=T_0+\Delta T$. This new profile is then imported into an appropriate code to calculate various optical properties of the structure (see, e.g., V. Dangui, M. J. F. Digonnet and G. S. Kino, "*A fast and accurate numerical tool to model the mode properties of photonic-bandgap fibers,*" Optical Fiber Conference Technical Digest (2005)), such as the effective index of the fundamental mode at this temperature. The code is also used to compute the mode effective index of the unperturbed fiber, i.e., at temperature $T_0$. These two values of the effective index are used in Equation (6) to compute $S_n$. This calculation assumes that all parameters change linearly with temperature, which is reasonable for small temperature excursions.

Figure 13:
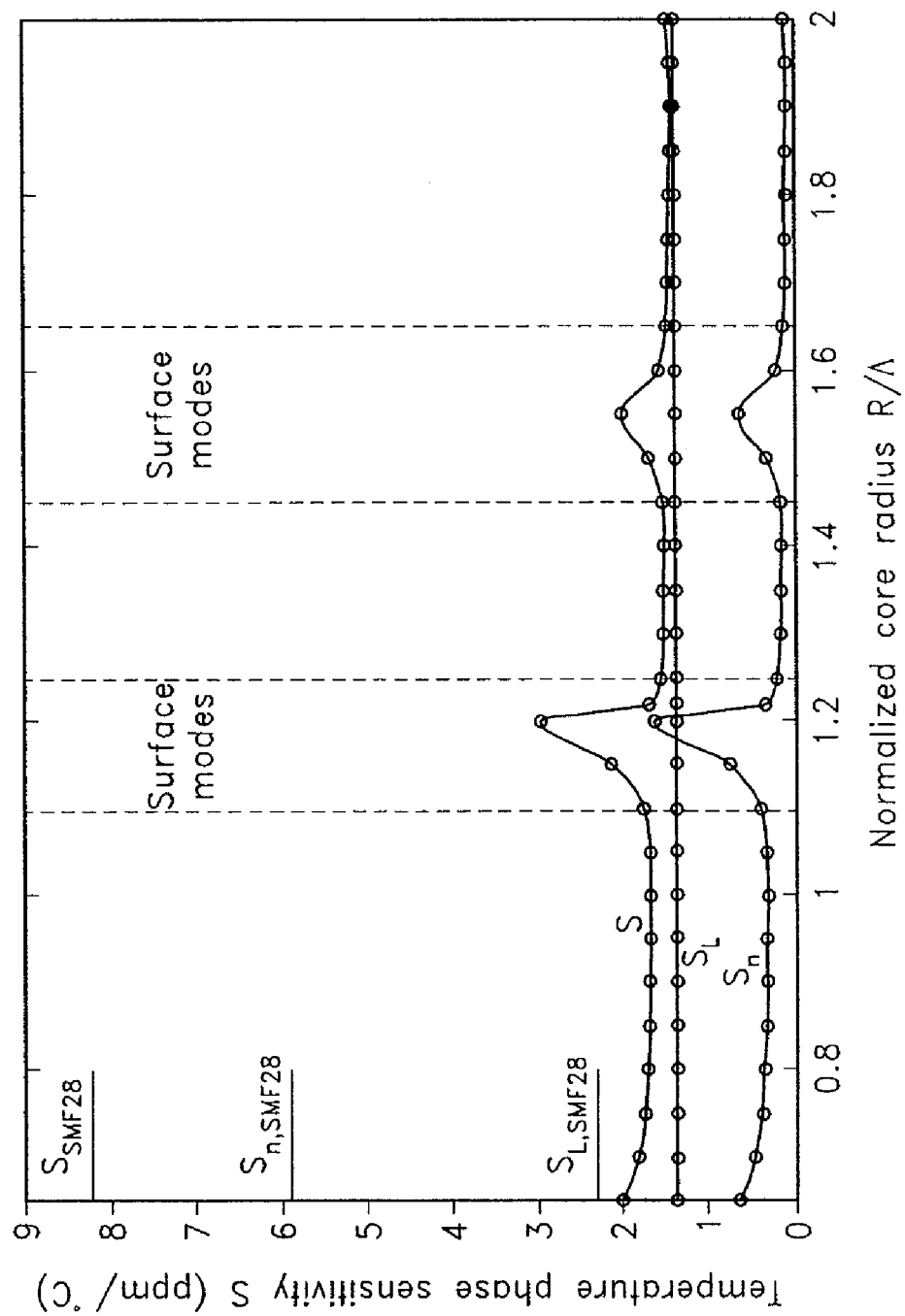
FIG. 13 shows the calculated dependence of S, $S_n$, and $S_L$ on the normalized core radius for an air-core fiber (solid curves) and for an SMF28 fiber (reference levels) at 1.5 microns.

FIG. 13 shows the dependence of $S_L$, $S_n$, and $S$ on the core radius R predicted by this model for a fiber with a cladding air-hole radius $\rho=0.495\Lambda$, an outer cladding radius of 92.5 μm, and an acrylate jacket of thickness 42.5 μm (parameters of the Crystal Fibre PBF). The signal wavelength was $\lambda=0.5\Lambda$, close to the middle of the fiber bandgap, with a center-to-center distance between adjacent hollow regions in the inner cladding of $\Lambda=3$ μm. The values of S, $S_L$, and $S_n$ calculated for an SMF28 fiber (see parameters in Table 2) at $\lambda=1.5$ μm are also indicated for comparison. $S_L$ is almost independent of core radius and is the dominant term. The situation is reversed from a conventional SMF28 fiber, for which $S_n$ is significantly larger than $S_L$. Note also that $S_L$ is sensibly the same for the air-core and the SMF28 fibers. The physical reason is that $S_L$ quantifies linear expansion of the fiber, which is similar in both fibers. $S_L$ is actually a little lower for the air-core fiber because of the increased relative area of silica in the outer cladding compared to the acrylate in the jacket for this particular fiber. Therefore, the PBF has a lower overall thermal expansion than the SMF28 fiber. For the air-core fiber, the index term $S_n$ generally decreases slowly with increasing core radius, except for prominent local peaks in the ranges of $1.1\Lambda$-$1.25\Lambda$ and $1.45\Lambda$-$1.65\Lambda$, where $S_n$ and S increase by as much as a factor of two. These ranges coincide precisely with the regions when surface modes occur (highlighted in gray in FIG. 13). The reason is that for the core radii that support surface modes, a significantly larger fraction of the fundamental mode energy is contained in the dielectric portions of the fiber, and the phase is more sensitive to temperature. This result points out yet another reason why surface modes should be avoided. Outside of these surface-mode regions, the total phase thermal constant $S=S_L+S_n$ varies weakly with core radius. The lowest S value in the single-mode range ($R<\sim 1.1\Lambda$) occurs for $R\approx 1.05\Lambda$ and is equal to about 1.68 ppm/° C., which is 4.9 times smaller than for an SMF28 fiber.

Since in an air-core fiber most of the contribution to S comes from the length term $S_L$, the more complex index term $S_n$ can be neglected and it is worth developing a simple model to evaluate $S_L$ (and thus S). The value of $S_L$ can be approximated to a good accuracy, while gaining some physical insight for the effects of the various parameters, by ignoring the radial terms and utilizing the condition that the total force exerted on the fiber in the z direction is zero. Using the notation in FIG. 11, this total force can be expressed as:

$$\sigma_{zz,h}A_h + \sigma_{zz,cl}A_{cl} + \sigma_{zz,J}A_J = 0 \quad (17)$$

where the subscripts h, cl, and J stand for honeycomb, outer cladding, and jacket, respectively. The corresponding term for the air core is zero and is thus absent from Equation (17). Substituting Equation (12) into Equation (17) while neglecting the transverse terms, which are small because the fiber radius is small compared to the fiber length, the following approximate expression is obtained for $S_L$:

$$S_L = \frac{\Delta L}{L\Delta T} = \frac{\varepsilon_{zz}}{\Delta T} \approx \frac{A_h E_h \alpha_h + A_{cl} E_{cl} \alpha_{cl} + A_J E_J \alpha_J}{A_h E_h + A_{cl} E_{cl} + A_J E_J} \quad (18)$$

As can be seen from Table 1, the jacket expansion term $A_J E_J \alpha_J$ and the outer cladding expansion term $A_{cl}E_{cl}\alpha_{cl}$ are comparable in size and much larger than the honeycomb term $A_h E_h \alpha_h$, which can be neglected. In the denominator, the main term is the restoring force $A_{cl}E_{cl}$ due to the outer cladding, which is much larger than the force from the jacket or the honeycomb. Hence, Equation (16) can be well approximated by:

$$S_L \approx \frac{A_{cl}E_{cl}\alpha_{cl} + A_J E_J \alpha_J}{A_{cl}E_{cl}} = \alpha_{cl} + \frac{A_J}{A_{cl}} \frac{E_J}{E_{cl}} \alpha_J \quad (19)$$

This simple expression shows that $S_L$ can be lowered by making the area of the outer cladding $A_{cl}$ as large as possible relative to the jacket area $A_J$, and by using a jacket material with a low thermal expansion. This approximate model turns out to be quite accurate. In certain embodiments described herein, the area of the outer cladding $A_c$, the area of the jacket $A_J$, the Young's modulus of the outer cladding $E_{cl}$, the Young's modulus of the jacket $E_J$, and the coefficient of thermal expansion of the outer cladding $\alpha_{cl}$, and the coefficient of thermal expansion of the jacket $\alpha_J$, are selected such that the quantity $$\frac{A_J}{A_{cl}} \frac{E_J}{E_{cl}} \frac{\alpha_J}{\alpha_{cl}}$$

is less than or equal to 2.5, while in certain other embodiments, this quantity is less than 1.

Figure 14B:
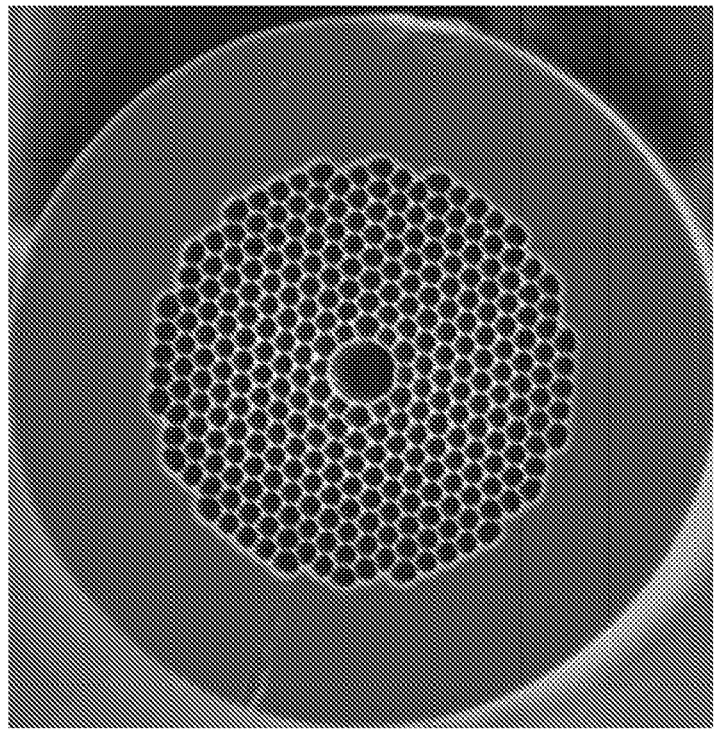
FIGS. 14A and 14B illustrate SEM photographs of cross-sections of two fibers compatible with certain embodiments described herein.
Figure 14A:
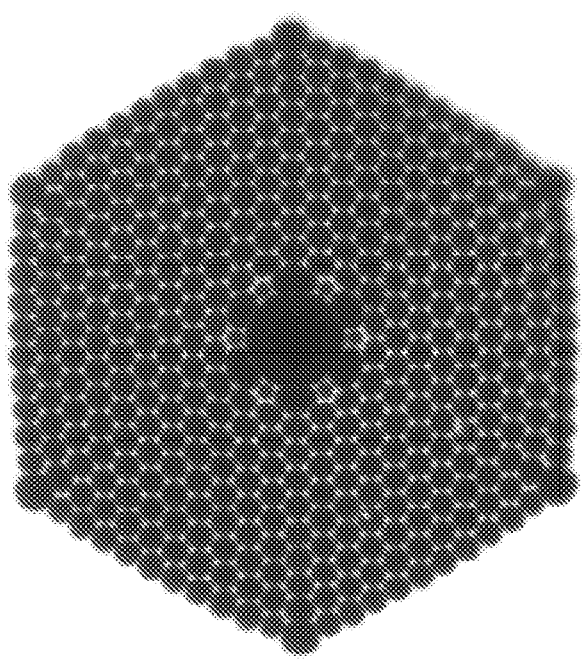

The parameter S was measured for two PBF fibers, namely the AIR-10-1550 fiber manufactured by Crystal Fibre A/S and the HC-1550-02 fiber from Blaze Photonics (now Crystal Fibre A/S). SEM photographs of the fibers' cross-sections are shown in FIGS. 14A and 14B, respectively. Measurements were carried out using the conventional Michelson fiber interferometer schematically illustrated in FIG. 15A. The signal source was a 1546-nm DFB laser with a linewidth of a few MHz. The air-core fiber was either spliced (Blaze Photonics fiber) or butt-coupled (Crystal Fiber fiber) to one of the ports of a 3-dB coupler (SMF28 fiber) to form the "sensing" arm of the interferometer. The far end of the PBF was similarly coupled to a fiber-pigtailed Faraday rotator mirror (FRM) to reflect the signal back through the fiber and thus eliminating polarization fluctuations in the return signal due to variations in the fiber birefringence. Most of the PBF was attached to an aluminum block placed on a heating plate, and the fiber/block assembly was covered with a styrofoam thermal shield (shown schematically in FIG. 15A) to maintain the fiber temperature as uniform as possible and to reduce temperature fluctuations due to air currents in the room. The temperature just above the surface of the block was measured with a thermocouple (e.g., output 1 mV/° C.).

The second (reference) arm of the interferometer consisted of a shorter length of SMF28 fiber splice to a second FRM. Together with the non-PBF portion of the sensing arm, this entire arm was placed in a second thermal shield (shown schematically in FIG. 15A), mostly to reduce the amount of heating by the nearby heater of both the reference fiber and the non-PBF portion of the sensing arm. With this arrangement, when the heater was turned on the PBF was the only portion of the interferometer that was significantly heated.

Figure 16A:
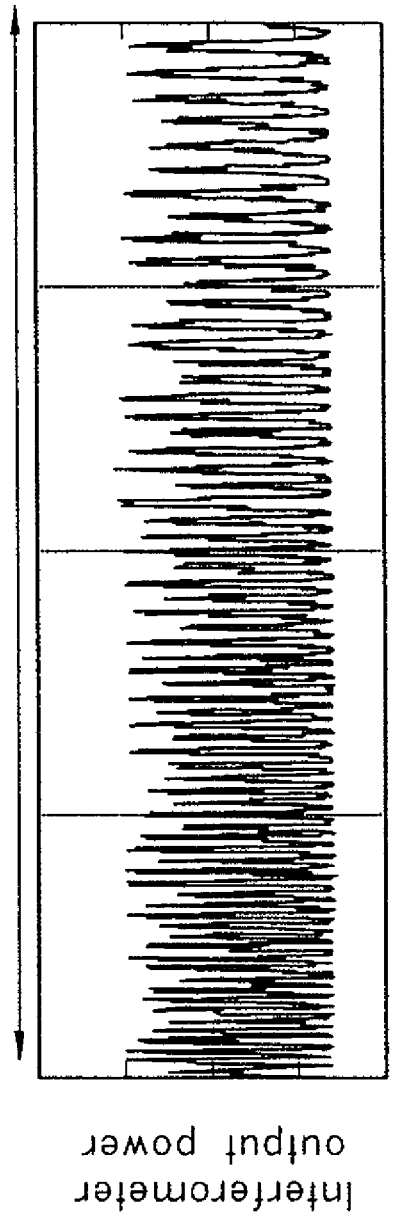
FIGS. 16A and 16B illustrate the measured output power $P_{out}(t)$ and the measured temperature T(t) for a Blaze Photonics fiber.
Figure 16B:
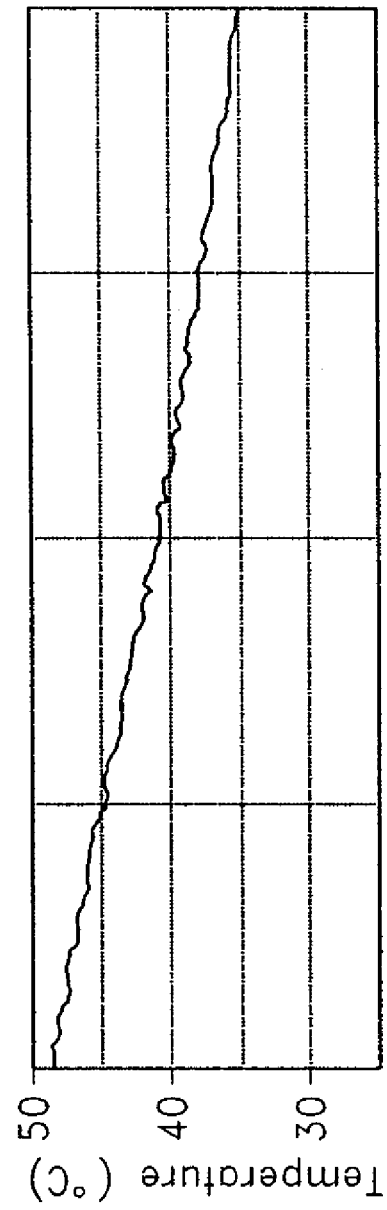

To measure S, the temperature of the PBF was raised to around 70° C., then the heater was turned off and as the PBF temperature slowly dropped, both the output power of the interferometer and the fiber temperature were measured over time and recorded in a computer. During the measurement time window (typically tens of minutes), the phase in the PBF arm decreased and passed many times (e.g., 50-200) through $2\pi$, so that the power at the interferometer output exhibited many fringes, as illustrated in the typical experimental curves of FIG. 16. The phase thermal constant S was calculated from the measured number of fringes occurring in a given time interval using:

$$S = \frac{\Delta\phi}{4\pi n_{\textit{eff}} L \Delta T / \lambda} \approx \frac{N_{\textit{fringes}}}{2 n_{\textit{eff}} L \Delta T / \lambda} \quad (20)$$

where L is the length of fiber under test, $\Delta T$ is the temperature change occurring during the measurement interval, and $N_{\textit{fringes}}$ is the number of fringes, which are illustrated in FIGS. 16A and 16B.

This approximation is justified because the temperature drop was slow enough that the PBF temperature was uniform at all times, yet fast enough that random phase variations in the rest of the interferometer were negligible compared to the phase variations in the PBF. To verify this last point, the inherent temperature stability of the interferometer was measured by disconnecting the PBF and reconnecting the fiber ends of the sensing arm with a short length of SMF28 fiber, as illustrated in FIG. 15B. In a first stability test, the interferometer output was recorded while the entire interferometer temperature was at equilibrium room temperature. Over a period of about 30 minutes, the enclosure temperature was found to vary by ±1° C. and the output power varied by about one fringe only. This test showed that the interferometer was more than stable enough to measure phase shifts of tens of fringes.

In a second test, the PBF enclosure was heated to around 70° C., then the heater was turned off and the interferometer output was recorded as the heater slowly cooled down. This time a larger number of fringes were observed, which indicated that a little heat from the heater reached through the interferometer shield and induced a differential temperature change in the two arms. The output power varied by about 12 fringes while the enclosure temperature dropped about 18° C. Consequently, when measuring S with the setup of FIG. 15A, residual heating of the non-PBF portion of the interferometer introduces an error of about 12 fringes. For this error to be small compared to the fringe count due to the change in the PBF temperature, this fringe count should be much larger than the error, e.g., 100 or more. This condition was met by using a sufficiently long PBF. For the value of S≈2 ppm/° C. predicted for a PBF (e.g., FIG. 13), Equation (18) predicts that the length required to obtain 100 fringes of phase shift for a $\Delta T$ of 18° C. is L≈1 meter. The length of PBF used in the measurements described herein was therefore of this order (about 2 meters, as shown in Table 2).

As a point of comparison, the thermal constant of a conventional solid-core fiber was measured by replacing the PBF in the experimental setup of FIG. 15A by a 210-cm length of SMF28 fiber. The measured value was S=7.9 ppm/° C., in excellent agreement with the value of 8.2 ppm/° C. predicted by the model using the parameter values of Tables 1 and 2. This value is the sum of $S_L$=2.3 ppm/° C and $S_n$=5.9 ppm/° C., i.e., the index contribution is 2.6 times larger than the length expansion contribution. These values are summarized in Table 3. The close agreement between measured and calculated values gives credence to both the model and the interferometer calibration.

TABLE 3

| Fiber | SMF28 | Crystal Fibre | Blaze Photonics | Bragg Fiber |
|---|---|---|---|---|
| S, measured (ppm/° C.) | 7.9 | 1.5 ± 0.9 | 2.2 ± 0.7 | |
| S, predicted (ppm/° C.) | 8.2 | 1.42 | 2.62 | 1.45 |
| $S_L$ (ppm/° C.) | 2.3 | 1.36 | 2.57 | 1.15 |
| $S_n$ (ppm/° C.) | 5.9 | 0.06 | 0.05 | 0.30 |

The value of S was then measured for the two air-core PBFs. A typical experimental result is shown in FIGS. 16A and 16B. The value of S inferred for each fiber from such measurement and Equation (18) is listed in Table 3, along with the calculated values of S, $S_n$, and $S_L$. The S values measured for the two PBFs are fairly similar, in the range of 1.5 to 2.2 ppm/° C. As predicted, the air-core fiber guidance mechanism results in a sizable decrease in the sensitivity of the phase delay on temperature. This reduction is as much as a mean factor of 5.26 (measured) or 5.79 (predicted) for the Crystal Fibre PBF. The corresponding figures for the Blaze Photonics fiber are 3.6 (measured) and 3.14 (predicted). Again, the theoretical and measured values agree well. The Crystal Fibre fiber exhibits a lower thermal expansion contribution than the Blaze Photonics fiber because it has a larger area of silica cladding relative to the jacket area, as expressed by Equation (17). These reductions in S result mostly from a decrease in $S_n$ by a factor of about 100, as well as a 15%-45% reduction in $S_L$; as predicted by theory, in a PBF S is determined overwhelmingly by $S_L$, which depends only on the change in fiber length. The conclusion is that current air-core fibers are substantially less temperature sensitivity that conventional fibers, by a factor large enough (e.g., 3.6-5.3) that it will translate into a significant stability improvement in fiber sensors and other phase-sensitive fiber systems.

Even smaller values of S can be obtained with improved PBF designs. Since in a PBF, $S_L$ is the main contribution to S, to further reduce S, the value of $S_L$ can be reduced. This term arises from the thermal change in the fiber length, which is driven by both the thermal expansion coefficient and the stiffness of (i) the honeycomb cladding (e.g., silica and air), (ii) the outer cladding (e.g., silica), and (iii) the jacket (e.g., a polymer). Because polymers have a much higher thermal expansion coefficient than silica, as the temperature is increased the jacket expands more than the fiber, and thus it pulls on the fiber and increases its length more than if the fiber was unjacketed. The jacket is therefore generally the dominant contribution to $S_L$. Consequently, a thinner jacket will result in a smaller $S_L$, the lowest value being achieved for an unjacketed fiber. Furthermore, everything else being the same a softer jacket (lower Young modulus) will stretch the fiber less effectively and thus yield a lower $S_L$. In addition, increasing the outer cladding thickness increases the overall stiffness of the fiber structure, thus reducing the expansion of the honeycomb and reducing $S_L$.

Figure 17:
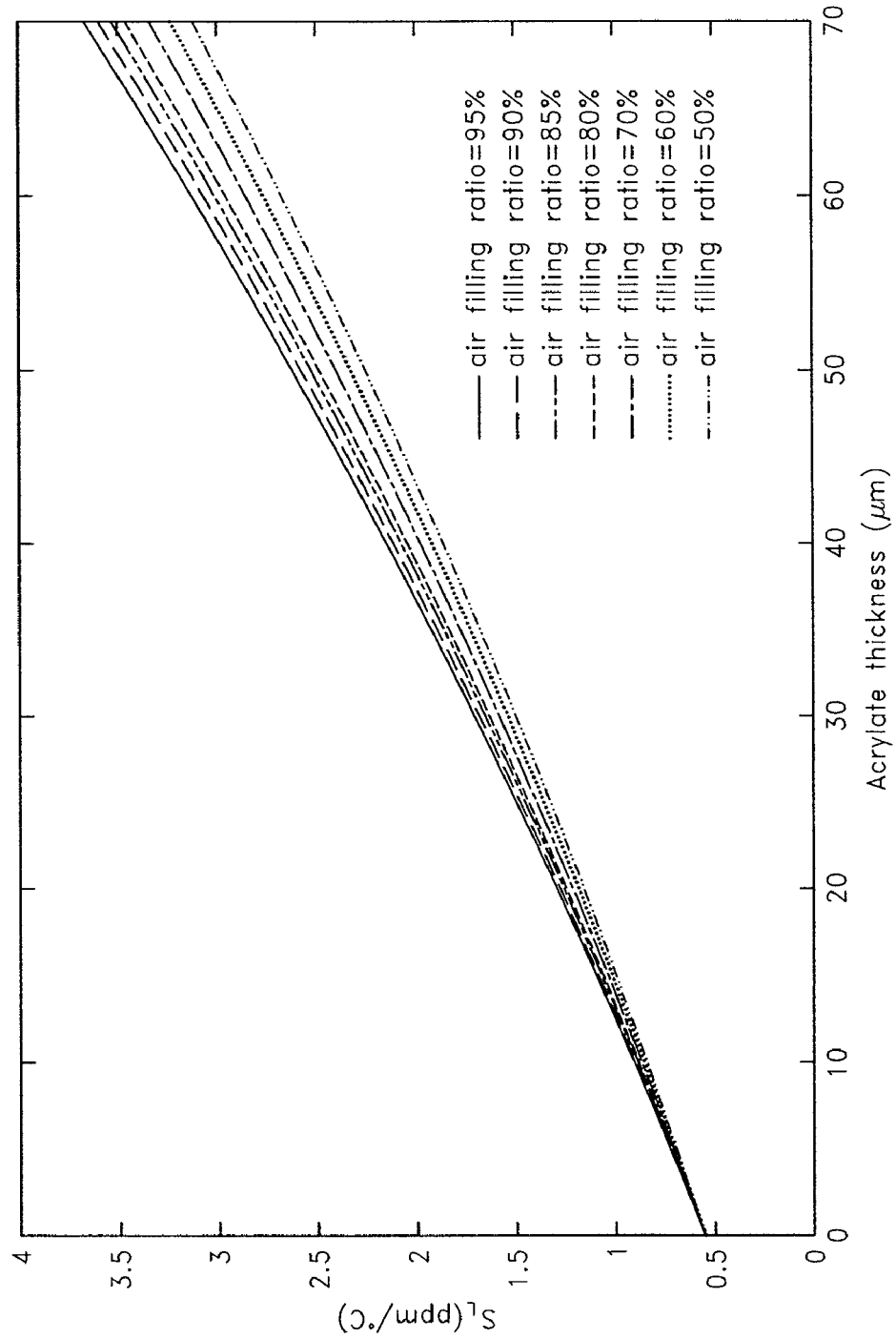
FIG. 17 illustrates the value of $S_L$ versus jacket thickness for a PBF with the same crystal period and core radius as the Blaze Photonics PBF for various air filling ratios.

These predictions were confirmed by simulating the Blaze Photonics fiber for various acrylate jacket thicknesses and air filling ratios, as shown in FIG. 17. As the jacket thickness is reduced, $S_L$ decreases. In the limit of zero jacket thickness (bare fiber), $S_L$ reaches its lowest limit, set by the thermal expansion of the silica cladding. For higher air filling ratios, $S_L$ is observed to be larger. The reason is that the honeycomb then contains less silica, the fiber has a lower overall stiffness, and the jacket expansion is less restrained by the glass structure, resulting in a larger $S_L$ value.

Figure 18:
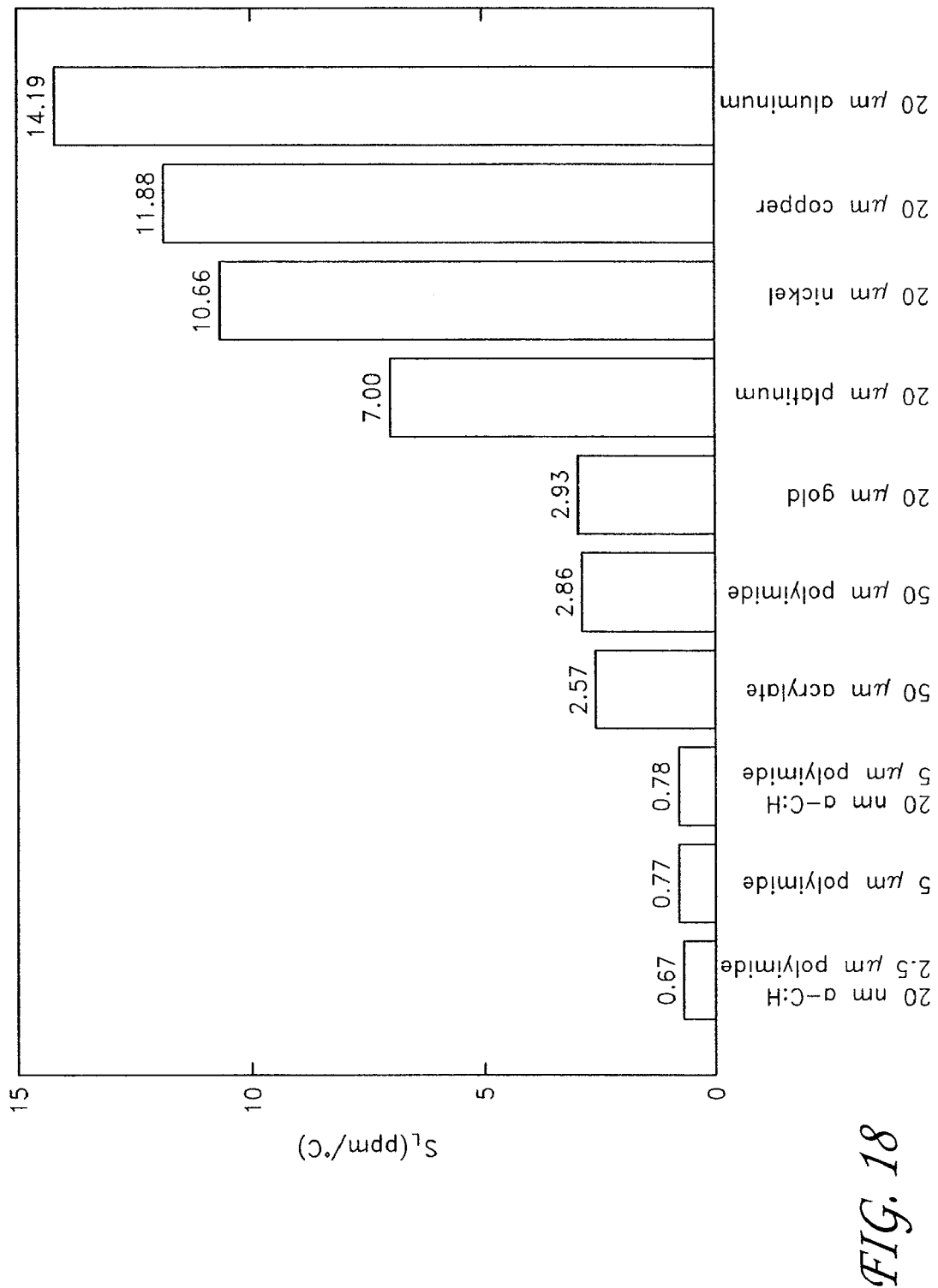
FIG. 18 illustrates the calculated values of $S_L$ for the same fiber structure as the Blaze Photonics PBF but with different jacket materials and thicknesses.

The effect of the jacket material stiffness can be seen in FIG. 18, where the calculated values of $S_L$ is graphed (for the same PBF, with an air filling ratio of 90%) for a few standard jacket materials (metals, polymers, and amorphous carbon covered with polyimide). To simulate actual fiber jackets, the jacket thickness was taken to be 5 or 50 microns for polyimide (as specified), 20 microns for metals, and 20 nanometers for amorphous carbon (covered with either 2.5 or 5 microns of polyimide). The reference jacket of the actual manufactured PBF was 50 microns of acrylate. All metal jackets yield a larger $S_L$ than did the reference acrylate jacket (2.57 ppm/° C.). The explanation is that while metals have a lower thermal expansion than acrylate (by about one order of magnitude), their Young modulus is much larger than that of both acrylate (by 2-3 orders of magnitude) and silica (by a factor of up to 3). The silica structure is therefore pulled more effectively by the expanding metal coating than by the acrylate jacket, and $S_L$ is larger. Several jacket materials, however, perform better than acrylate. A thin (20 nanometer) amorphous carbon coating with a 2.5-micron polyimide jacket over it gives the lowest value, $S_L$=0.67 ppm/° C. (74% reduction), followed by a 5-micron polyimide jacket ($S_L$=0.77 ppm/° C., 70% reduction). This is close to the theoretical limit for a silica fiber, which is set by the thermal expansion coefficient of silica and is equal to $S_L$=0.55 ppm/° C. The polyimide jacket provides the lowest value of $S_L$ because it is much thinner than an acrylate jacket. For equal thickness, acrylate actually performs better than polyimide. But because polyimide is a better water-vapor barrier than acrylate, a polyimide jacket only a few microns thick is sufficient to effectively protect the fiber against moisture, which is not true for acrylate. The conclusion is that acrylate unfortunately happens not to be the best choice of jacket material for thermal performance. By coating the PBF with the above carbon-polyimide jacket instead, an $S_L$ of only 0.67 ppm/° C., i.e., an S as low as 0.72 ppm/° C., is attainable, which is about 11 times lower than for a conventional fiber.

The effect of the silica outer cladding was also studied by simulating the same PBF for increasing cladding thicknesses, assuming a fixed 50-micron acrylate jacket and a 90% air-filling ratio. The result is plotted as the solid curve in FIG. 19. As the outer cladding thickness is increased, $S_L$ drops, because a thicker silica cladding better resists the length increase of the acrylate jacket. This effect is fairly substantial. For example, by doubling the outer cladding thickness from the 50-micron value of the Blaze Photonics fiber to 100 microns, $S_L$ is reduced by 55%. In the opposite limit of no outer cladding (zero thickness), $S_L$ jumps up to more than 20 ppm/° C. The high thermal expansion jacket is then pulling only on the silica honeycomb structure, which has a lower Young modulus due to the air holes and thus offers less resistance to stretching. Using a thick outer cladding is therefore an advantageous way of reducing the thermal sensitivity of an air-core fiber. The downside is that the fiber is then stiffer and can therefore not be wound as tightly, which is a disadvantage in some applications.

Figure 19:
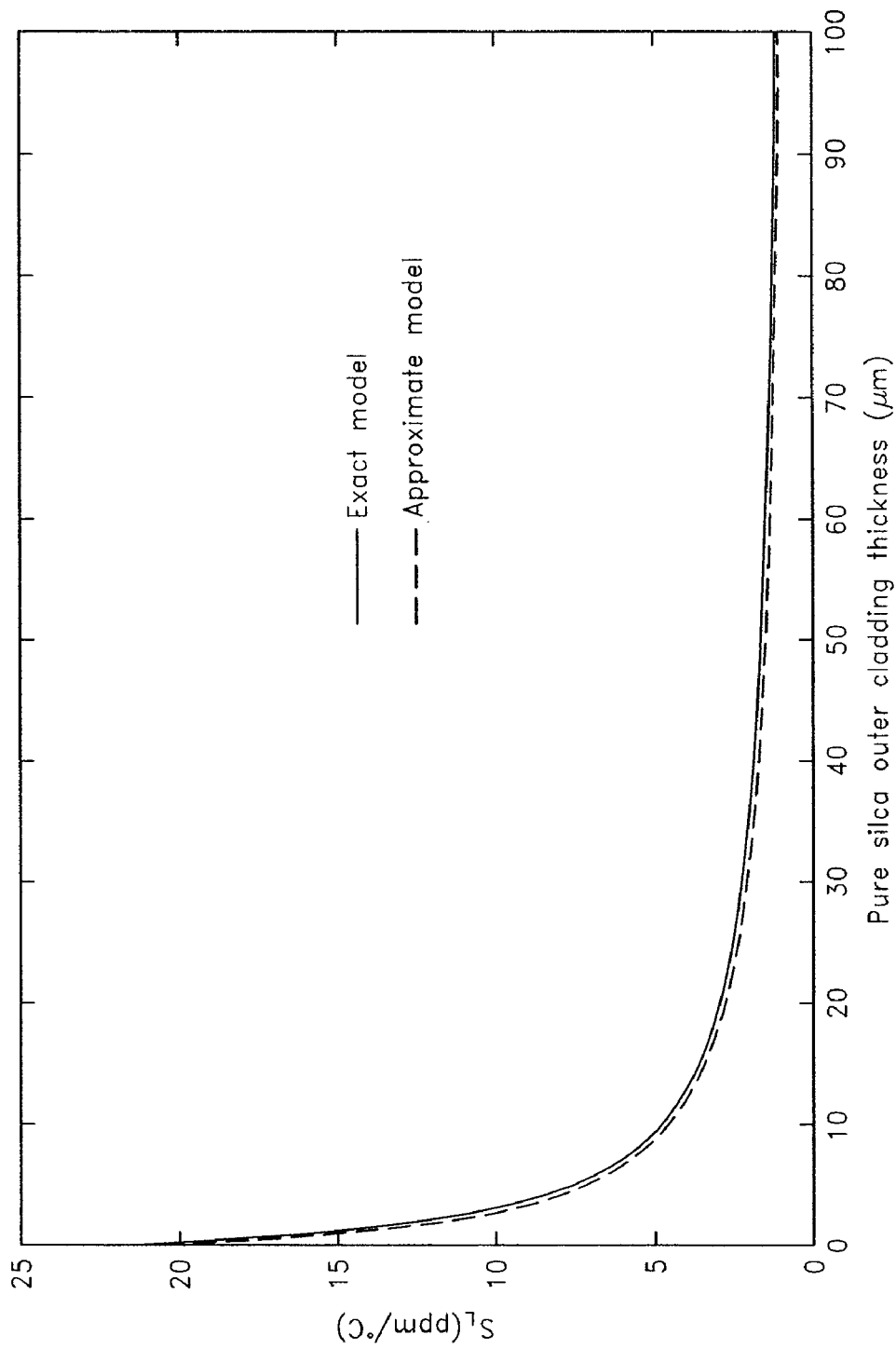
FIG. 19 illustrates the calculated dependence of $S_L$ on the thickness of the silica outer cladding.

The dashed curve in FIG. 19 was generated using the approximate model described herein. This curve is in very good agreement with the exact result. Since again $S_L$ accounts for more than 90% of the thermal constant S, this very simple model is a reliable tool to predict the thermal constant of any fiber structure.

Thus, it is possible to reduce the thermal constant below the low value already demonstrated in existing air-core fibers by using (i) a jacket as thin as possible; (ii) a soft jacket material; (iii) a large outer cladding; and/or (iv) a small air filling ratio (inasmuch as possible). Jacket materials that satisfy (i) and (ii) include, but are not limited to, polyimide and amorphous carbon covered by a thin layer of polyimide. With a 5-micron polyimide jacket, the Blaze Photonics fiber has a thermal constant of S≈0.82 ppm/° C., which is about 3.2 times smaller than in the current fiber.

In certain embodiments, the phase thermal constant S less than 8 parts-per-million per degree Celsius. In certain embodiments, the phase thermal constant S less than 6 parts-per-million per degree Celsius. In certain embodiments, the phase thermal constant S less than 4 parts-per-million per degree Celsius. In certain embodiments, the phase thermal constant S less than 1.4 parts-per-million per degree Celsius. In certain embodiments, the phase thermal constant S less than 1 part-per-million per degree Celsius.

The theoretical thermal phase sensitivity to temperature was also calculated for a Bragg fiber with a core radius of 2 microns, surrounded by 40 air-silica Bragg reflectors with thicknesses of 0.48 microns (silica) and 0.72 micron (air), with an acrylate jacket thickness of 62.5 microns. This fiber exhibits a fundamental mode confined in its air core with a radius of 1.5 microns. As shown in Table 3, these results yielded: $S_L$=1.15 ppm/° C., $S_n$=0.30 ppm/° C., and S=1.45 ppm/° C. Because the fundamental mode in a Bragg fiber travels mostly in air, this value of S is much lower than for a conventional fiber. S is comparable to the value for a PBF, and the main contribution is again the lengthening of the fiber.

EXAMPLE 3

Figure 20:
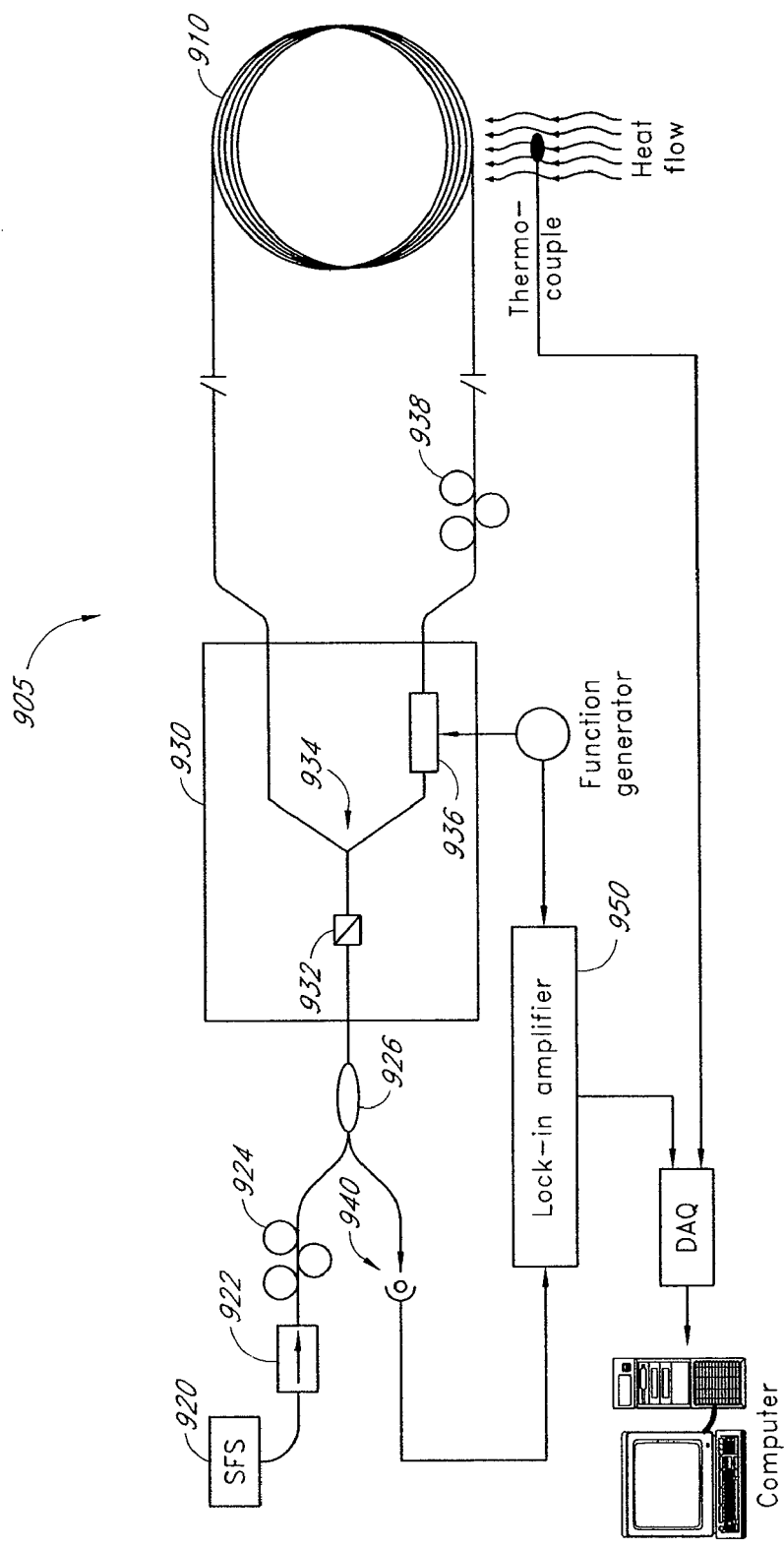
FIG. 20 schematically illustrates an example configuration for testing a fiber optic gyroscope compatible with certain embodiments described herein.

FIG. 20 schematically illustrates an example configuration for testing a fiber optic gyroscope 905 compatible with certain embodiments described herein. The sensing coil 910 comprises a Blaze Photonics air-core fiber having a length of 235 meters wound in 16 layers on an 8-centimeter-diameter spool using quadrupole winding to reduce the thermal and acoustic sensitivities of the coil 910. Each fiber layer in the coil 910 was bonded to the layer underneath it with a thin epoxy coating, and the outermost layer was also coated with epoxy. This fiber was essentially single-moded at the signal wavelength of about 1.54 microns (the few higher order modes were very lossy). The calculated scale factor of this coil 910 was 0.255 s. Light from a broadband Er-doped superfluorescent fiber source (SFS) 920 was isolated by isolator 922, transmitted through a polarization controller ($PC_1$) 924, and split by a 3-dB fiber coupler before being coupled to a fiber-pigtailed $LiNbO_3$ integrated optical circuit (IOC) 930 comprising a polarizer 932, a 3-dB input-output Y-junction coupler 934, an electro-optic phase modulator (EO-PM) 936, and a polarization controller $PC_2$ 938. The latter was modulated at the loop proper frequency (600 kHz) with a peak-to-peak amplitude of 3.6 rad to maximize the FOG sensitivity.

The Y-coupler 934 splits the input light into two waves that propagate around the fiber coil 910 in opposite directions. The two ends of the output pigtails of the IOC 930, cut at an angle to reduce back-reflections and loss, were butt-coupled to the ends of the PBF sensing coil 910, which were cleaved at 90°. Measured losses were about 2-3 dB for each butt-junction, about 4.7 dB for the fiber coil 910, and about 14 dB round-trip for the IOC 930. The $PC_1$ 924 was adjusted to maximize the power entering the interferometer, and the $PC_2$ was adjusted for maximum return power at the detector (about 10 μW for 20 mW input into the IOC 930). The detector 940 was a low-noise amplified InGaAs photodiode (available from New Focus of Beckham, Inc. of San Jose, Calif.). Rotating the coil 910 around its main axis induces a phase shift via the Sagnac effect between the counter-propagating waves, and the phase shift is proportional to the rotation rate Ω. The modulated light signal returning from the coil 910 was detected at the fiber coupler output and analyzed with a lock-in amplifier 950 (100-ms integration time; 24-dB/octave filter slope). This measured signal has a linear dependence on the phase shift, for small rotation rates. The gyroscope sensitivity was maximized by applying a sinusoidal phase modulation to the two waves at the loop proper frequency with the EO-PM 936.

Figure 21:
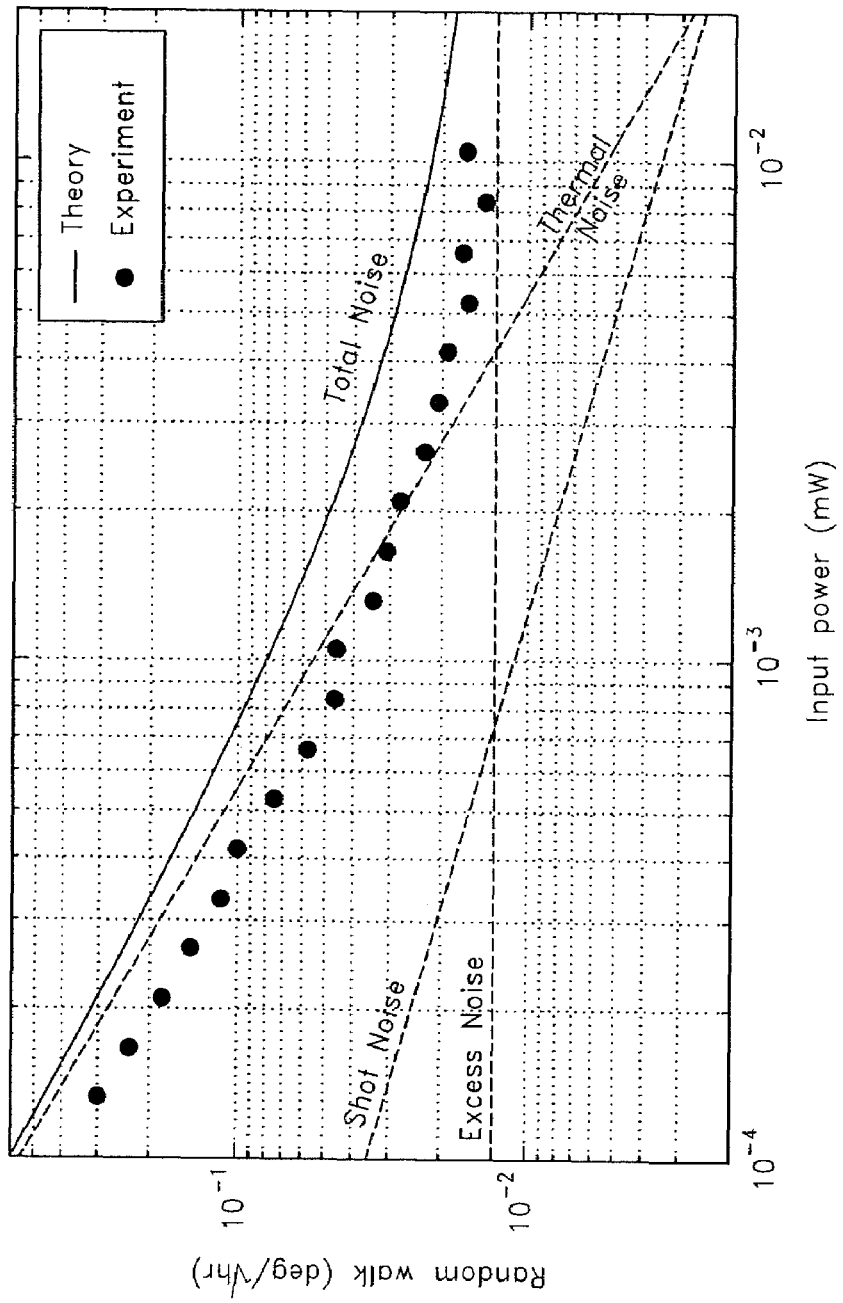
FIG. 21 shows the measured dependence of random walk on the input signal power of an air-core fiber gyroscope.

The short-term noise of this air-core fiber gyroscope 905 was measured by recording the one-sigma noise level in the return signal as a function of the square root of the detection bandwidth for integration times ranging from 100 microseconds to 10 seconds. This dependence was found to be linear, as expected for a white-noise source, with a slope that gave the gyroscope's random walk. This measurement was repeated for different signal powers incident on the detector. FIG. 21 shows the measured dependence of random walk on the signal power, measured at the IOC input. This result indicates clearly that the sensitivity of the air-core fiber gyroscope was limited by two of the three main sources of noise typically present in conventional fiber gyroscopes, namely detector thermal noise for low detected powers (e.g., less than 4 μW) and excess noise from the broadband light source for high detected powers (e.g., greater than 4 μW). The third source of noise is shot noise. At low power, the minimum detectable rotation rate was inversely proportional to the detected power, while at higher power the noise was independent of power. The dashed curve labeled "thermal noise" in FIG. 21 is the theoretical contribution of the detector thermal noise, calculated from the detector's noise equivalent power (2.5 pW/√Hz). The horizontal dashed curve represents the predicted excess noise calculated from the measured bandwidth of the SFS (2.8 THz). The lowest dashed curve represents the theoretical shot noise which is inversely proportional to the square root of the input power. This contribution is negligible in the air-core gyroscope 905. The sum of these three sources of noise is the total expected noise, illustrated by the solid curve in FIG. 21. It is in good agreement with the measured data points. This comparison demonstrates that the performance of this air-core fiber gyroscope is limited by excess noise, as it typically is in conventional FOGs. Importantly, it also shows that the residual back-reflections from the butt-coupling junctions between dissimilar fibers, as schematically illustrated by FIG. 20, have no impact on the gyroscope's short-term noise, presumably because of the use of a low-coherence source, and because the lengths of the two pigtails differ by more than one source coherence length, which further reduces coherent interaction between the primary and the reflected waves.

In the excess-noise-limited regime, the random walk of the air-core fiber gyroscope is 0.015 deg/√hr. For an integration time of 80 milliseconds, corresponding to a typical detection bandwidth of 1 Hz, the measured minimum detectable phase shift is then 1.1 μrad, corresponding to a minimum detectable rotation rate of 0.9 deg/hr. These values are very similar to the performance of state-of-the-art commercial inertial-navigation-grade fiber optic gyroscopes. This result was obtained while using the same detected power as in a typical conventional FOG (e.g., about 10 μW). However, because of the higher propagation loss of air-core fibers, this power was achieved by using a larger input power than a conventional FOG, namely a few mW, as shown by FIG. 21. This input power could nevertheless easily be reduced by using a lower noise detector, which would move the crossing point of the two dashed curves of FIG. 21 to a lower power, and would reduce the fiber loss.

The benefits of the air-core fiber gyroscope in certain embodiments lie mainly in its improved long-term stability, starting first with its temperature drift. A thermal transient applied to a Sagnac loop anywhere but at its mid-point induces a differential phase shift indistinguishable from a rotation-induced phase shift. If the temperature time derivative is $\dot{T}(z)$ in an element of fiber length dz located a distance z from one end of the coiled fiber, the total phase shift error in a fiber of total length L is:

$$\Delta \phi_E = \frac{2\pi}{\lambda_0 c} n^2 S \int_0^L (L - 2z)\dot{T}(z)dz \quad (21)$$

where $\lambda_0$ is the wavelength and c is the velocity of light (both in vacuum), n is the effective index of the fiber mode, and S is the Shupe constant. The Shupe constant takes into account both the fiber elongation and the effective index variation with temperature, and is independent of fiber length. The phase shift error of Equation (21) induces a rotation-like signal $\Omega_E$ related to $\Delta \phi_E$ by:

$$\Delta \phi_E = \frac{2\pi}{\lambda_0 c} L D \Omega_E \quad (22)$$

where D is the coil diameter.

Substituting Equation (21) into Equation (22), and using a dimensionless variable z'=z/L, yields the following expression for the rotation rate error induced by the transient temperature change $\dot{T}(z)$:

$$\Omega_E = \frac{n^2 S L}{D} \int_0^1 (1 - 2z')\dot{T}(z')dz' \quad (23)$$

Equation (23) states that the thermal sensitivity of the FOG is proportional not only to the Shupe constant S, but also to $n^2$, the square of the mode index. Since the air-core fiber has a much smaller effective index (n≈0.99) than does a standard fiber (n≈1.44), as well as a smaller Shupe constant, a dramatic reduction of the thermal sensitivity of the gyroscope is expected by using an air-core fiber. As shown in Table 3, the Shupe constant for the SMF28 fiber was measured to be S=7.9 ppm/° C. and the Shupe constant for the Blaze Photonics air-core fiber was measured to be S=2.2 ppm/° C. Combined with the additional benefit of this $n^2$ dependence, these values suggest that the Blaze Photonics PBF gyroscope should be about 7.6 times less thermally sensitive than the solid-core fiber gyroscope, which constitutes a considerable stability improvement.

To verify these predictions experimentally, the output signal of the air-core FOG and of a solid-core FOG were recorded while subjecting the coils to known temperature cycles. In each case, the sensing coil was heated asymmetrically by exposing one of its sides to warm air from a heat gun, as schematically illustrated by FIG. 20. Prior to these measurements, each gyroscope was carefully calibrated by placing it on a rotation table, applying known rotation rates, and measuring the lock-in output voltage dependence on rotation rate. The quantity measured during the thermal measurements was therefore a rotation error signal $\Omega_E$ from which $\Delta\phi_E$ was inferred using Equation (22).

Figure 22A:
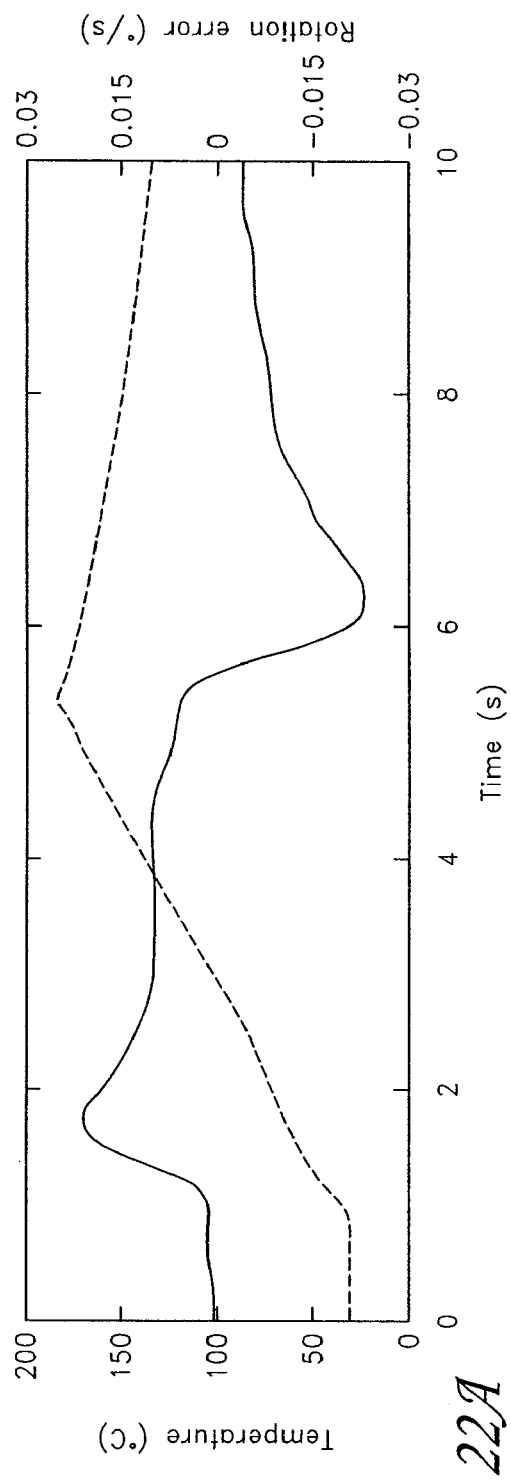
FIG. 22A shows the temperature change applied to the air-core fiber gyroscope (dashed line) and the measured resulting change in output signal (solid line).
Figure 22B:
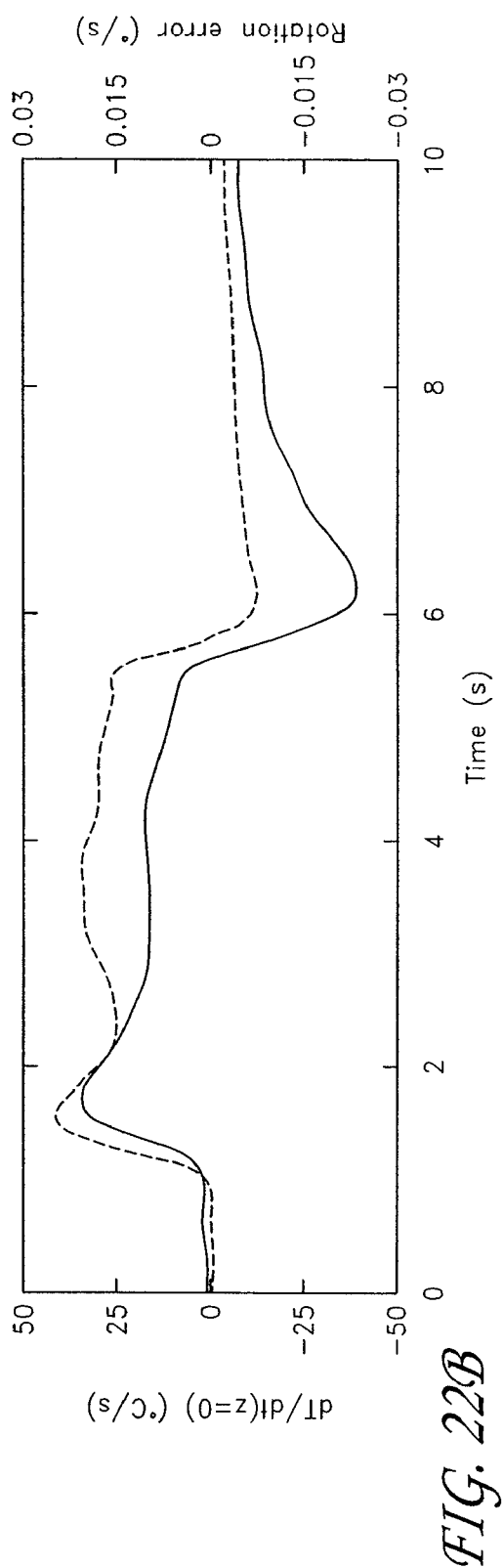
FIG. 22B shows the time derivative of the applied temperature change (dashed line) of FIG. 22A with the measured resulting change in output signal of FIG. 22A (solid line).

FIG. 22A shows an example of a measured temporal profile applied to one side of the air-core fiber gyroscope coil and the measured rotation error that it induced. Since the rotation error depends on the time derivative of the temperature, as expressed by Equation (23), FIG. 22B illustrates the derivative of the applied temperature change. This derivative was calculated numerically from the measured temporal profile of FIG. 22A, then filtered numerically to simulate the 4-stage, 24-dB/octave low-pass filter of the lock-in amplifier. Comparison to the measured rotation error, reproduced in FIG. 22B, shows a reasonable agreement between the two curves, in agreement with Equation (23).

Figure 23:
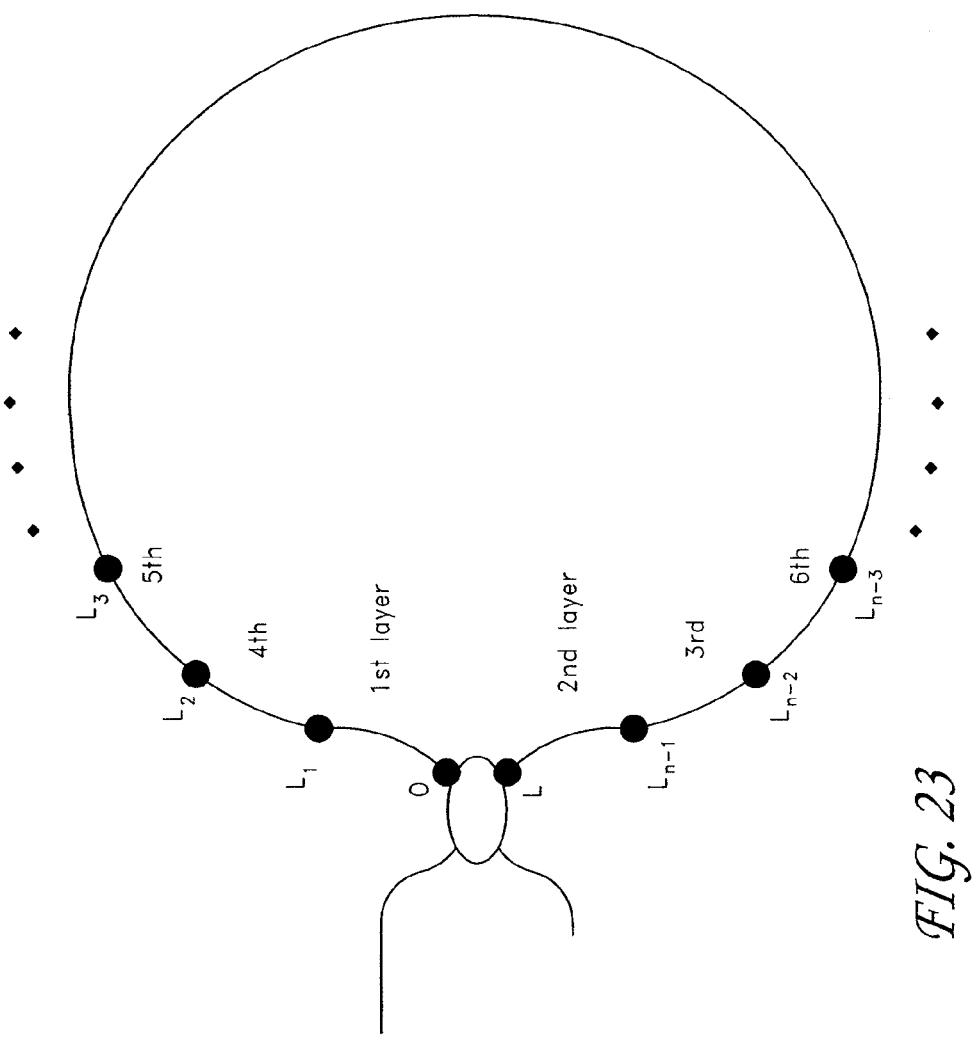
FIG. 23 schematically illustrates the quadrupolar winding of the first few layers of a FOG coil.

In a quadrupolar winding, as illustrated in FIG. 23, the first (outermost) layer is a portion of the sensing fiber located close to one of the two Sagnac loop ends closest to the coupler (e.g., between positions $z=0$ and $z=L_1$). The second layer, underneath it, is a portion of the sensing fiber located at the opposite end of the coil ($L_{n-1}<z<L_n=L$). The third layer is a portion of the sensing fiber located next to the second layer ($L_{n-2}<z<L_{n-1}$), etc. Just after the heat has been turned on, the first layer of the coil heats up first, and as a result, the differential phase between the counter-propagating waves changes (e.g., increases). As heat continues to be applied, it propagates radially into the coil, and the second layer, then the third layer, start to warm up. In a quadrupolar or a bipolar winding, the first and second layers are located symmetrically in the Sagnac loop. Hence as the second layer heats up, the thermal phase shift it induces begins to cancel that induced in the first layer. The same cancellation process takes place for the deeper layers. The total phase shift, however, continues to increase because the first layer heats up faster than the internal layers. Eventually, the temperature of the outer layer reaches some maximum value, and as more internal layers gradually heat up the total thermal phase decreases. If heat is applied long enough, the temperature along the fiber reaches a steady-state distribution, and the thermal phase shift vanishes.

This behavior is consistent with the observed behavior of the thermally induced signal, which increases first, then decreases over time, as shown by FIG. 22B. The measured signal closely follows the temperature derivative for about 1 second after the heat was turned on. For longer times, the two curves disagree in that the measured rotation error curve drops below the temperature derivative curve because, by then, heat has reached deep into the coil and the quadrupolar winding starts canceling the thermal phase shift. Just after the heat is turned off (around $t=5.5$ seconds in FIG. 22B), the rotation error becomes negative. The reason is that at that time, the outermost layer starts to cool down. Hence the sign of the temperature gradient is reversed, and so is the sign of the rotation error.

Figure 24A:
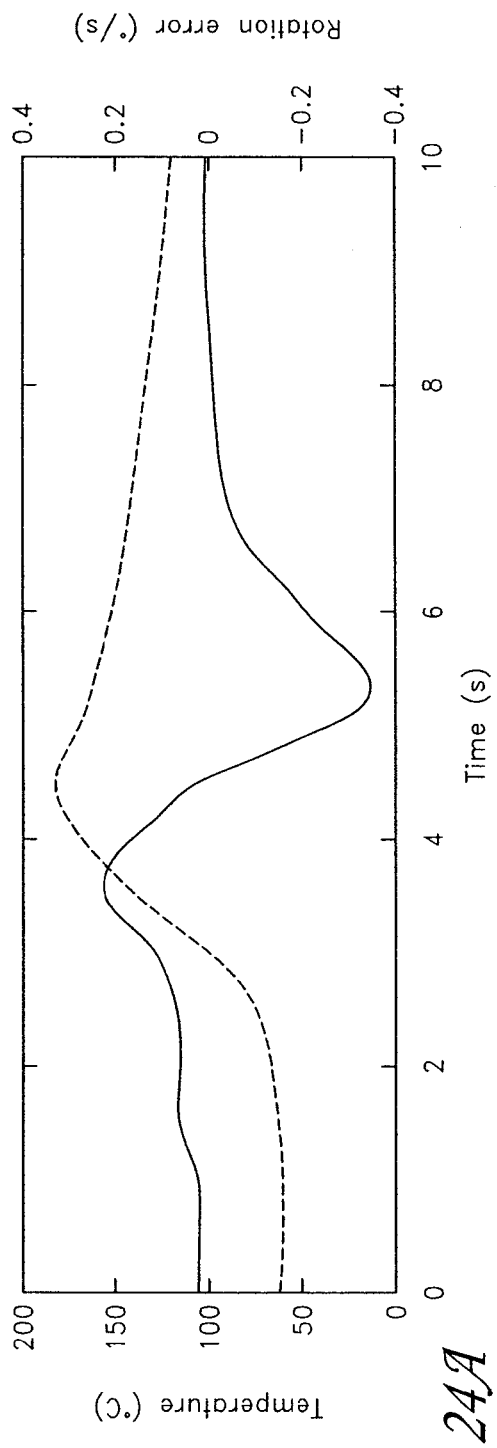
FIG. 24A shows the temperature change applied to the conventional solid-core fiber gyroscope (dashed line) and the measured resulting change in output signal (solid line).
Figure 24B:
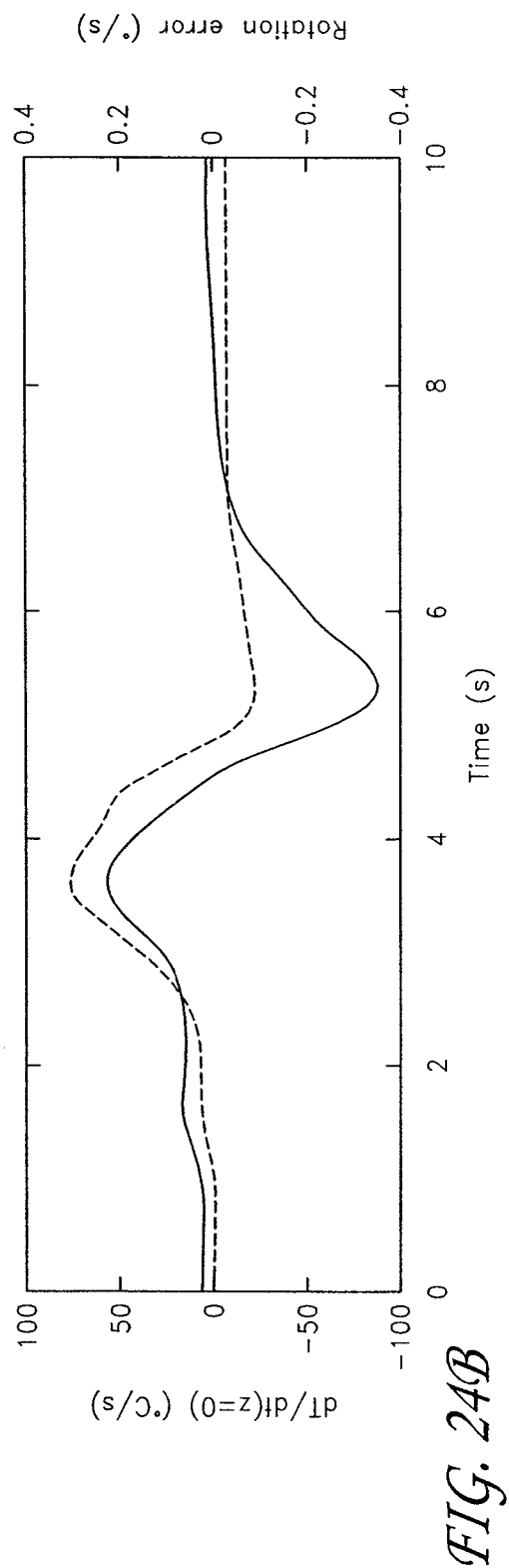
FIG. 24B shows the time derivative of the applied temperature change (dashed line) of FIG. 24A with the measured resulting change in output signal of FIG. 24A (solid line).

When the air-core fiber was replaced by the solid-core fiber coil, the behavior of the gyroscope was similar, as shown by FIGS. 24A and 24B. The rotation error increased just after the start of the heat pulse, then decreased, and finally became negative after the heat was turned off. However, the solid-core fiber gyroscope was clearly much more sensitive to asymmetric heating than was the air-core FOG. For comparable applied peak derivative $\dot{T}$ (75.5° C./s for the SMF28 vs. 41.1° C./s for the PBF), the error signal was about 10 times larger for the solid-core fiber gyroscope, as shown by a comparison of FIGS. 22B and 24B.

The measurements provided the temperature derivative $\dot{T}(z)$ at all times but only at the surface of the coil ($z=0$). It was consequently not possible to apply Equation (23) and extract from the measured rotation error signals a value for the Shupe constant S of the two fiber coils. However, the thermal performance of the two gyroscopes can still be compared by making two observations. First, because the two coils have identical diameter and thickness, the rates of heat flow are expected to be comparable in the two coils. Second, based on the above discussion regarding the dynamic of heat flow in a quadrupolar coil, the total thermal phase shift is expected to reach its maximum shortly after the first layer has started to heat up. The maximum thermally induced rotation error can therefore be approximated by:

$$\Omega_{E,max} \approx \frac{n^2 S L}{D} \int_0^{L_1/L} (1-2z')\dot{T}(z')dz' \quad (24)$$

Furthermore, the rate of temperature change of the outermost layer is expected to be close to the rate of temperature change measured at the surface of the coil, and to be weakly dependent on $z'$. Hence, in Equation (24), $\dot{T}(z')$ can be taken out of the integral, which shows that $\Omega_{E,max}$ should scale approximately linearly with the measured surface temperature derivative.

Figure 25:
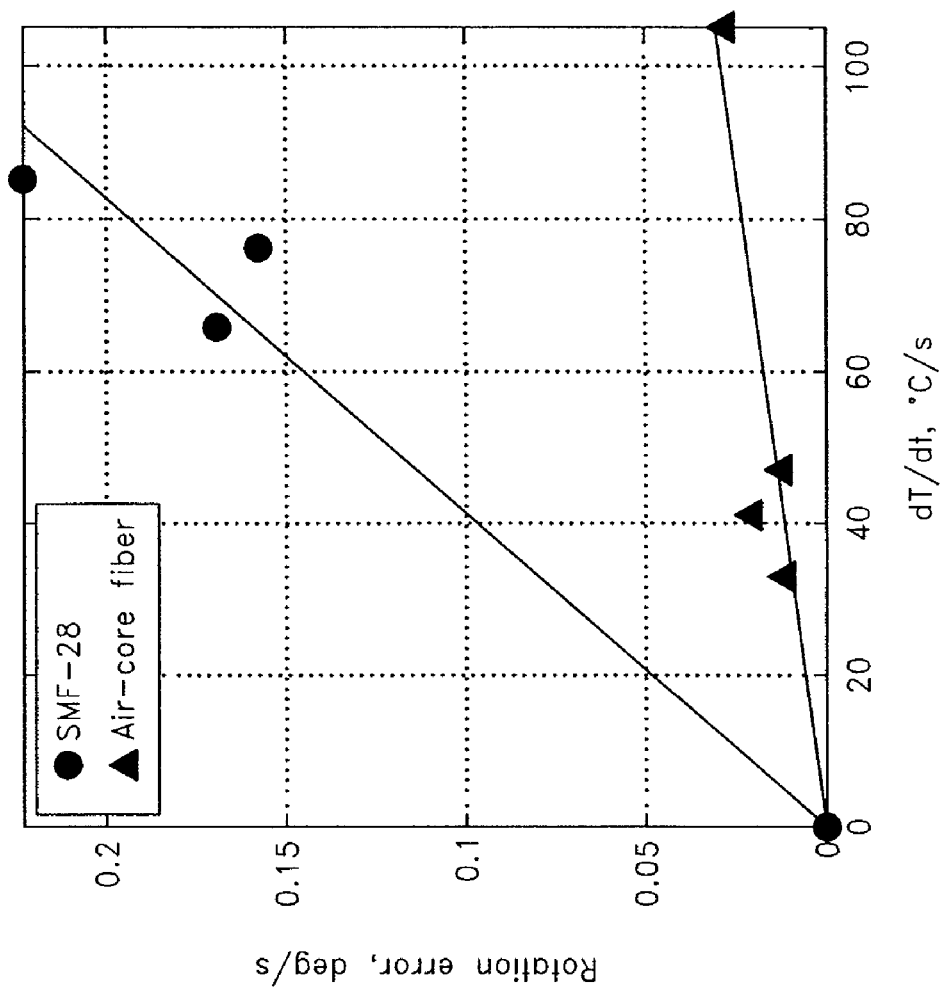
FIG. 25 shows the dependence of the maximum rotation rate error on the applied temperature gradient measured in both the conventional solid-core fiber gyroscope and in the air-core fiber gyroscope.

To verify this approximation, the dependence of the maximum rotation rate error on the applied temperature gradient was measured for each gyroscope. For example, in the measurement shown by FIG. 22B, the maximum rotation rate error is equal to 0.02 deg/s, and at the time the maximum rotation rate error occurred ($t\approx1.8$ s), the applied temperature gradient was about 41.1° C./s. FIG. 25 shows the dependence of the maximum rotation rate error on the applied temperature gradient measured in both the conventional solid-core fiber gyroscope and in the air-core fiber gyroscope. The maximum rotation rate error increases roughly linearly with applied temperature gradient, which confirms the validity of the approximation. The slope of these dependencies are $2.4\times10^{-3}$ deg/s/(° C./s) for the SMF28 fiber gyroscope, and $2.9\times10^{-4}$ deg/s/(° C./s) for the air-core fiber gyroscope. After correcting for the slightly different length L of the two sensing fibers, for identical coil lengths, the air-core fiber gyroscope is 6.5 times less sensitive to temperature gradients than the conventional FOG.

Independent thermal measurements performed on short pieces of the same fibers showed that the ratio of Shupe constants for the SMF28 and the Blaze PBF is 3.6, as shown in Table 3. When using these values in Equation (23), together with mode effective indices of 0.99 and 1.44 for the two fibers, respectively, and assuming identical coils, the air-core fiber is expected to be 7.6 times less sensitive than the solid-core fiber to thermal perturbations. This value is in good agreement with our experimental value of 6.5. The small difference (about 13%) may be due to slightly different heat propagation properties in the coils, which is expected since an air-core fiber constitutes a better thermal insulator. The measured value of 6.5 is also in excellent agreement with the theoretically predicted ratio of 6.6 for these two fibers. In any case, measured and theoretical values demonstrate unequivocally the significant advantage of using an air-core fiber in a FOG to reduce its thermal sensitivity. Further design improvements (e.g., optimization of the jacket) can result in the Shupe constant being reduced by another factor of about 3, bringing the total improvement over a conventional coil to a factor of about 23.

The second significant long-term stability improvement provided by an air-core fiber gyroscope is a dramatic reduction in the non-reciprocal Kerr effect. To illustrate this improvement, the magnitude of the Kerr-induced drift in the air-core FOG was measured by observing the change in the gyroscope output when the power between the two counter-propagating signals was intentionally unbalanced. To be able to observe this very weak effect, the IOC was replaced by a 10% fiber coupler, which provided a strong imbalance between the counter-propagating powers. This change was accompanied by the replacement of the other components present on the IOC (polarization filter and phase modulator) by a standard fiber polarizer and a piezoelectric fiber phase modulator. The SFS, which almost completely cancels the Kerr effect, was replaced by a narrow-band semiconductor laser. With the narrow-band source, the noise due to coherent back-scattering from the fiber was quite large (about 19 dB higher than with the SFS). In fact, even with the largest input power tolerated by the optical components (e.g., 50 mW), back-scattering noise exceeded the Kerr-induced signal. In other words, the Kerr effect of the air-core fiber gyroscope was too weak to measure. Nevertheless, by recognizing that the Kerr phase shift was at most equal to the (back-scattering-dominated) noise, this measurement provides an estimate of the upper bound value of the fiber mode's Kerr constant. After correcting for the known Kerr contribution from the (solid-core) fiber pigtails inside the Sagnac loop, the Kerr constant was found to be reduced by at least a factor of 50 compared to the same gyroscope using the SMF28-fiber coil. This result confirms that the Kerr effect is substantially reduced in an air-core fiber, by a factor of 50 or more.

While the effect of a magnetic field on the air-core fiber gyroscope was not measured directly, the Verdet (Faraday) constant of a short length of the air-core fiber was measured. These measurements indicate that for equal length, the Faraday rotation induced by an applied magnetic field is about 160 times weaker in the air-core fiber than in an SMF28 fiber. Inferring an accurate value of the Verdet constant of the air-core fiber from this result utilizes a precise knowledge of the fiber's birefringence. This constant is estimated to be at least a factor of about 10 dB smaller than that of an SMF28 fiber, and it could be as low as about 26 dB smaller than that of an SMF28 fiber. In practice, an air-core FOG requires much less μ-metal shielding (if any) than do current commercial FOGs, which will reduce the size, weight, and cost of the air-core FOG as compared to conventional FOGs.

In certain embodiments described herein, the temperature dependence of an FOG is advantageously reduced by using an air-core fiber. In certain other embodiments, the temperature dependence of other types of interferometric fiber sensors can also be advantageously reduced. Such fiber sensors include, but are not limited to, sensors based on optical interferometers such as Mach-Zehnder interferometers, Michelson interferometers, Fabry-Perot interferometers, ring interferometers, fiber Bragg gratings, long-period fiber Bragg gratings, and Fox-Smith interferometers. In certain embodiments in which the fiber sensor utilizes a relatively short length of air-core fiber, the additional costs of such fibers are less of an issue in producing these improved fiber sensors.

In certain embodiments described herein, the temperature dependence of an FOG is advantageously reduced by using a Bragg fiber. In certain other embodiments, the temperature dependence of other types of interferometric fiber sensors can also be advantageously reduced. Such fiber sensors include, but are not limited to, sensors based on optical interferometers such as Mach-Zehnder interferometers, Michelson interferometers, Fabry-Perot interferometers, ring interferometers, fiber Bragg gratings, long-period fiber Bragg gratings, and Fox-Smith interferometers. In certain embodiments in which the fiber sensor utilizes a relatively short length of Bragg fiber, the additional costs of such fibers are less of an issue in producing these improved fiber sensors.

While certain embodiments have been described herein as having a photonic-bandgap fiber with a triangular pattern of holes in the cladding, other embodiments can utilize a photonic-bandgap fiber having an arrangement of cladding holes that is different from triangular, provided that the fiber still supports a bandgap and the introduction of a hollow core defect supports one or more core-guided modes localized within this defect. For example, such conditions are satisfied by a fiber with a cladding having a so-called Kagome lattice, as described in "*Large-pitch kagome-structured hollow-core photonic crystal fiber*," by F. Couny et al., Optics Letters, Vol. 31, No. 34, pp. 3574-3576 (December 2006). In certain other embodiments, a hollow-core fiber is utilized which do not exhibit a bandgap but still transmit light confined largely in the core over appreciable distances (e.g., millimeters and larger).

Those skilled in the art will appreciate that the methods and designs described above have additional applications and that the relevant applications are not limited to those specifically recited above. Moreover, the present invention may be embodied in other specific forms without departing from the essential characteristics as described herein. The embodiments described above are to be considered in all respects as illustrative only and not restrictive in any manner.

What is claimed is:

1. An optical sensor comprising:
a directional coupler comprising at least a first port, a second port, and a third port, the first port in optical communication with the second port and with the third port such that a first optical signal received by the first port is split into a second optical signal that propagates to the second port and a third optical signal that propagates to the third port; and
a photonic bandgap fiber having a hollow core and an inner cladding generally surrounding the core, the photonic bandgap fiber in optical communication with the second port and with the third port, wherein the second optical signal and the third optical signal counterpropagate through the photonic bandgap fiber and return to the third port and the second port, respectively, wherein the photonic bandgap fiber has a phase thermal constant S less than 8 parts-per-million per degree Celsius.

2. The optical sensor of claim 1, wherein the phase thermal constant S is less than 6 part-per-million per degree Celsius.

3. The optical sensor of claim 1, wherein the phase thermal constant S is less than 4 part-per-million per degree Celsius.

4. The optical sensor of claim 1, wherein the phase thermal constant S is less than 1.4 part-per-million per degree Celsius.

5. The optical sensor of claim 1, wherein the photonic bandgap fiber further comprises an outer cladding generally surrounding the inner cladding.

6. The optical sensor of claim 5, wherein the photonic bandgap fiber further comprises a jacket generally surrounding the outer cladding.

7. The optical sensor of claim 6, wherein the jacket comprises a polyimide layer having a thickness less than or equal to 5 microns.

8. The optical sensor of claim 7, wherein the polyimide layer has a thickness of about 2.5 microns.

9. The optical sensor of claim 7, wherein the jacket further comprises an amorphous carbon coating generally surrounded by the polyimide layer.

10. The optical sensor of claim 1, wherein the inner cladding comprises a material having a first refractive index and a periodic array of regions having a second refractive index less than the first refractive index, the regions having a center-to-center distance of $\Lambda$.

11. The optical sensor of claim 1, wherein the photonic bandgap fiber is a single-mode fiber.

12. The optical sensor of claim 1, wherein the photonic bandgap fiber is a multi-mode fiber.

13. The optical sensor of claim 1, wherein the photonic bandgap fiber is a single polarization fiber.

14. The optical sensor of claim 1, wherein the photonic bandgap fiber further comprises an outer cladding generally surrounding the inner cladding and a jacket generally surrounding the outer cladding, wherein the outer cladding has an area $A_{cl}$, a Young's modulus $E_{cl}$, and a coefficient of thermal expansion $\alpha_{cl}$, wherein the jacket has an area $A_J$, a Young's modulus $E_J$, and a coefficient of thermal expansion $\alpha_J$, wherein a quantity $$\frac{A_J}{A_{cl}} \frac{E_J}{E_{cl}} \frac{\alpha_J}{\alpha_{cl}}$$

is less than or equal to 2.5.

15. The optical sensor of claim 14, wherein the quantity is less than or equal to 1.

16. The optical sensor of claim 1, further comprising an optical detector in optical communication with the directional coupler to receive the second optical signal and the third optical signal after the second and third optical signals have traversed the photonic bandgap fiber.

17. The optical sensor of claim 1, wherein the core contains air.

18. The optical sensor of claim 1, wherein the photonic bandgap fiber is a coil.

19. The optical sensor of claim 18, wherein the coil is wound with quadrupole winding.

20. A method for sensing comprising:
providing a light signal;
propagating a first portion of the light signal in a first direction through a portion of a photonic bandgap fiber having a hollow core and an inner cladding generally surrounding the core, wherein the photonic bandgap fiber has a phase thermal constant S less than 8 parts-per-million per degree Celsius;
propagating a second portion of the light signal in a second direction through the photonic bandgap fiber, the second direction opposite to the first direction;
optically interfering the first and second portions of the light signal after the first and second portions of the light signal propagate through the photonic bandgap fiber, thereby producing an optical interference signal;
subjecting at least a portion of the photonic bandgap fiber to a perturbation; and
measuring variations in the optical interference signal caused by the perturbation.

21. The method of claim 20, wherein the core contains air.

22. The method of claim 20, wherein the perturbation comprises a rotation of the portion of the photonic bandgap fiber.

23. The method of claim 20, wherein the perturbation comprises a change of pressure applied to the portion of the photonic bandgap fiber.

24. The method of claim 20, wherein the perturbation comprises a movement of the portion of the photonic bandgap fiber.

25. An optical system comprising:
a light source having an output that emits a first optical signal;
a directional coupler comprising at least a first port, a second port and a third port, the first port in optical communication with the light source to receive the first optical signal emitted from the light source, the first port in optical communication with the second port and with the third port such that the first optical signal received by the first port is split into a second optical signal that propagates to the second port and a third optical signal that propagates to the third port;
a photonic bandgap fiber having a hollow core, an inner cladding generally surrounding the core, an outer cladding generally surrounding the inner cladding, and a jacket generally surrounding the outer cladding, the photonic bandgap fiber in optical communication with the second port and with the third port, wherein the second optical signal and the third optical signal counterpropagate through the photonic bandgap fiber and return to the third port and the second port, respectively, wherein the photonic bandgap fiber has a phase thermal constant S less than 8 ppm per degree Celsius; and
an optical detector in optical communication with the directional coupler, the optical detector receiving the counterpropagating second optical signal and the third optical signal after having traversed the photonic bandgap fiber.

* * * * *

UNITED STATES PATENT AND TRADEMARK OFFICE
CERTIFICATE OF CORRECTION

PATENT NO. : 7,619,743 B2
APPLICATION NO. : 11/770660
DATED : November 17, 2009
INVENTOR(S) : Digonnet et al.

It is certified that error appears in the above-identified patent and that said Letters Patent is hereby corrected as shown below:

At Sheet 8 of 25 (FIG. 8B), line 7 (Approx.), please delete "Wavelenght" and insert -- Wavelength --.

At Sheet 19 of 35 (FIG. 19), line 7 (Approx.), please delete "silca" and insert -- silica --.

At Column 2, line 57, please delete "v" and insert -- V --.

At Column 13, line 20 (Approx.), please delete "$(1-\eta_{nl})$" and insert -- $(1-\eta_{nl}))$ --.

At Column 22, line 6, please delete "backcattering" and insert -- backscattering --.

At Column 23, line 25-26 (Approx.), please delete "backcattering" and insert -- backscattering --.

At Column 23, line 41, please delete "backcattering" and insert -- backscattering --.

Signed and Sealed this

Tenth Day of August, 2010

David J. Kappos
*Director of the United States Patent and Trademark Office*